US006486866B1

(12) United States Patent
Kuwahara et al.

(10) Patent No.: US 6,486,866 B1
(45) Date of Patent: Nov. 26, 2002

(54) DISPLAY DEVICE AND METHOD OF DRIVING THE SAME

(75) Inventors: Soichi Kuwahara, Kanagawa (JP); Masataka Matsute, Kanagawa (JP); Eriko Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/433,498

(22) Filed: Nov. 3, 1999

(30) Foreign Application Priority Data

Nov. 4, 1998 (JP) .......................................... 10-312723

(51) Int. Cl.[7] ............................ G09G 3/34; G09G 3/36; G02B 26/00

(52) U.S. Cl. .......................... 345/107; 345/84; 359/296

(58) Field of Search .................... 345/107, 84; 359/296

(56) References Cited

U.S. PATENT DOCUMENTS

| | | | | |
|---|---|---|---|---|
| 3,612,758 A | * 10/1971 | Evans | 345/107 |
| 4,093,534 A | * 6/1978 | Carter et al. | 359/296 |
| 4,126,854 A | * 11/1978 | Sheridon | 345/107 |
| 4,203,106 A | * 5/1980 | Dalisa et al. | 345/107 |
| 4,311,361 A | * 1/1982 | Somlyody | 359/296 |
| 4,438,160 A | * 3/1984 | Ishikawa et al. | 427/214 |
| 4,741,604 A | * 5/1988 | Kornfeld | 359/296 |
| 5,760,761 A | * 6/1998 | Sheridon | 345/107 |
| 5,808,783 A | * 9/1998 | Crowley | 359/296 |
| 6,113,810 A | * 9/2000 | Hou et al. | 359/296 |
| 6,184,856 B1 | * 2/2001 | Gordon, II et al. | 345/107 |
| 6,221,267 B1 | * 4/2001 | Ikeda et al. | 216/24 |
| 6,222,513 B1 | * 4/2001 | Howard et al. | 345/84 |

* cited by examiner

*Primary Examiner*—Steven Saras
*Assistant Examiner*—Paul A. Bell
(74) *Attorney, Agent, or Firm*—Sonnenschein, Nath & Rosenthal

(57) ABSTRACT

Disclosed herein are a display device and a method of driving the same, more particular, the present invention provides a display device comprising display media each of which has a dispersion medium and a large number of electrophoretic particles dispersed in the dispersion medium, the electrophoretic particles being driven by applying an electric field to each of the display media, to thereby perform a desired display operation; wherein the electrophoretic particles comprise small-sized two-color ball electrophoretic particles each of which is composed of a pair of hemispherical portions different from each other in terms of color or reflectance and charging characteristic; and the dispersion medium comprises a colorless/transparent dispersion medium. With this configuration, it is possible to realize the display of clear white and true black, enhance the contrast ratio, realize high speed display switching, and perform multi-color display.

30 Claims, 27 Drawing Sheets

E
1
A
B
7
5b
5a
5
4
8
6
5
6a
9
2
3
10

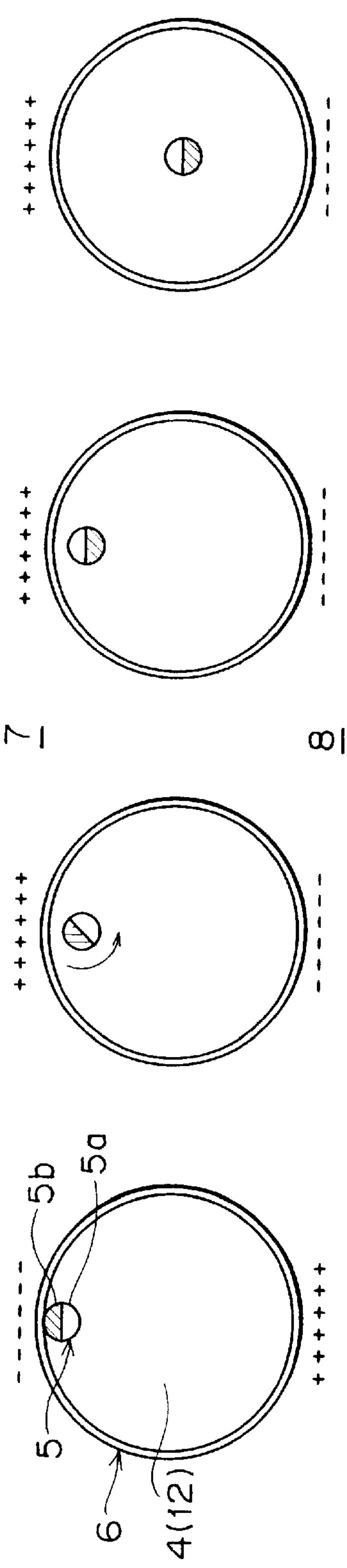
5b
5a
5
6
4(12)
7
8
FIG.3A
FIG.3B
FIG.3C
FIG.3D
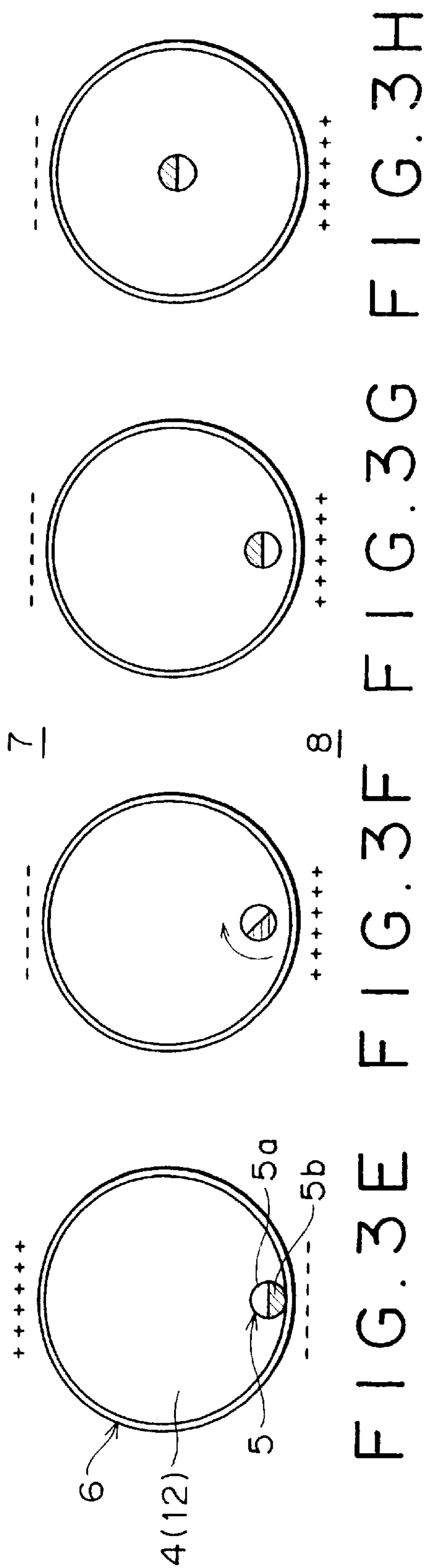
5a
5b
5
6
4(12)
7
8
FIG.3E
FIG.3F
FIG.3G
FIG.3H F I G.10A
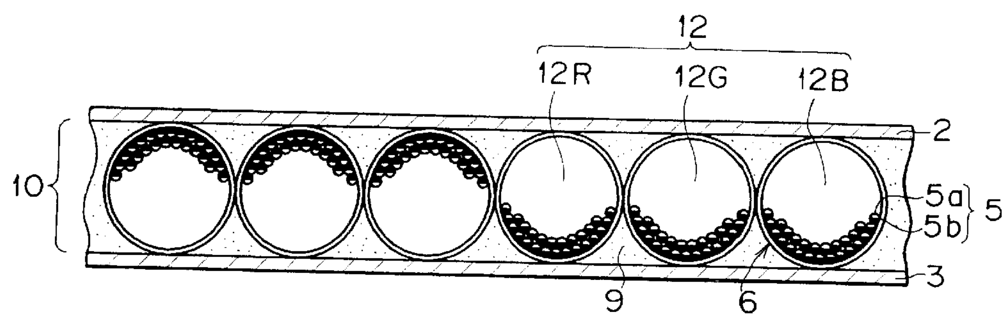
F I G.10B
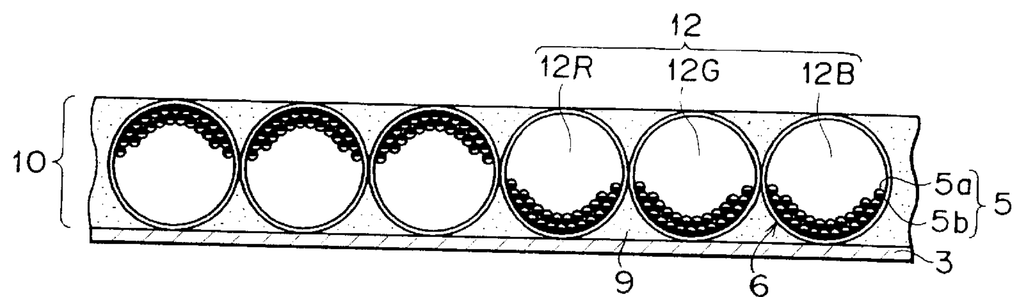
F I G.10C
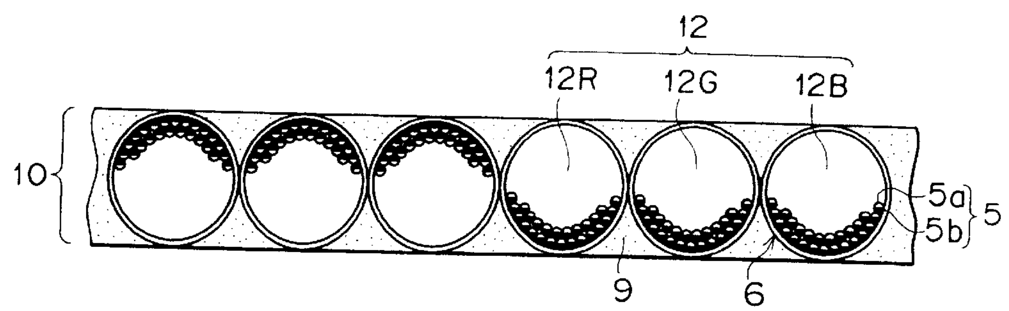

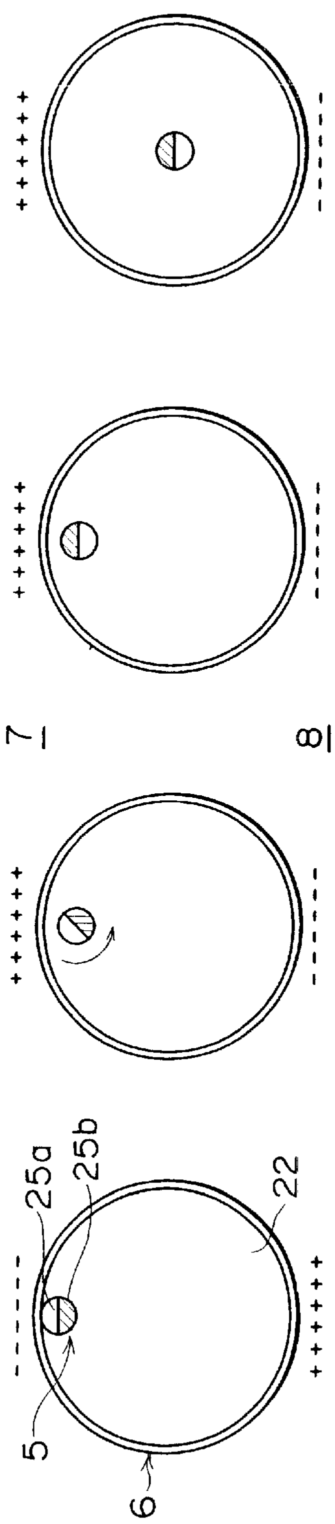
5
6
25a
25b
22
7
8
FIG.13A
FIG.13B
FIG.13C
FIG.13D
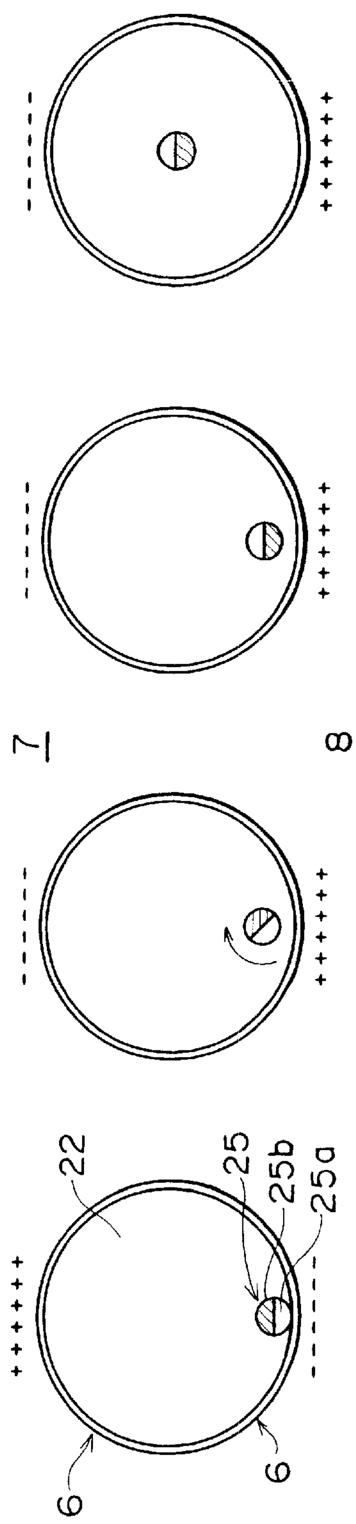
6
22
25
25b
25a
6
7
8
FIG.13E
FIG.13F
FIG.13G
FIG.13H E
31
7
6
9
8
2
25bB
25bG
25a
25
22Y
22M
22C
22
3
25b
10

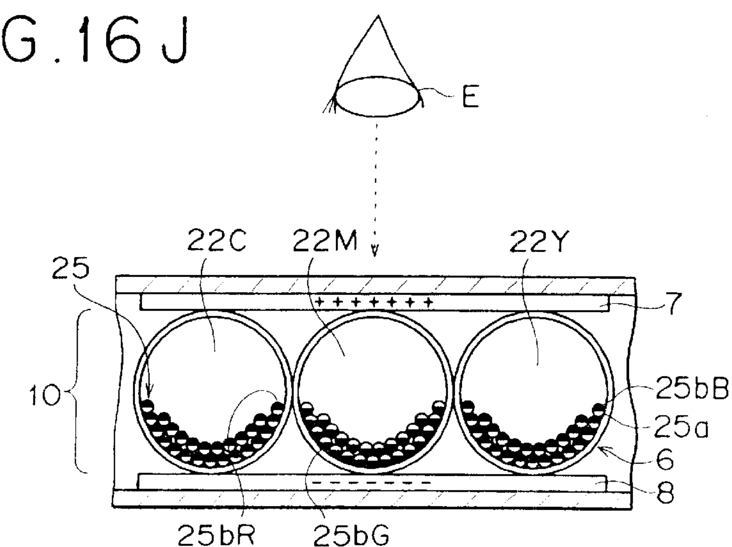
F I G.16J
E
22C
22M
22Y
25
7
10
25bB
25a
6
8
25bR
25bG
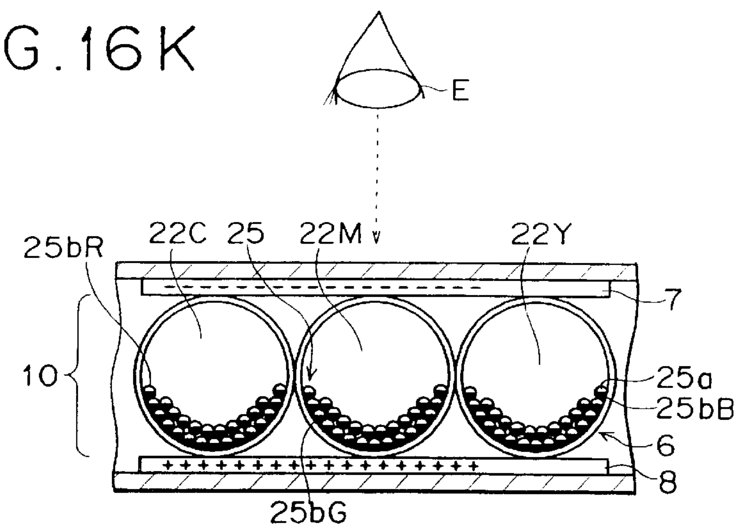
F I G.16K
E
25bR
22C
25
22M
22Y
7
10
25a
25bB
6
8
25bG
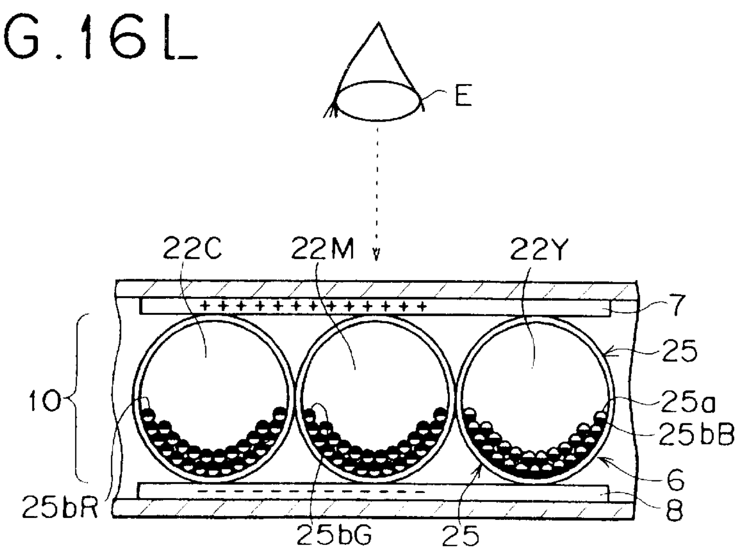
F I G.16L
E
22C
22M
22Y
7
25
10
25a
25bB
6
25bR
8
25bG
25

DISPLAY DEVICE AND METHOD OF DRIVING THE SAME

RELATED APPLICATION DATA

This application claims priority to Japanese Application No. P10-312723 filed Nov. 4, 1998 which application is incorporated herein by reference to the extent permitted by law.

BACKGROUND OF THE INVENTION

The present invention relates to a display device and a method of driving the display device, and particularly to a display device including small-sized two-color ball type electrophoretic particles each of which is composed of hemispherical portions different in color from each other for performing various kinds of display by making use of the electrophoretic particles, and a method of driving the display device.

In recent years, CRTs and liquid crystal displays have been mainly used as display devices. However, light emission type displays such as CRTs are not suitable for reading of documents, etc., because they cause fatigue of eyes of a viewer. Meanwhile, as for liquid crystal displays, a type adopting a backlight tends to cause fatigue of eyes like CRTs, and a type not adopting a backlight is disadvantageous in that the contrast is poor, which also tends to cause strong fatigue to eyes of a viewer if the viewer has a look at the screen for a long period of time. Also, these displays generally have no memory capabilities, to give rise to a disadvantage that an image disappears when a power supply is cut off.

In view of the foregoing, displays used for portable information equipment expected to be widespread for the future, for example, PDAs, note type personal computers and electronic book players, are required to be reduced in power consumption and to have a memory capability of images.

As the display capable of satisfying the above-described requirements to some extent, there have been known an electrophoretic display device and a two-color ball display device.

The electrophoretic display device is configured to make use of a principle in which electrophoretic particles composed of charged fine particles migrate toward an electrode having a polarity reversed to that of electric charges of the electrophoretic particles due to the effect of an electric field.

The electrophoretic display device has a configuration, for example, shown in FIG. 18, in which a transparent substrate 102 provided with transparent electrodes 101 made from ITO or the like is opposed to a substrate 104 provided with electrodes 103 not requiring transparency with a specific gap kept therebetween, and the gap formed between the transparent substrate 102 and the substrate 104 is filled with an electrophoretic particles 105 composed of, for example, white charged particles, and a dispersion medium 106 in which the electrophoretic particles 105 are dispersed. The electrophoretic particles 105 are made from, for example, a white pigment, and the dispersion medium 106 is colored into, for example, black.

In the above electrophoretic display device, as shown by a portion A in FIG. 18, if the electrophoretic particles 105 are negatively charged, when a plus voltage is applied to the transparent electrode 101 and a minus voltage is applied to the other electrode 103, the electrophoretic particles 105 migrate to the plus side electrode, that is, to the transparent electrode 101 by coulomb forces and adhere on the transparent electrode 101. When a viewer turns his eyes upon the portion A of electrophoretic display device from an eye position E shown in FIG. 18, he perceives through the transparent electrode 101 and the transparent substrate 102 that the portion, on which the white charged particles (electrophoretic particles 105) adhere, of the transparent electrode 101 is white-colored.

When the polarity of the applied voltage is reversed, as shown by a portion B in FIG. 18, the white charged particles (electrophoretic particles 105) migrate to the back side electrode, that is, to the electrode 103 and adhere thereon, and accordingly, they are hidden by the black dispersion medium 106. When a viewer turns his eyes upon the portion B from the eye position E in FIG. 18, he perceives that the portion B is black-colored. In addition, according to this electrophoretic display device, if the white charged particles (electrophoretic particles 105) adhere on the electrode 101 (or 103), they stand still for a short while after cutoff of the applied voltage.

In the above-described electrophoretic display device, either the color of the electrophoretic particles 105 or the color of the dispersion medium 106 is displayed. If the color of the electrophoretic particles 105 is white and the color of the dispersion medium 106 is black as described above, since the black dispersion medium 106 remains in gaps among the white particles 105 collected by migration, the display of clear white cannot be realized. If the color of the electrophoretic particles 105 is black and the color of the dispersion medium 106 is white, it is possible to realize the display of clear white by increasing the density of the white color of the dispersion medium 106;, however, in this case, upon black display, a dense white dispersion medium 106 remains in gaps among the black particles 105, so that the display of true black cannot be realized. As a result, it is difficult to obtain a high contrast ratio.

The two-color ball display device includes a plurality of two-color balls each typically having a white hemispherical portion and a colored half, for example blackened hemispherical portion, which are different from each other in terms of zeta-potential. Such a display device is operated on the basis of a principle in which a large number of the above two-color balls are rotated by the effect of an electric field.

The two-color display device has a configuration, for example, shown in FIG. 19 in which a transparent substrate 111 provided with transparent electrodes 110 made from ITO or the like is opposed to a substrate 113 provided with electrodes 112 not requiring transparency with a specific gap kept therebetween, and the above gap is filled with a large number of two-color balls 114 and a liquid 115 rotatably surrounding the two-color balls 114. In the example show n in FIG. 19, white hemispherical portions 114*a* of the two-color balls 114 are positively charged, and colored, for example, blackened hemispherical portions 114*b* thereof are negatively charged.

In this two-color ball display device , when a voltage (electric field) is applied between the electrodes 110 and 112 provided on the inner surfaces of the substrates 111 and 113 holding the two-color balls 114 as display media and the liquid 115 therebetween, each two-color ball 114 rotates on the basis of a relationship between the polarity thereof and correspons to the polarity of the voltage applied to the transparent electrode 110 or electrode 112 in such a manner that the colored hemispherical portion 114*b* is directed to the transparent substrate 111 side as shown by a portion A in FIG. 19 or directed to the substrate 113 side as shown by a portion B in FIG. 19. Accordingly, the white or black display can be realized by adjusting the rotation of the two-color balls 114. In the two-color ball display device, even if the supply of the voltage is cut off, the display state remains for a short while.

Even in the two-color ball display device shown in FIG. 19, however, it is difficult to obtain a high contrast ratio. This is because, the contrast between the colors of the two hemispherical portions of the two-color ball is high;, however, since a gap required for the liquid to enter between the two-color balls must be provided for rotating the two-color balls, the two-color balls cannot be closely packed.

To solve the above disadvantage, there has been proposed a display device shown in FIG. 20 in which two-color balls are arranged in multiple levels (multiple layers) for covering gaps among the two-color balls in the first layer with the two-color balls in the second layer. In such a display device, however, the white color in the second layer, which is affected by the black color in the first layer, becomes darker than the white layer in the first layer. As a result, according to this display device, it fails to obtain a sufficient effect to realize the display of clear white. Further, in this display device, since a distance between electrodes 110 and 112 becomes longer, there occurs a problem that a high voltage is required to be applied for driving the two-color balls.

In each of the two-color ball display devices shown in FIG. 19 and 20, since the display switching is performed by allowing the two-color balls to rotate and migrate, there occurs an inconvenience that it takes a time to perform the display switching.

Further, in the above electrophoretic display device and the two-color ball display device, only two colors can be displayed. To realize multi-color display of the electrophoretic display device, there may be considered a method in which cells filled with colored dispersion media of different colors, for example, the three primary colors of red, blue and green or cyan, magenta and yellow are regularly arranged, and white electrophoretic particles are dispersed in each of the colored dispersion media of the cells, wherein the white electrophoretic particles are allowed to migrate for each cell.

In this method, however, since the cells filled with the colored dispersion media of three colors are regularly arranged and must be driven through electrodes attached to respective cells, there occurs a problem that the production works become very complicated. Also, in this method, since the black display is realized by making visible the dispersion media of the three primary colors of red, blue and green or cyan, magenta and yellow, it is impossible to realize the display of dark black.

If the electrophoretic particles is colored into black for obtaining the true black display and each dispersion medium is colored into red, blue, or the like, the black display can be obtained when the electrophoretic particles are located on the transparent electrode side, however, when the particles migrate to the opposed electrode side, since light having passed through the colored dispersion medium is absorbed by the black electrophoretic particles, the visible color through the dispersion medium becomes darker than the actual color of the dispersion medium. Accordingly, the multi-color electrophoretic display device using the black electrophoretic particles can realize only the black display.

In the case of using a black dispersion medium and electrophoretic particles of the three primary colors of red, blue and green or cyan, magenta and yellow, the display of white, black, and other colors can be obtained;, however, even in this case, since the white display is realized by making visible the colors of the colored dispersion media of the three primary colors of red, blue and green or cyan, magenta and yellow, it is impossible to realize the display of clear white.

Similarly, to realize the multi-color display of the two-color ball display device, there may be considered a method in which balls of three kinds of different color, for example, a ball having white and magenta hemispherical portions, a ball having white and cyan hemispherical portions, and a ball having white and yellow hemispherical portions, are regularly arranged, and these balls are individually driven. Even in this method, however, since the different two-color balls must be regularly arranged and must be driven by electrodes attached to respective balls, there occurs a problem that the production works become very complicated. Further, even in this method, it is impossible to realize the display of true black and clear white.

By using two-color balls each being composed of a white hemispherical portion and a colored hemispherical portion colored into each of the three primary colors of red, blue and green or cyan, magenta and yellow, it is possible to realize the display of clear white;, however, since the black display is obtained by making visible the hemispherical portions of the three primary colors of red, blue and green or cyan, magenta and yellow, it is impossible to realize the display of true black. On the other hand, by using two-color balls each being composed of a black hemispherical portion and a colored hemispherical portion colored into each of the above three primary colors, it is possible to realize the display of true black, however, since the white display is obtained by making visible the hemispherical portions of the three primary colors, it is impossible to realize the display of clear white.

SUMMARY OF THE INVENTION

An object of the present invention is to provide a display device capable of realizing the display of clear white and true black, enhancing the contrast ratio, realizing high speed display switching, and performing multi-color display, and a method of driving the display device.

To achieve the above object, according to a first aspect of the present invention, there is provided a display device including: display media each of which has a dispersion medium and a large number of electrophoretic particles dispersed in the dispersion medium, the electrophoretic particles being driven by applying an electric field to each of the display media, to thereby perform a desired display operation; wherein the electrophoretic particles comprise small-sized two-color ball type electrophoretic particles (hereinafter, referred to as "two-color ball type particles") each of which is composed of a pair of hemispherical portions different from each other in terms of color or reflectance and charging characteristic; and the dispersion medium comprises a colorless/transparent dispersion medium.

With this configuration, since the electrophoretic particles dispersed in the dispersion medium is composed of the small-sized two-color ball type particles each of which is composed of a pair of hemispherical portions different from each other in terms of color or reflectance and charging characteristic, when the two-color ball type particles migrate to the display screen side by applying an electric field to the display medium, they are closely collected on the display screen side in such a manner that the hemispherical portions thereof on the display screen side are viewed to be closely packed, showing the color of only one side of the hemispherical portion. Also, since the dispersion medium is colorless and transparent, even if being present in gaps among the two-color ball type particles, it does not exert adverse effect on the display color. As a result, the color of the hemispherical portions on the display screen side are displayed without effect of the dispersion medium, and accordingly, if one of the pair of hemispherical portions of each two-color ball type particle is colored into white and the other is colored into black, it is possible to realize the display of clear white and true black.

The display device according to the first aspect of the present invention may include a control means for controlling a time required for applying an electric field to each of the display media in such a manner that the electric field is applied to the display medium for only a time required for the two-color ball type electrophoretic particles present on the display screen side of the display medium or the side opposed to the display screen side of the display medium to be reversed, but to migrate before reaching to the opposed side or to the display screen side. With this configuration, since the display of the color of one of the pair of hemispherical portions of each two-color ball type particle can be switched to the color of the other by applying an electric field only for a time required for the two-color ball type particle to be reversed, it is possible to shorten the display switching time.

Each of the media may be formed by filling a microcapsule with the dispersion medium and the two-color ball type electrophoretic particles. With this configuration, it is possible to prevent localization of the two-color ball type particles and to simplify the production of the display device.

To achieve the above object, according to a second aspect of the present invention, there is provided a display device including: display media each of which has a dispersion medium and a large number of electrophoretic particles dispersed in the dispersion medium, the electrophoretic particles being driven by applying an electric field to each of the display media, to thereby perform a desired display operation; wherein the electrophoretic particles comprise small-sized two-color ball type electrophoretic particles each of which is composed of a pair of hemispherical portions different from each other in terms of color or reflectance and charging characteristic; and the dispersion medium comprises a colored dispersion medium.

With this configuration, since the electrophoretic particles are composed of the small-sized two-color ball type particles each of which is composed of a pair of hemispherical portions different from each other in terms of color or reflectance and charging characteristic, when each two-color ball type particle migrates to the display screen side, the color of one of the pair of the hemispherical portions of the two-color ball type particle is displayed. Accordingly, if one of the pair of hemispherical portions of the two-color ball type particle is colored into white and the other is colored into black, it is possible to realize the display of clear white and true black. Further, since the dispersion medium is composed of the colored dispersion medium, if one of the pair of hemispherical portions of each two-color ball type particle is colored into white which reflects light, when the two-color ball type particle migrates to the side opposed to the display screen side in such a manner that the white hemispherical portion of the two-color ball type particle is directed to the display screen side, the color of the colored dispersion medium can be displayed. Accordingly, it is possible to realize the display of a plurality of different colors.

The display device according to the second aspect of the present invention may include a control means for controlling a time required for applying an electric field to each of the display media in such a manner that the electric field is applied to the display medium only for a time required for the two-color ball type electrophoretic particles present on the display screen side of the display medium or the side opposed to the display screen side of the display medium to be reversed, but to migrate before reaching to the opposed side or to the display screen side. With this configuration, like the display device according to the first aspect of the present invention, it is possible to shorten the display switching time.

In this display device, preferably, the colored dispersion medium comprises each of colored dispersion media having a plurality of different colors; the display media are classified into groups each having a large number of the two-color ball type electrophoretic particles and the colored dispersion medium having each of the plurality of different colors; and the one group of the display media forms one pixel. With this configuration, it is possible to realize the display of the colors of the pair of hemispherical portions of each two-color ball type particle and the colors of the plurality of colored dispersion media, and hence to realize the multicolor display.

The two-color ball type electrophoretic particles contained in each of the group of the display media forming the pixel may have an electrophoretic mobility and a rotational threshold voltage which vary from each of the display media. With this configuration, even if a plurality of the display media are driven by applying the same electric field thereto, the action of the two-color ball type particles differs for each of the display media, so that it is possible to realize the display of the color which differs depending on a drive voltage (drive potential) or drive time. For example, by applying an electric field allowing two-color ball type particles having a high drive voltage required for electrophoresis and rotation to sufficiently rotate and migrate, and then applying a reverse electric field allowing only two-color ball type particles having a low drive voltage required for electrophoresis and rotation to rotate and migrate, a state in which only the two-color ball type particles having the high drive voltage required for electrophoresis and rotation have rotated and migrated can be obtained.

The two-color ball type electrophoretic particles contained in each of the group of the display media forming the pixel may have an electrophoretic mobility and a rotational threshold voltage each of which has a distribution in each of the display media. With this configuration, since the visible area of the colored dispersion medium is changed depending on the high or low relationship of the drive voltage or the strong or weak relationship of the electric field required for electrophoresis and rotation, it is possible to realize the display of the color with a different density, that is, color gradation.

Each of the media may be formed by filling a microcapsule with the dispersion medium and a large number of the two-color ball type electrophoretic particles. With this configuration, like the display device according to the first aspect of the present invention, it is possible to prevent localization of the two-color ball type particles and to simplify the production of the display device.

To achieve the above object, according to a third aspect of the present invention, there is provided a display device including: display media each of which has a dispersion medium and a large number of electrophoretic particles dispersed in the dispersion medium, the electrophoretic particles being driven by applying an electric field to each of the display media, to thereby perform a desired display operation; wherein the electrophoretic particles comprise small-sized two-color ball type electrophoretic particles each of which is composed of a pair of hemispherical portions different from each other in terms of color or reflectance and charging characteristic; the dispersion medium comprises a colored dispersion medium; and one of the pair of hemispherical portions of each of the two-color ball type electrophoretic particles is colored into white and the other is colored into a color having a complementary relationship with a color of the colored dispersion medium.

With this configuration, since the electrophoretic particles are composed of the small-sized dichronic ball type particles each of which is composed of a pair of hemispherical portions different from each other in terms of color or reflectance and charging characteristic, like the first aspect of the present invention, when each two-color ball type particle migrates to the display screen side, the color of one of the pair of hemispherical portions, that is, the color of white or the color having a complementary relationship with the color of the colored dispersion medium is displayed. Accordingly, it is possible to realize the display of clear white. Also, when each of the two-color ball type particle migrates to the opposed side to the display screen side in such a manner that the white hemispherical portion is directed to the opposed side to the display screen side, since light having passed through the colored dispersion medium is absorbed by the hemispherical portion whose color has the complementary relationship with the color of the colored dispersion medium, the portion is appeared black-colored from the display screen side. Accordingly, it is possible to realize the display of true black when viewed from the display screen side as compared with the related art black display which is obtained by making visible mixture of red, green and blue. Further, since the dispersion medium is composed of the colored dispersion medium, when the two-color ball type particle migrates to the opposed side to the display screen side in such a manner that the white-colored hemispherical portion thereof is directed to the display screen side, the color of the colored dispersion medium is displayed. As a result, it is possible to realize the display of a plurality of different colors.

The display device according to the third aspect of the present invention may include a control means for controlling a time required for applying an electric field to each of the display media in such a manner that the electric field is applied to the display medium only for a time required for the two-color ball type electrophoretic particles present on the display screen side of the display medium or the side opposed to the display screen side of the display medium to be reversed, but to migrate before reaching to the opposed side or to the display screen side. With this configuration, like the display device according to the first aspect of the present invention, it is possible to shorten the display switching time.

Further, when an electric field is applied by the above control means in a state in which the two-color ball type particle is present on the display screen side in such a manner that the white hemispherical portion is directed to the display screen side, the two-color ball type particle is reversed in a state being substantially kept at the present position, so that the color having the complementary relationship with the color of the colored dispersion medium is displayed. On the other hand, when an electric field is applied by the above control means in a state in which the two-color ball type particle is present on the opposed side to the display screen in such a manner that the black hemispherical portion is directed to the display screen side, the two-color ball type particle is reversed in a state being substantially kept at the present position, so that the white hemispherical portion is directed to the display screen side, and thereby the color of the colored dispersion medium is displayed. As a result, it is possible to realize the display of four colors by one display medium.

In this display device, preferably, the colored dispersion medium comprises each of colored dispersion media having a plurality of different colors; the display media are classified into groups by color each having a large number of the two-color ball type electrophoretic particles and the colored dispersion medium having each of the plurality of different colors; and the one group of the display media forms one pixel. With this configuration, it is possible to realize the display of the colors of the pair of hemispherical portions of each two-color ball type particle and the colors of the plurality of colored dispersion media, and hence to realize the multi-color display.

The two-color ball type electrophoretic particles contained in each of the group of the display media forming the pixel may have an electrophoretic mobility and a rotational threshold voltage which vary from each of the display media. With this configuration, even if a plurality of the display media are driven by applying the same electric field thereto, the action of the two-color ball type particles differs for each of the display media, so that it is possible to realize the display of the color which differs depending on a drive voltage (drive potential) or drive time. For example, by applying an electric field allowing two-color ball type particles having a high drive voltage required for electrophoresis and rotation to sufficiently rotate and migrate, and then applying a reverse electric field allowing two-color ball type particles having a low drive voltage required for electrophoresis and rotation to rotate and migrate, a state in which only the two-color ball type particles having the high drive voltage required for electrophoresis and rotation have rotated and migrated can be obtained.

The two-color ball type electrophoretic particles contained in each of the group of the display media forming the pixel may have an electrophoretic mobility and a rotational threshold voltage each of which has a distribution in each of the display media. With this configuration, like the display device according to second aspect of the present invention, since the visible area of the dispersion medium is changed depending on the high or low relationship of the drive voltage or the strong or weak relationship of the electric field required for electrophoresis and rotation, it is possible to realize the display of the color with a different density, that is, color gradation.

Each of the media may be formed by filling a microcapsule with the dispersion medium and the two-color ball type electrophoretic particles. With this configuration, like the display device according to the first aspect of the present invention, it is possible to prevent localization of the two-color ball type particles and to simplify the production of the display device.

To achieve the above object, according to a fourth aspect of the present invention, there is provided a method of driving a display device including the steps of: preparing a display device including pixels each of which has a plurality of display media, each of the display media being formed by dispersing a large number of small-sized two-color ball type electrophoretic particles, each being composed of a pair of hemispherical portions different from each other in terms of color or reflectance and charging characteristic, in each of colored dispersion media having a plurality of colors, wherein a drive voltage of the two-color ball type particles differs for each of the display media; and applying an electric field to each of the display media, to drive the two-color ball type electrophoretic particles, thereby performing a desired display operation; wherein the two-color ball type electrophoretic particles in each of the plurality of display media are classified into a first group having a high drive voltage and a second group having a low drive voltage; an electric field allowing the first group having a high drive voltage to sufficiently rotate and migrate is applied and then a reverse electric field allowing only the second group having a low drive voltage to rotate and migrate is applied, to form a state in which only the first group having a high drive voltage has rotated and migrated.

With this configuration, since an electric field allowing the first group having a high drive voltage to sufficiently rotate and migrate is applied and then a reverse electric field allowing only the second group having a low drive voltage to rotate and migrate is applied, to form a state in which only the two-color ball type particles of the first group having a high drive voltage has rotated and migrated, the visible area of the colored dispersion medium is changed depending on the high or low relationship of the drive voltage or the strong or weak relationship of the electric field. As a result, it is possible to realize the display of different colors and the display of the color with a different density (gradation display).

BRIEF DESCRIPTION OF THE DRAWINGS

FIGS. 3A to 3H are detailed views showing the action of a two-color ball type particle when an electric field is applied between electrodes for the display device according to the first embodiment and a second embodiment;

FIGS. 10A to 10C are detailed sectional side views showing variations of the second embodiment of the display device;

FIG. 13A to 13H are detailed views illustrating the action of a two-color ball type particle when an electric field is applied between electrodes for the display device according to the third embodiment and a fourth embodiment of the present invention;

DETAILED DESCIRPTION OF THE PREFERRED EMBODIMENTS

Hereinafter, preferred embodiments of the present invention will be described in detail with reference to the accompanying drawings.

First Embodiment

Figure 1:
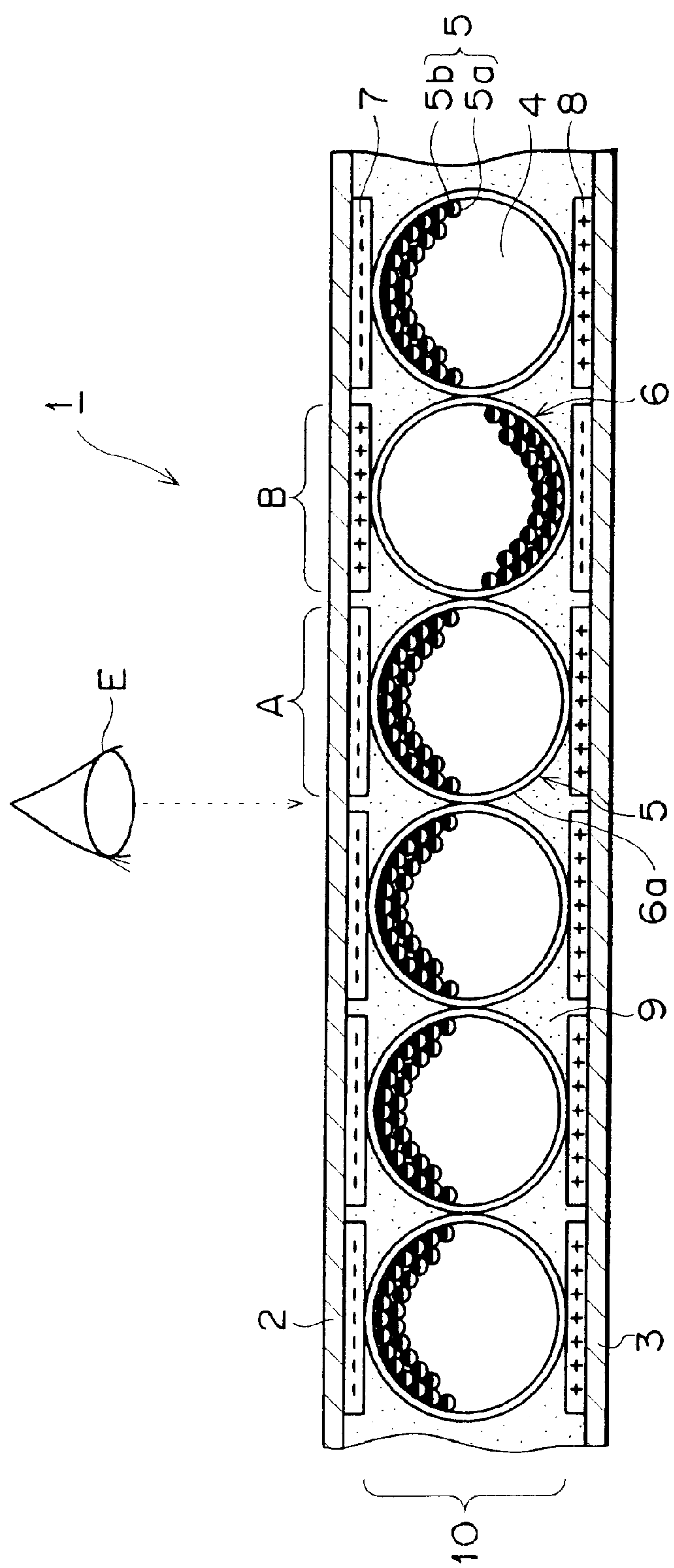
FIG. 1 is a detailed sectional side view showing the schematic configuration of a first embodiment of a display device of the present invention.

FIG. 1 is an enlarged sectional side view showing the schematic configuration of a first embodiment of a display device of the present invention. Referring to FIG. 1, a display device 1 is configured as an electrophoretic display device in which a transparent or translucent substrate 2 made from a glass sheet or plastic sheet is opposed to a counter substrate 3 made from a glass substrate or plastic sheet with a specific gap kept therebetween, and a number of micro-capsules 6 are enclosed in the gap. The micro-capsule 6 contains a dispersion medium 4 and a large number of small-sized two-color ball type electrophoretic particles (hereinafter, referred to as "two-color ball type particles") 5 dispersed in the dispersion medium 4.

Stripes of transparent electrodes 7 made from ITO (Indium Tin Oxide) are formed in parallel to each other on the inner surface of the transparent substrate 2, and similarly, stripes of counter electrodes 8 made from ITO or aluminum are formed in parallel to each other on the inner surface of the counter substrate 3. These transparent electrodes 7 and the counter electrodes 8 are perpendicular to each other, to thereby allow matrix drive of the display device. It should be noted that in FIG. 1, to enhance the understanding of operation of the display device, the transparent substrate 2 is depicted as being 90° turned from the actual position, and thereby the transparent electrodes 7 and the counter electrodes 8 are viewed to be in parallel to each other.

The micro-capsules 6, each of which constitutes a display medium of the present invention, are arranged in one layer, ideally in a close-packed state between the transparent substrate 2 and the counter substrate 3, and are fixed between the substrates 2 and 3 by means of a fixative 9 such as a UV (Ultraviolet) adhesive, to form a micro-capsule layer 10. The micro-capsule 6 is composed of a transparent capsule 6*a* having a diameter of about several tens μm, and the dispersion medium 4 and a large number of the small-sized two-color ball type particles 5 contained in the capsule 6*a*. Such micro-capsules 6 can be produced in accordance with a known method, and particularly, in accordance with a chemical method to have various functions such as a barrier property.

A large number of the two-color ball type particles 5 contained in the capsule 6*a* are each composed of a pair of hemispherical portions different from each other in terms of color, or reflectance and charging characteristic, and are provided in such a manner as to be able to rotate in the capsule 6*a* and migrate between the transparent substrate 2 and the counter substrate 3, that is, in the vertical direction in FIG. 1. The particle size of the two-color ball type particle 5 is much smaller than that of a two-color ball having been used for a related art display device, and for example, it is substantially the same as that of an electrophoretic particle having been used for a related art electrophoretic display device.

In this embodiment, each two-color ball type particle 5 is composed of a white hemispherical portion 5*a* positively charged, which is taken as a white display portion, and a black hemispherical portion 5*b* negatively charged, which is taken as a black display portion. The two-color ball type particles 5 are typically produced by preparing small-sized glass balls or polyethylene balls filled with a white material such as titanium dioxide, putting these glass balls or polyethylene balls in a vacuum deposition chamber, and coating hemispherical portions of the balls with a black material such as a mixture of antimony sulfide and magnesium fluoride.

The two-color ball type particles 5 are dielectric substances and also the dispersion medium 4 surrounding the two-color ball type particles 5 is a dielectric substance. Accordingly the dielectric ball type particles 5 and the dispersion medium 4 are both electrically neutral from the macroscopic viewpoint, however, an electric double layer is formed around each two-color ball type particle 5 from the microscopic viewpoint. A zeta-potential is known as a measurable aspect of such an electric double layer, which zeta-potential has a function of the ball surface material on the assumption that the dispersion medium 4 is made from a specific liquid. To be more specific, the characteristics of the zeta-potential is caused depending on a difference in property between materials causing a difference in color, or reflectance and charging characteristic between the white hemispherical portion 5*a* and the black hemispherical portion 5*b* of the two-color ball type particle 5.

As a result, when an electric field is applied between the transparent electrode 7 and the counter electrode 8, that is, applied to the micro-capsule 6, the two-color ball type particle acts as a dipole due to a difference in zeta-potential between the white hemispherical portion 5*a* and the black hemispherical portion 5*b* and rotates, as will be described later, in the dispersion medium 4 until the dipole moment corresponds to the direction of the electric field.

When a difference in charged amount is previously given between the white hemispherical portion 5*a* and the black hemispherical portion 5*b*, monopole charges in addition to the dipole charges occur on the two-color ball type particle 5. In the case where the two-color ball type particle 5 is, for example, positively charged depending on the positive or negative polarity (or charging characteristic) of the monopole charges, that is, the zeta-potential of the entire two-color ball type particle 5, the two-color ball type particle 5 migrates to the minus side electrode (transparent electrode 7 or counter electrode 8) to be brought into contact with the inner wall of the capsule 6*a*.

After being in contact with the inner wall of the capsule 6*a*, the two-color ball type particle 5 is prevented from rotating due to a frictional force acting therebetween until it is separated from the inner wall of the capsule 6*a* again by the action of the monopole charges. Accordingly, for a short while after the electric field is cut off, the two-color ball type particle 5 remains at the contact position. In other words, the display device can keep a display image, that is, has a memory capability.

The dispersion medium 4 constituting one component of the micro-capsule 6, which is contained in the capsule 6*a* together with the two-color ball type particles 5, functions to surround and hold the two-color ball type particles 5 in such a manner as to allow the particles 5 to rotate and vertically migrate. The dispersion medium 4 is made from a colorless/transparent material, for example, a non-volatile oil such as alkyl naphthalene, diallyl ethane, alkyl biphenyl, or triallyl dimethane; a low viscosity silicone oil; or a plant or animal oil. A charge control agent, dispersant, lubricant, and stabilizer are added to the dispersion medium 4 as needed.

While not shown, the display device 1 also includes an electric field applying means for applying an electric field between a portion, on the transparent electrode 7 side (display screen side), of the micro-capsule 6 and a portion, on the counter electrode 8 side (opposed to the display screen), of the micro-capsule 6; and a control means for controlling a time required to apply an electric field between the transparent electrode 7 and the counter electrode 8 in such a manner that the electric field is applied between the transparent electrode 7 and the counter electrode 8 for a time required for the two-color ball type particle 5 present between the transparent electrode 7 and the counter electrode 8 to be reversed but to migrate before reaching to the counter electrode 8 side or transparent electrode 7 side, that is, only for a time required for the two-color ball type particle 5 to be reversed. The control means is designed to control a time required for applying an electric field by adjusting the electric field applying means in such a manner as to cut off the electric field applied between the transparent electrode 7 and the counter electrode 8.

The operation of the display device 1 will be described below.

It is assumed that, as described above, the white hemispherical portions 5*a* of the two-color ball type particles 5 are negatively charged and the black hemispherical portions 5*b* thereof are positively charged, and the charged amount of the black hemispherical portions 5*b* is larger than that of the white hemispherical portions 5*a*, with a result that the whole of the two-color ball type particles 5 has the same polarity as that of the black hemispherical portion 5*b*, that is, it is positively charged.

When on the above assumption, a minus electric field is applied to the transparent electrode 7 side and a plus electric field is applied to the counter electrode 8 side as shown by a portion A in FIG. 1, the two-color ball type particles 5 rotate in such a manner that the black hemispherical portions 5*b* thereof are directed to the transparent electrode 7 side. At this time, since the charged amount of the black hemispherical portions 5*b* is larger than that of the white hemispherical portions 5*a*, and thereby the two-color ball type particles 5 are positively charged as a whole, the two-color ball type particles 5 migrate to the minus side electrode, that is, to the transparent electrode 7.

Figure 2A:
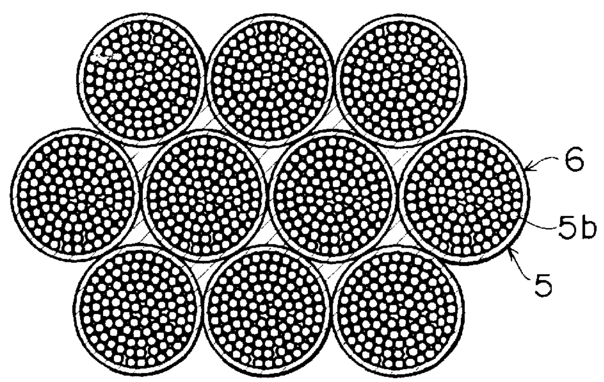
FIG. 2A is a view illustrating a black display state of the display device shown in FIG. 1.

As a result, when a viewer turns his eyes upon the portion A from an eye position E in FIG. 1, he gets a look at the black hemispherical portions 5*b* of a large number of the two-color ball type particles 5. At this time, the viewer perceives that the portion A is black-colored. More concretely, when the viewer turns his eyes upon a group of the portions A (display device) from the eye position E in FIG. 1, as shown in FIG. 2A, he perceives that while gaps between the micro-capsules 6 are gray-colored as shown by rough hatching in the figure, the black hemispherical portions 5*b* in each micro-capsule 6 are substantially closely packed, so that the group of the portions A is viewed sufficiently black-colored as a whole. In this case, the black display is established.

On the contrary, when a plus electric field is applied to the transparent electrode 7 side and a minus electric field is applied to the counter electrode 8 side as shown by a portion B in FIG. 1, the two-color ball type particles 5 rotate in such a manner that the black hemispherical portions 5*b* thereof are directed to the counter electrode 8 side and the white hemispherical portions 5*a* are directed to the transparent electrode 7 side. At this time, since the two-color ball type particles 5 are positively charged as a whole, they are to migrate to the minus side electrode, that is, to the counter electrode 8.

Figure 2B:
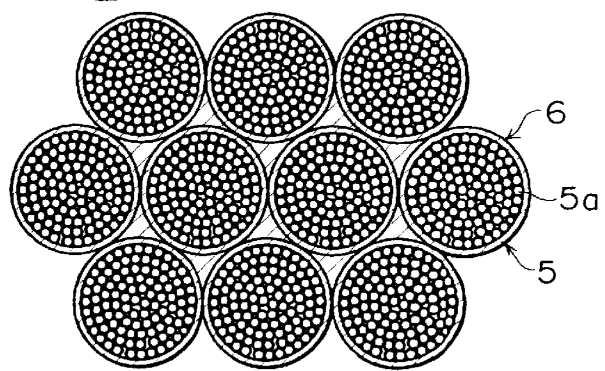
FIG. 2B is a view illustrating a white display state of the display device shown in FIG. 1.

As a result, when a viewer turns his eyes upon the portion B from the eye position E in FIG. 1, he gets a look at the white hemispherical portions 5*a* of a large number of the two-color ball type particles 5, so that the viewer perceives that the portion B is white-colored at this time. More concretely, when the viewer turns his eyes upon a group of the portions B from the eye position E in FIG. 1, as shown in FIG. 2B, he perceives that while gaps between the micro-capsules 6 are slightly gray-colored as shown by rough hatching in the figure, the white hemispherical portions 5*a* of a large number of the two-color ball type particles 5 in each micro-capsule 6 are substantially closely packed, with a result that the group of the portions B is sufficiently white-colored as a whole. Thus, the white display is established.

Figure 2C:
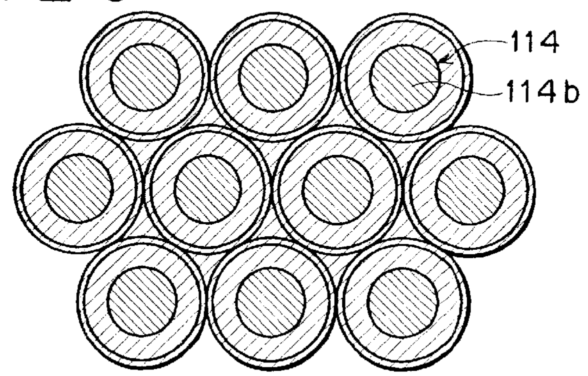
FIG. 2C is a view illustrating a black display state of a related art display device.
Figure 19:
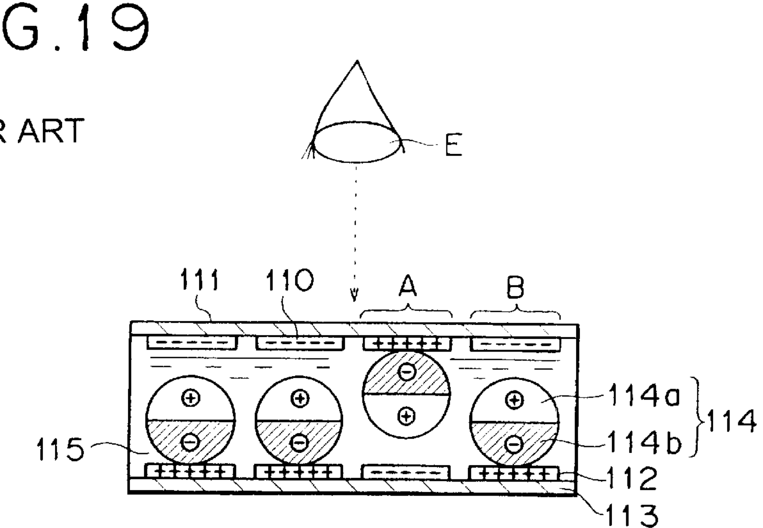
FIG. 19 is a detailed sectional side view showing one example of a related art two-color ball display device.
Figure 20:
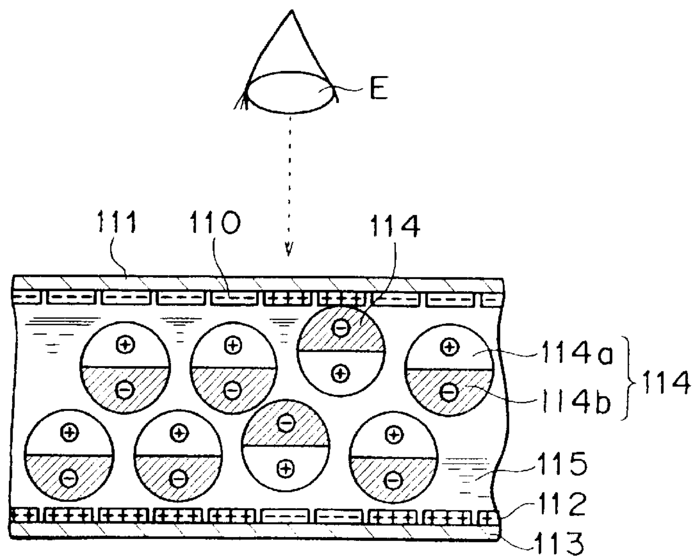
FIG. 20 is a detailed sectional side view showing another example of the related art two-color ball display device.

In the related art two-color ball type particle display device, upon black display, the sight caught by a viewer is not sufficiently black-colored as shown in FIG. 2C. To be more specific, for the related art display device shown in FIG. 19, the black hemispherical portions 114*b* of the two-color ball type particles 114 are visible, however, since the particle size of the two-color ball type particle 114 is much larger than that of the two-color ball type particle 5 in this embodiment and also the large gaps are present between the two-color ball type particles 114, the areas of portions viewed to be gray-colored become large as shown by rough hatching in FIG. 2C, with a result that the group of the two-color ball type particles 114 does not present sufficient black color as a whole. Accordingly the degree of blackness upon black display in the related art display device is significantly lower than that in the display device 1 in this embodiment.

Figure 2D:
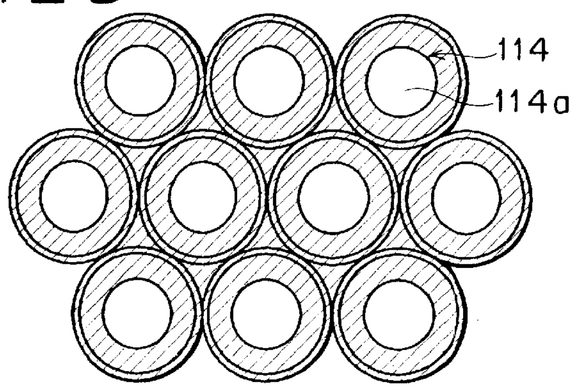
FIG. 2D is a view illustrating a white display state of the related art display device.

Similarly, upon white display, the sight caught by a viewer is not sufficiently white-colored as shown in FIG. 2D. To be more specific, in the case of the related art display device, the white hemispherical portions 114*a* of the two-color ball type particles 114 are visible, however, since the areas of portions viewed to be gray-colored become large as shown by rough hatching in FIG. 2D, the group of the two-color ball type particles 114 is viewed not to be sufficiently white-colored as a whole. Accordingly the degree of whiteness upon white display in the related art display device is significantly lower than that in the display device 1 in this embodiment.

Figure 18:
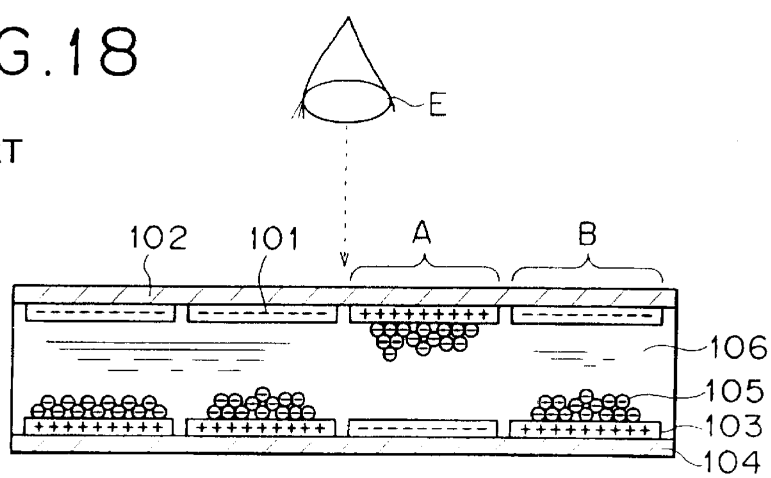
FIG. 18 is a detailed sectional side view showing one example of a related art electrophoretic display device.

For the related art electrophoretic display device shown in FIG. 18, upon white display, it may be estimated that the sight caught by a viewer is sufficiently white-colored as shown in FIG. 2B, however, actually, since the black dispersion medium is present (that is, visible) between the white electrophoretic particles on the front side, the sight caught by a viewer is not sufficiently white-colored. On the contrary, in the case of the display device 1 in this embodiment, since the dispersion medium 4 is colorless and transparent and further any black dispersion medium is not present between the white hemispherical portions 5*a* of the two-color ball type particles 5, there is no disadvantage in that the white display becomes impure, unlike the related art electrophoretic display device.

The migration of the two-color ball type particle 5 in the display device 1 according to this embodiment due to an electric field applied between the transparent electrode 7 and the counter electrode 8 will be described in detail with reference to FIGS. 3A to 3H. When a minus electric field is applied to the transparent electrode 7 side and a plus electric field is applied to the counter electrode 8 side as shown in FIG. 3A, the two-color ball type particle 5 is located in a state being offset on the minus side, that is, on the transparent electrode 7 side in such a manner that the black hemispherical portion 5*b* is directed to the transparent electrode 7 side and the white hemispherical portion 5*a* is directed to the counter electrode 8 side.

When a reversed electric field is applied between the transparent electrode 7 and the counter electrode 8 in the state shown in FIG. 3A, the two-color ball type particle 5 slightly migrates to the counter electrode 8 side and starts to rotate as shown in FIG. 3B, and is then reversed in such a manner that the black hemispherical portion 5*b* is directed to the counter electrode 8 side and the white hemispherical portion 5*a* is directed to the transparent electrode 7 side as shown in FIG. 3C. Thereafter, the two-color ball type particle 5 starts to migrate to the counter electrode 8 side as shown in FIG. 3D, and is finally located in a state being offset on the counter electrode 8 side as shown in FIG. 3E.

When the polarity of the electric field is reversed again, that is, a minus electric field is applied to the transparent electrode 7 side and a plus electric field is applied to the counter electrode 8 side, the two-color ball type particle 5 slightly migrates to the transparent electrode 7 side and starts to rotate as shown in FIG. 3F, and is reversed in such a manner that the black hemispherical portion 5*b* is directed to the transparent electrode 7 side and the white hemispherical portion 5*a* is directed to the counter electrode 8 side as shown in FIG. 3G. After that, the two-color ball type particle 5 starts to migrate to the transparent electrode 7 side as shown in FIG. 3H, and is finally located in a state being offset on the transparent electrode 7 side as shown in the original figure, FIG. 3A.

As is apparent from the shift of the above states, the color change occurs when the state shown in FIG. 3A is shifted to the state shown in FIG. 3C, or the state shown in FIGS. 3E is shifted to the state shown in FIG. 3G. Accordingly, an electric field may be applied for a time required for shifting the state shown in FIG. 3A to the state shown in FIG. 3C or from the state shown in FIG. 3E to the state shown in FIG. 3G, that is, only a time required for the two-color ball type particle 5 to be reversed but not to complete migrating from the present position to the opposed electrode 7 or 8. With this configuration, it is possible to switch the display (from black to white and vice versa, in this case) for a very short time as compared with the general electrophoretic display device. From this viewpoint, according to the display device 1 including, as described above, the control means for controlling a time required for applying an electric field between the transparent electrode 7 and the counter electrode 8 in such a manner that the electric field is applied therebetween only for a time required for the two-color ball type particle 5 to be reversed, it is possible to realize high speed display switching operation.

As described above, according to the display device 1 in this embodiment, the display medium is configured by dispersing a large number of the small-sized two-color ball type particles 5 in the colorless/transparent dispersion medium 4. As a result, upon white display, the white hemispherical portions 5*a* of the two-color ball type particles 5 are viewed to be substantially closely packed, and upon black display, the black hemispherical portions 5*b* of the two-color ball type particles 5 are viewed to be substantially closely packed. Also the dispersion medium 4, which is made from a colorless/transparent material, does not exert adverse effect on the color of the gaps between the two-color ball type particles 5. As a result, it is possible to establish the display of clear white and true black, and hence to realize the display of white and black with a high contrast ratio.

Since the micro-capsule 6 is composed of the capsule 6*a* containing a large number of the two-color ball type particles 5 and the dispersion medium 4, it is possible to prevent localization of the two-color ball type particles 5, to simplify the production of the display device 1, and to improve workability in formation of the display device 1 into a sheet or panel shape. Also, since the display device 1 includes the control means for controlling a time required for applying an electric field between the transparent electrode 7 and the counter electrode 8 in such a manner that the electric field is applied therebetween only for a time required for the two-color ball type particle 5 to be reversed, it is possible to realize high speed display switching operation.

In this way, according to the first embodiment, it is possible to realize the display device 1 having advantages in creating the display good for eyes without causing the fatigue of eyes, reducing the power consumption, and acquiring a memory capability, similar to those of the related art electrophoretic display device and the two-color ball type particle display device, and also having further advantages in enhancing the contrast ratio and simplifying the production of the display device 1. In addition, the display device 1 can realize high speed display switching operation, although the memory capability thereof is slightly poor as compared with the above-described related art display devices.

While the micro-capsules 6 are used in the first embodiment, pixels each having a cell structure may be employed for partitioning from each other.

Figure 4A:
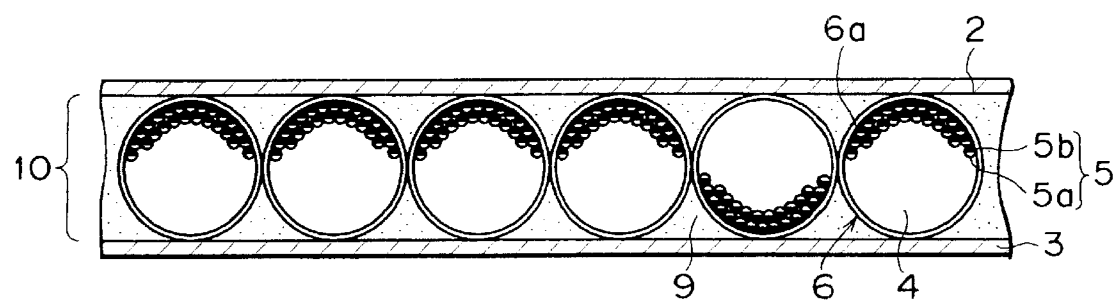
FIGS. 4A to 4C are detailed sectional side views showing variations of the first embodiment of the display device.
Figure 4B:
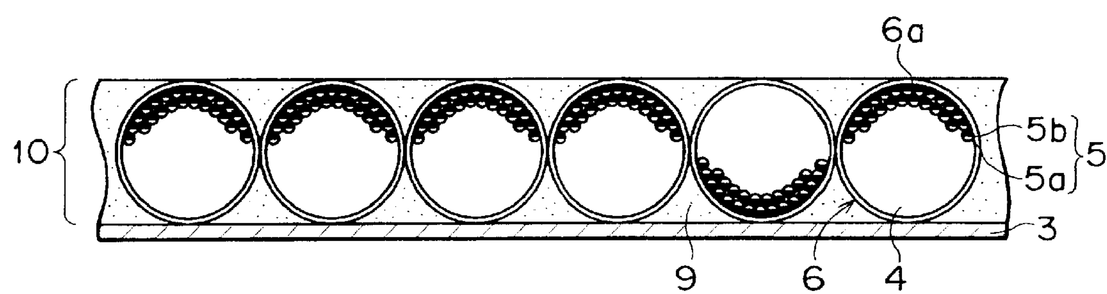
Figure 4C:
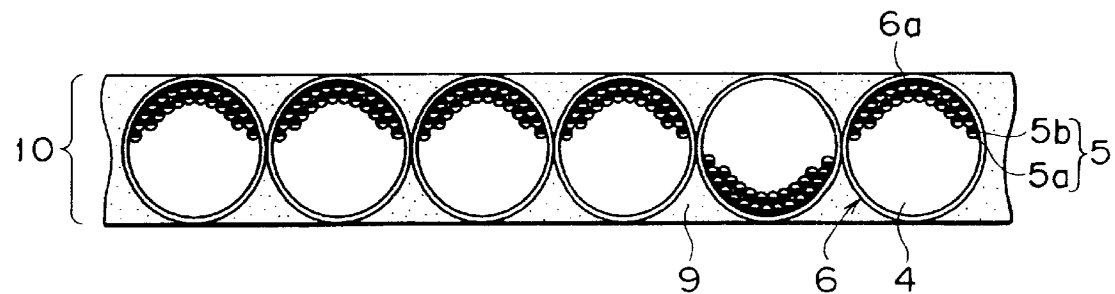

In the display device 1 according to the first embodiment, the transparent electrodes 7 are provided on the transparent substrate 2 and the counter electrodes 8 are provided on the counter substrate 3, however, the present invention is not limited thereto. For example, there may be adopted a structure shown in FIG. 4A in which no electrodes are provided, a structure shown in FIG. 4B in which one substrate is omitted, or a structure shown in FIG. 4C in which both the substrates are omitted.

Even for the structure in which no electrodes are provided, by applying an electric field from an external power source to the display media each of which is composed of the two-color ball type particles 5 and the dispersion medium 4, the display corresponding to the applied electric field can be realized. The structure in which no electrodes are provided is advantageous in reducing the production cost of the display device 1, improving flexibility of the display device 1, and eliminating the inconvenience caused by the structure having the transparent electrodes, that the surface reflection of the transparent electrodes obstructs the display.

Second Embodiment

Figure 5:
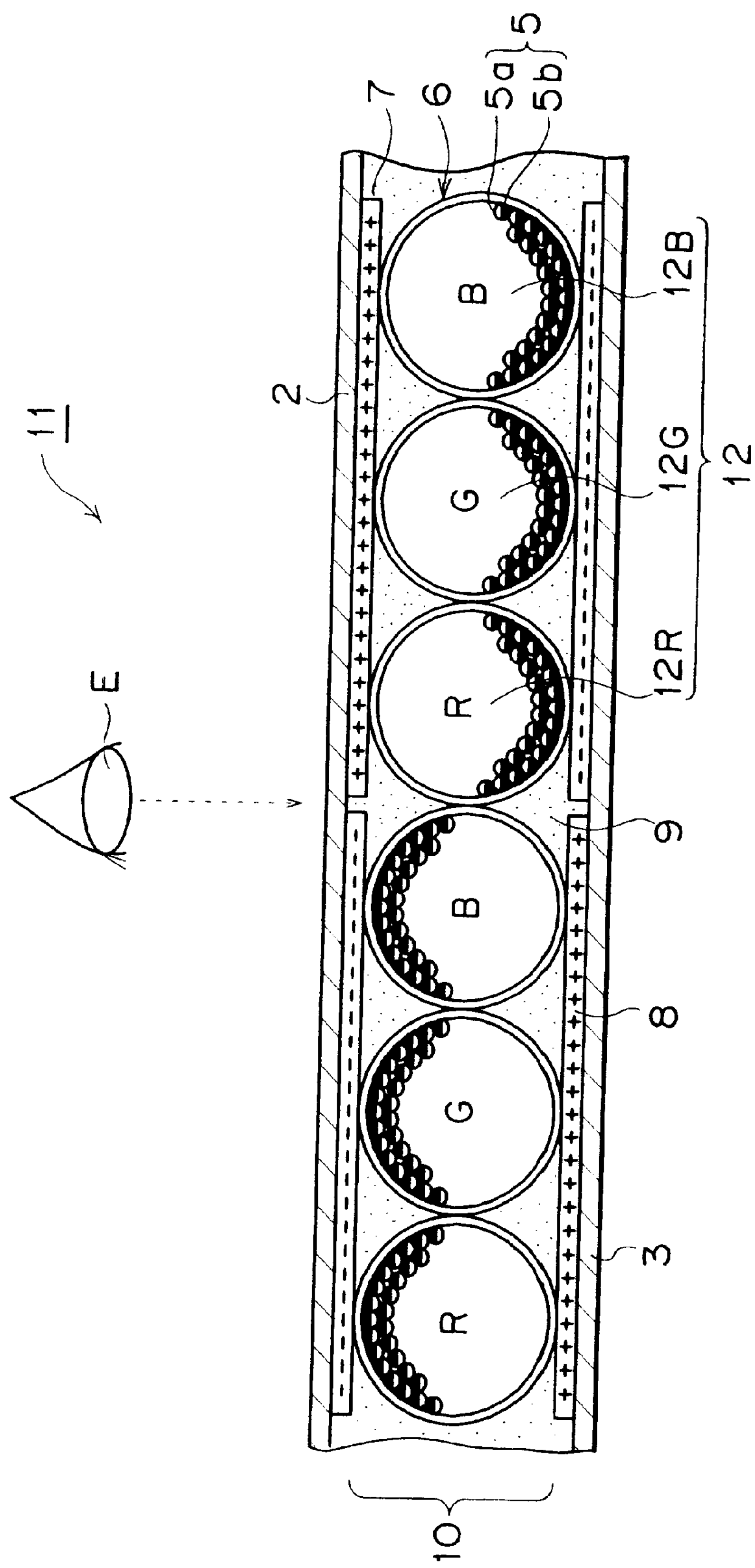
FIG. 5 is a detailed sectional side view showing the schematic configuration of the second embodiment of the display device of the present invention.

FIG. 5 is a detailed sectional side view showing a display device according to a second embodiment of the present invention. In this figure, parts corresponding to those in the first embodiment are designated by the same characters, and the explanation thereof is omitted.

A display device 11 shown in FIG. 5 is different from the display device 1 described in the first embodiment in terms of the following four points: The first point is that a dispersion medium 12 contained in a micro-capsule 6 is colored (hereinafter, referred to as a "colored dispersion medium 12"); the second point is that the colored dispersion media 12 having a plurality of colors are contained in the micro-capsules 6 for each color; the third point is that two-color ball type particles 5 contained in the micro-capsule 6 together with the colored dispersion medium 12 have an electrophoretic mobility (speed per unit charge) and a rotational threshold voltage which differ from each colored dispersion medium 12, that is, for each micro-capsule 6; the fourth point is that each of the electrophoretic mobility and the rotational threshold voltage of the two-color ball type particles 5 in each micro-capsule 6 has a distribution.

To be more specific, according to the display device 11, as the colored dispersion medium 12 which surrounds and holds the two-color ball type particles 5 in such a manner as to allow the two-color ball type particles 5 to rotate and vertically migrate, there is used each of the dispersion media colored in the three primary colors, typically, red, blue and green or cyan, magenta and yellow. The three micro-capsules 6, each containing the two-color ball type particles 5 and the colored dispersion medium 12 having each of the three primary colors, constitute one pixel.

In this embodiment, the micro-capsule 6 includes, as the colored dispersion medium 12, each of a red-colored dispersion medium 12R, a blue-colored dispersion medium 12B, and a green-colored dispersion medium 12G. The colored dispersion medium 12 is obtained by adding a dye to a non-volatile oil such as alkyl naphthalene, diallyl ethane, alkyl biphenyl, or triallyl dimethane; to a low viscosity silicone oil; or a plant or animal oil. A charge control agent, dispersant, lubricant, and stabilizer are added to the colored dispersion medium 12 as needed.

Like the first embodiment, each of the two-color ball type particles 5 dispersed in the colored dispersion medium 12 is composed of a pair of hemispherical portions which are different from each other in terms of color, or reflectance and charging characteristic. In this embodiment, the two-color ball type particle 5 is composed of a white hemispherical portion 5*a* positively charged, which is employed as a white display portion, and a black hemispherical portion 5*b* negatively charged, which is employed as a black display portion. Further, the two-color ball type particle 5 has, as described above, an electrophoretic mobility and a rotational threshold voltage which differ from each micro-capsule 6.

Like the first embodiment, the colored dispersion medium 12 and the two-color ball type particle 5 are both dielectric substances, and an electric double layer is formed around each two-color ball type particle 5 from the microscopic viewpoint. In the case where the two-color ball type particle 5 is, for example, positively charged depending on the positive or negative polarity of the monopole charges of the two-color ball type particle 5, that is, the zeta-potential of the entire two-color ball type particle 5, the two-color ball type particle 5 migrates to the minus side electrode (transparent electrode 7 or counter electrode 8) to be brought into contact with the inner wall of the capsule 6*a*.

The electrophoretic mobility $\mu$ is expressed by the following equation (1)

$$\mu=\epsilon\xi/\sigma\pi\eta \quad (1)$$

where $\epsilon$ and $\eta$ designate the dielectric constant and viscosity of the colored dispersion medium 12 respectively, and $\sigma$ designates a zeta-potential of the entire two-color ball type particle 5.

From the above equation (1), it is apparent that the particle 5 having a large zeta-potential has a large electrophoretic mobility and is thereby easy to migrate, while the particle 5 having a small zeta-potential has a small electrophoretic mobility and is thereby hard to migrate. Also, it is confirmed that as the dielectric constant of the colored dispersion medium 12 becomes larger, the electrophoretic mobility becomes larger, while as the dielectric constant of the colored dispersion medium 12 becomes smaller, the electrophoretic mobility becomes smaller. Further, it is confirmed that as the viscosity of the colored dispersion medium 12 becomes larger, the electrophoretic mobility becomes smaller, while as the viscosity of the colored dispersion medium becomes smaller, the electrophoretic mobility becomes larger. To be more specific, the two-color ball type particle 5 can be configured to have an electrophoretic mobility which differs from each micro-capsule 6 by making the zeta-potential of the two-color ball type particles 5, the dielectric constant or viscosity of the colored dispersion medium 12 differ from each micro-capsule 6.

If an electric field allowing sufficient migration of a two-color ball type particle 5 having a large electrophoretic mobility and a two-color ball type particle 5 having a small electrophoretic mobility is applied between the transparent electrode 7 and the counter electrode 8, all the particles 5 are allowed to rotate and migrate. If an electric field allowing sufficient migration of the particle 5 having the large electrophoretic mobility, but not allowing sufficient migration of the particle 5 having the small electrophoretic mobility is applied between the transparent electrode 7 and the counter electrode 8, only the particle 5 having the large electrophoretic mobility is allowed to rotate and migrate, but the particle 5 having the small electrophoretic mobility is not allowed to rotate and migrate or allowed to only slightly rotate and migrate and thereby it does not exert any effect on the display. Accordingly, as will be described in detail later, it is possible to realize the display whose color and gradation differ depending on the strength of the applied electric field (drive potential/drive voltage) and a time required for applying the electric field (drive time) by making the electrophoretic mobility and the rotational threshold voltage of the two-color ball type particles 5 differ from each micro-capsule 6.

As described above, after being in contact with the inner wall of the capsule 6*a*, the two-color ball type particle 5 is prevented from rotating due to a frictional force acting therebetween until it is separated from the inner wall of the capsule 6*a* again by the action of the monopole charges. Accordingly, for a short while after the electric field is cut off, the two-color ball type particle 5 remains at the contact position. In other words, the display device can keep a display image, that is, presents a memory capability.

Figure 6A:
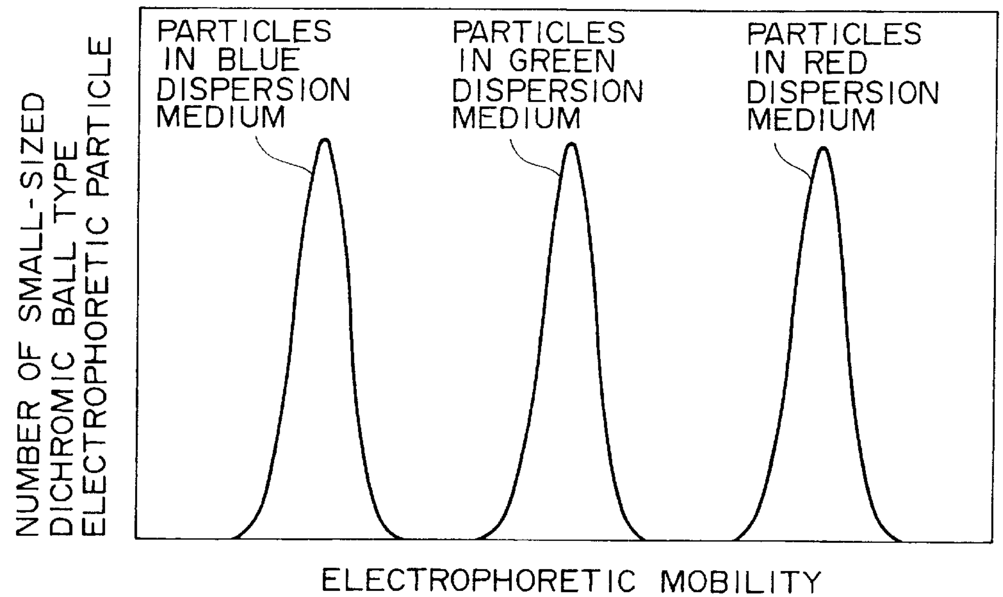
FIG. 6A is a graph showing one example of a relationship between the number of two-color ball type electrophoretic particles dispersed in each of red, green and blue colored dispersion media and an electrophoretic mobility.

In the display device 11 according to this embodiment, the electrophoretic mobility of the two-color ball type particles 5 dispersed in each of the red, blue and green colored dispersion media 12 of the red, blue and green micro-capsules 6 in the micro-capsule layer 10 is set as shown in FIG. 6A. Referring to FIG. 6A, the electrophoretic mobility of the two-color ball type particles 5 in the red dispersion medium 12R is largest, the electrophoretic mobility of the two-color ball type particles 5 in the blue dispersion medium 12B is smallest, and the electrophoretic mobility of the two-color ball type particles 5 in the green dispersion medium 12G is nearly intermediate therebetween.

Figure 6B:
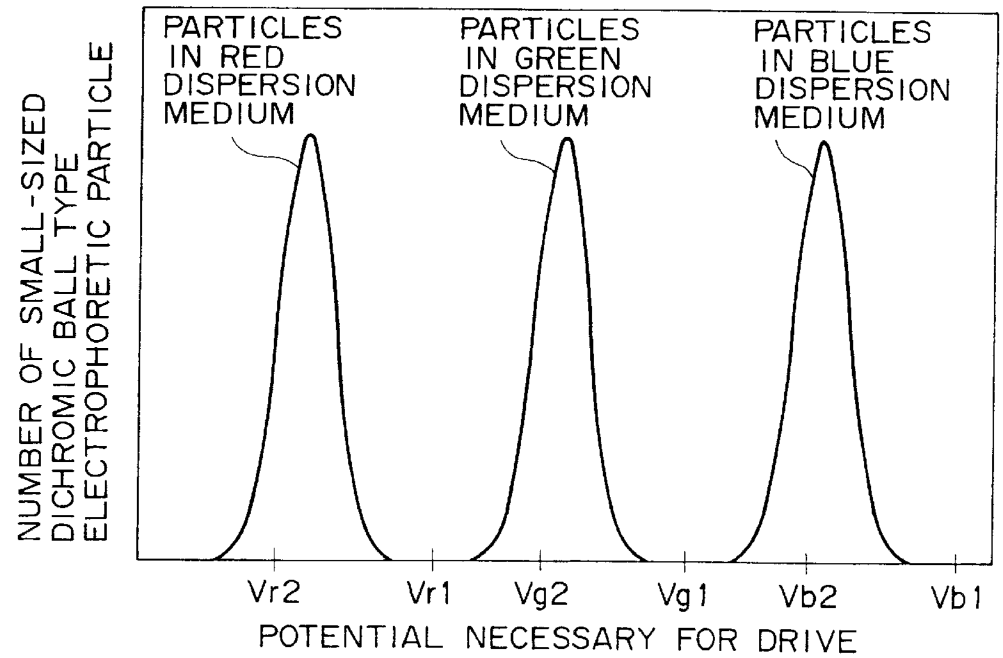
FIG. 6B is a graph showing one example of a relationship between the number of the two-color ball type electrophoretic particles dispersed in each of the red, green and blue colored dispersion media and a potential required for drive of the particles.

Accordingly, by suitably adjusting the rotational threshold voltage of the two-color ball type particles 5 in each colored dispersion medium 12, the potential required for driving the two-color ball type particles 5 in each colored dispersion medium 12 can be set, as shown in FIG. 6B, to be largest for the two-color ball type particles 5 in the blue dispersion medium 12B, smallest for the two-color ball type particles 5 in the red dispersion medium 12R, and nearly intermediate therebetween for the two-color ball type particles 5 in the green dispersion medium 12G. Further, in each micro-capsule 6, as described above, each of the electrophoretic mobility and the rotational threshold voltage of the two-color ball type particles 5 has a distribution, and accordingly, the drive potential of the two-color ball type particles 5 for each color is set in a specific range. It should be noted that in this embodiment, the rotational threshold voltage is set to be equal to the threshold voltage required for electrophoresis.

In the structure shown in FIG. 5, a pair of the transparent electrode 7 and counter electrode 8 are commonly provided for a plurality of the micro-capsules 6 forming one pixel (in this embodiment, the micro-capsule 6 having the red dispersion medium 12R, the micro-capsule 6 having the blue dispersion medium 12B, and the micro-capsule 6 having the green dispersion medium 12G), however, such a pair of the transparent electrode 7 and counter electrode 8 as shown in FIG. 1 may be provided for each micro-capsule 6.

The operation of the above-described display device 11 will be described below.

It is assumed that, as described above, in the display device 11, the electrophoretic mobility of the two-color ball type particles 5 in the red dispersion medium 12R is largest, the electrophoretic mobility of the two-color ball type particles 5 in the blue dispersion medium 12B is smallest, and the electrophoretic mobility of the two-color ball type particles 5 in the green dispersion medium 12G is nearly intermediate therebetween.

It is also assumed, as shown in FIG. 6B, the potential required for sufficiently driving the two-color ball type particles 5 in the blue dispersion medium 12B is taken as Vb1, the potential required for sufficiently driving the two-color ball type particles 5 in the green dispersion medium 12G is taken as Vg1, and the potential required for sufficiently driving the two-color ball type particles 5 in the red dispersion medium 12R is taken as Vr1 (Vb1>Vg1>Vr1).

Further, it is assumed that the white hemispherical portions 5*a* of the two-color ball type particles 5 are negatively charged and the black hemispherical portions 5*b* thereof are positively charged; and the charged amount of the black hemispherical portions 5*b* is larger than that of the white hemispherical portions 5*a* and thereby the whole two-color ball type particles 5 has the same polarity as that of the black hemispherical portions 5*b*, that is, positively charged.

Figure 7A:
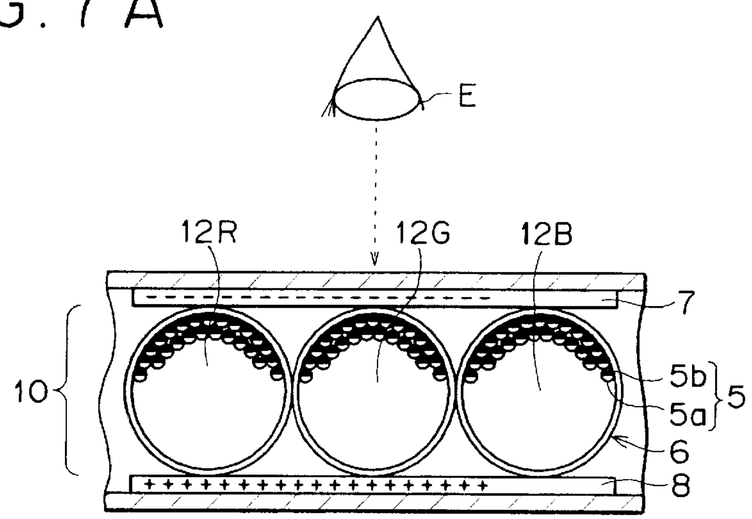
FIGS. 7A to 7L are views illustrating the action of the two-color ball type particles when an electric field is applied between electrodes for the display device according to the second embodiment.

When on the above assumption, the potential Vb1 is applied between the transparent electrode 7 and the counter electrode 8 with the transparent electrode 7 side taken as the negative side and the counter electrode 8 side taken as the positive side as shown in FIG. 7A, all of the two-color ball type particles 5 rotate in such a manner that the black hemispherical portions 5*b* thereof are directed to the transparent electrode 7 side. At this time, since the charged amount of the black hemispherical portions 5*b* is larger than that of the white hemispherical portions 5*a* and thereby the two-color ball type particles 5 are positively charged as a whole, the two-color ball type particles 5 migrate to the minus side electrode, that is, to the transparent electrode 7. As a result, when a viewer turns his eyes upon the set of the red, blue and green micro-capsules 6 from an eye position E in FIG. 7A, he gets a look at the black hemispherical portions 5*b* of a large number of the two-color ball type particles 5. The viewer thus perceives that the set of the red, blue and green micro-capsules 6 is black-colored. In this case, the black display is established.

Figure 7B:
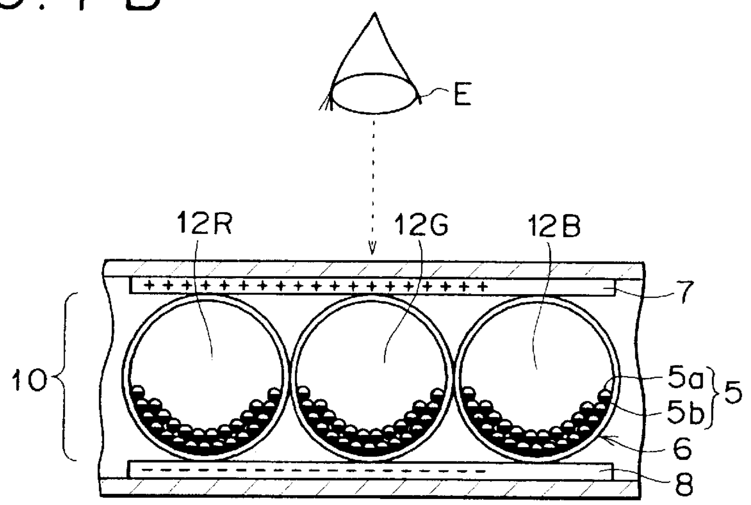

When the potential Vb1 is applied between the transparent electrode 7 and the counter electrode 8 with the transparent 7 side taken as the positive side and the counter electrode 8 side taken as the negative side as shown in FIG. 7B, all of the two-color ball type particles 5 rotate in such a manner that the black hemispherical portions 5*b* thereof are directed to the counter electrode 8 side and the white hemispherical portions 5*a* are directed to the transparent electrode 7 side. At this time, since the whole of the two-color ball type particles 5 is positively charged, the two-color ball type particles 5 migrate to the minus side electrode, that is, to the counter electrode 8. In this case, since light having passed through the colored dispersion media 12R, 12B and 12G is reflected from the white hemispherical portions 5*a* of the two-color ball type particles 5. As a result, when a viewer turns his eyes upon the set of the red, blue and green micro-capsules 6 from an eye position E in FIG. 7B, he gets a look at all the colors of the colored dispersion media 12R, 12B and 12G. In this case, the white display is established.

Figure 7C:
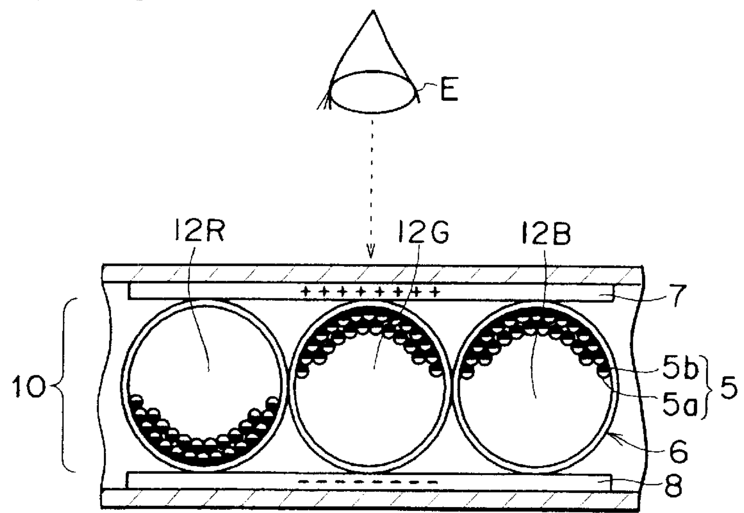

When in the state shown in FIG. 7A, the potential Vr1 is applied between the transparent electrode 7 and the counter electrode 8 with the transparent electrode 7 side taken as the positive side and the counter electrode 8 side taken as the negative side as shown in FIG. 7C, only the two-color ball type particles 5 in the red dispersion medium 12R rotate in such a manner that the white hemispherical portions 5*a* thereof are directed to the transparent electrode 7 side, and migrate to the counter electrode 8 side. As a result, when a viewer turns his eyes upon the set of the red, blue and green micro-capsules 6 from an eye position E shown in FIG. 7C, he gets a look at only the red dispersion medium 12R. In this case, the red display is established.

Figure 7D:
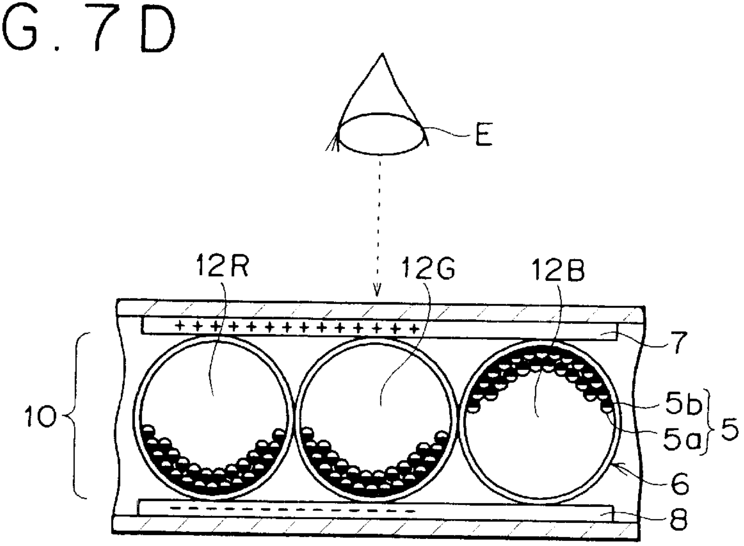

When in the state shown in FIG. 7A, the potential Vg1 is applied between the transparent electrode 7 and the counter electrode 8 with the transparent electrode 7 side taken as the positive side and the counter electrode 8 side taken as the negative side as shown in FIG. 7D, the two-color ball type particles 5 in the red dispersion medium 12R and the two-color ball type particles 5 in the green dispersion medium 12G rotate in such a manner that the white hemispherical portions 5*a* thereof are directed to the transparent electrode 7 side, and migrate to the counter electrode 8 side. As a result, when a viewer turns his eyes upon the set of the red, blue and green micro-capsules 6 from an eye position E shown in FIG. 7D, he gets a look at both the red dispersion medium 12R and the green dispersion medium 12G. In this case, the display of red and green, that is, the yellow display is established.

Figure 7E:
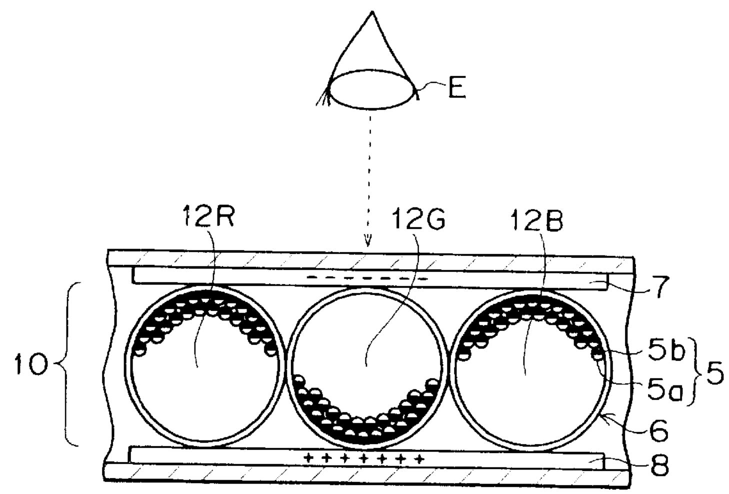

When in the state shown in FIG. 7D, the potential Vr1 is applied between the transparent electrode 7 and the counter electrode 8 with the transparent electrode 7 side taken as the negative side and the counter electrode 8 side taken as the positive side as shown in FIG. 7E, the two-color ball type particles 5 in the red dispersion medium 12R rotate in such a manner that the black hemispherical portions 5*b* thereof are directed to the transparent electrode 7 side, and migrate to the transparent electrode 7 side. As a result, when a viewer turns his eyes upon the set of the red, blue and green micro-capsules 6 from an eye position E shown in FIG. 7E, he gets a look at only the green dispersion medium 12G. In this case, the green display is established.

Figure 7F:
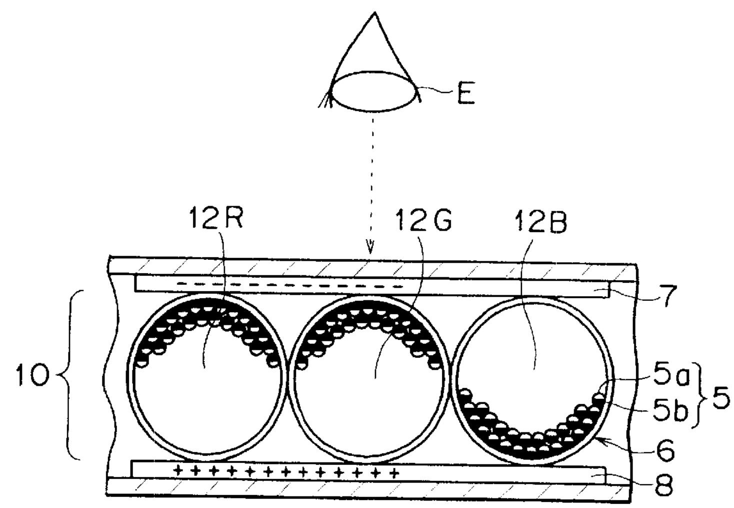

When in the state shown in FIG. 7B, the potential Vg1 is applied between the transparent electrode 7 and the counter electrode 8 with the transparent electrode 7 side taken as the negative side and the counter electrode 8 side taken as the positive side as shown in FIG. 7F, the two-color ball type particles 5 in the red dispersion medium 12R and the two-color ball type particles 5 in the green dispersion medium 12G rotate in such a manner that the black hemispherical portions 5*b* thereof are directed to the transparent electrode 7 side, and migrate to the transparent electrode 7 side. As a result, when a viewer turns his eyes upon the set of the red, blue and green micro-capsules 6 from an eye position E shown in FIG. 7F, he gets a look at only the blue dispersion medium 12B. In this case, the blue display is established.

Figure 7G:
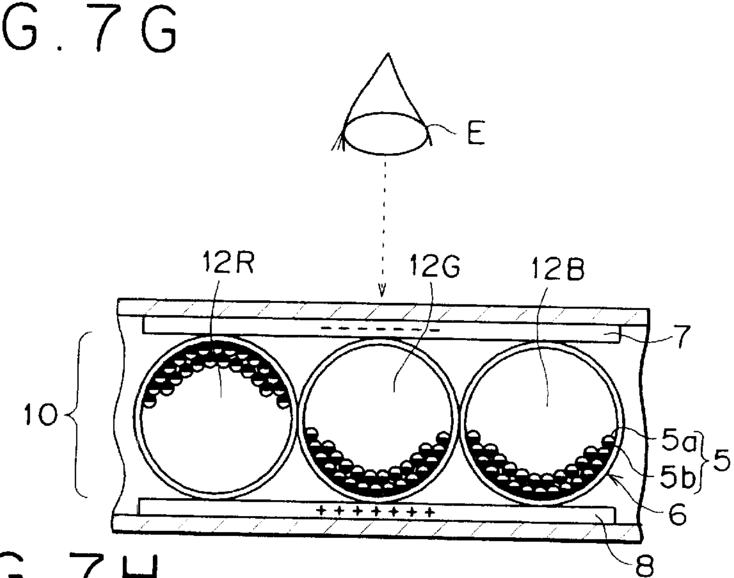

When in the state shown in FIG. 7B, the potential Vr1 is applied between the transparent electrode 7 and the counter electrode 8 with the transparent electrode 7 side taken as the negative side and the counter electrode 8 side taken as the positive side as shown in FIG. 7G, only the two-color ball type particles 5 in the red dispersion medium 12R rotate in such a manner that the black hemispherical portions 5*b* thereof are directed to the transparent electrode 7 side, and migrate to the transparent electrode 7 side. As a result, when a viewer turns his eyes upon the set of the red, blue and green micro-capsules 6 from an eye position E shown in FIG. 7G, he gets a look at both the green dispersion medium 12G and the blue dispersion medium 12B. In this case, the green and blue display, that is, the cyan display is established.

Figure 7H:
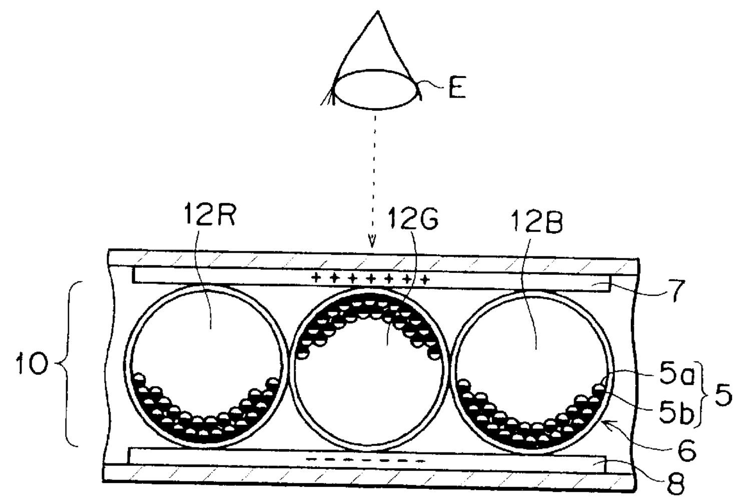

When in the state shown in FIG. 7F, the potential Vr1 is applied between the transparent electrode 7 and the counter electrode 8 with the transparent electrode 7 side taken as the positive side and the counter electrode 8 side taken as the negative side as shown in FIG. 7H, only the two-color ball type particles 5 in the red dispersion medium 12R rotate in such a manner that the white hemispherical portions 5*a* thereof are directed to the counter electrode 8 side, and migrate to the counter electrode 8 side. As a result, when a viewer turns his eyes upon the set of the red, blue and green micro-capsules 6 from an eye position E shown in FIG. 7H, he gets a look at both the red dispersion medium 12R and the blue dispersion medium 12B. In this case, the red and blue display, that is, the magenta display is established.

As described above, according to the display device 11, an electric field allowing the two-color ball type particles 5 having a small electrophoretic mobility and thereby requiring a high drive potential to sufficiently rotate and migrate is applied between the transparent electrode 7 and the counter electrode 8, and then a reverse electric field allowing only the two-color ball type particles 5 having a large electrophoretic mobility and thereby requiring a low drive potential to rotate and migrate is applied between the transparent electrode 7 and the counter electrode 8, to thereby obtain a state in which only the two-color ball type particles 5 having the high drive potential have rotated and migrated. As a result, an arbitrary color display can be obtained by switching the high or low relationship of the drive potential, that is, the strong or weak relationship of the electric field, and further switching the direction and the applying order of the electric field.

Further, as described above, according to this embodiment, the electrophoretic mobility and the rotational threshold voltage of the two-color ball type particles 5 dispersed in each of the red, blue and green dispersion media 12R, 12B and 12G are each set to have a distribution. With this configuration, the two-color ball type particles 5 in each colored dispersion medium 12 are classified into a group allowed to rotate and migrate and a group not allowed to rotate and migrate, depending on a large or small (high or low) relationship of each of the electrophoretic mobility and the rotational threshold voltage and a strong or weak relationship of the electric field applied between the transparent electrode 7 and the counter electrode 8. As a result, since the visible area of the colored dispersion medium 12 is dependent on the strong or weak relationship of the electric field, it is possible to realize the color display with various densities, that is, the color gradation display.

For example, it is assumed that as shown in FIG. 6B, the potential required for driving part of the two-color ball type particles 5 in the blue dispersion medium 12B is taken as Vb2, the potential required for driving part of the two-color ball type particles 5 in the green dispersion medium 12G is taken as Vg2, and the potential required for driving part of the two-color ball type particles 5 in the red dispersion medium 12R is taken as Vr2 (Vb2>Vg2>Vr2).

Figure 7I:
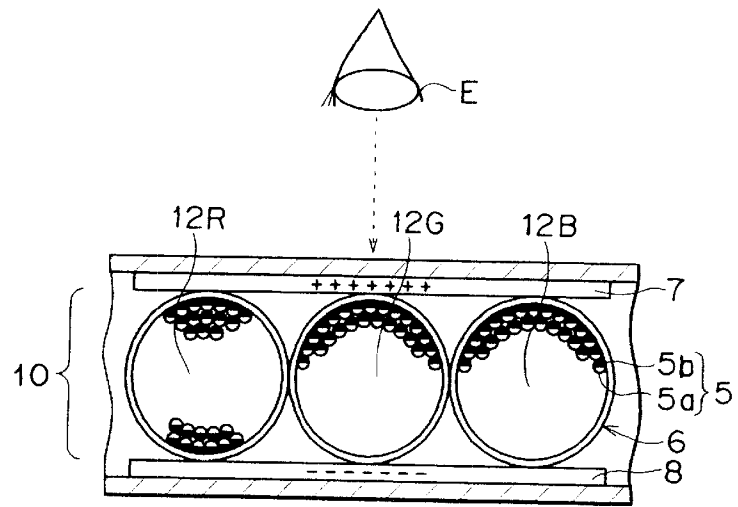

When in the state shown in FIG. 7A, the potential Vr2 is applied between the transparent electrode 7 and the counter electrode 8 with the transparent electrode 7 side taken as the positive side and the counter electrode 8 side taken as the negative side as shown in FIG. 7I, part of the two-color ball type particles 5 in the red dispersion medium 12R rotate in such a manner that the white hemispherical portions 5*a* thereof are directed to the transparent electrode 7 side, and migrate to the counter electrode 8 side. As a result, when a viewer turns his eyes upon the set of the red, blue and green micro-capsules 6 from an eye position E shown in FIG. 7I, he gets a look at part of the red dispersion medium 12R. In this case, the light red display is established.

Figure 7J:
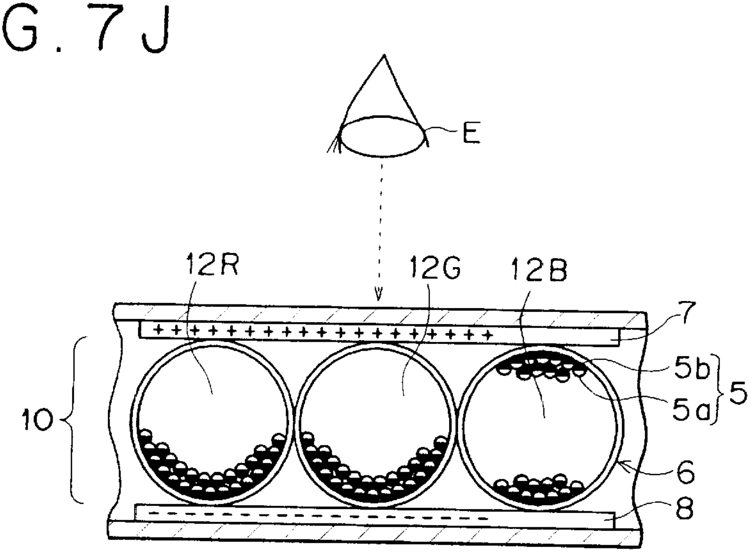

When in the state shown in FIG. 7A, the potential Vb2 is applied between the transparent electrode 7 and the counter electrode 8 with the transparent electrode 7 side taken as the positive side and the counter electrode 8 side taken as the negative side as shown in FIG. 7J, all of the two-color ball type particles 5 in the red dispersion medium 12R, all of the two-color ball type particles 5 in the green dispersion medium 12G, and part of the two-color ball type particles 5 in the blue dispersion medium 12B rotate in such a manner that the white hemispherical portions 5*a* thereof are directed to the transparent electrode 7 side, and migrate to the counter electrode 8 side. As a result, when a viewer turns his eyes upon the set of the red, blue and green micro-capsules 6 from an eye position E shown in FIG. 7J, he gets a look at part of the blue dispersion medium 12R in addition to the red dispersion medium 12R and the green dispersion medium 12G. In this case, the display of red and green to which light blue is added is established.

Figure 7K:
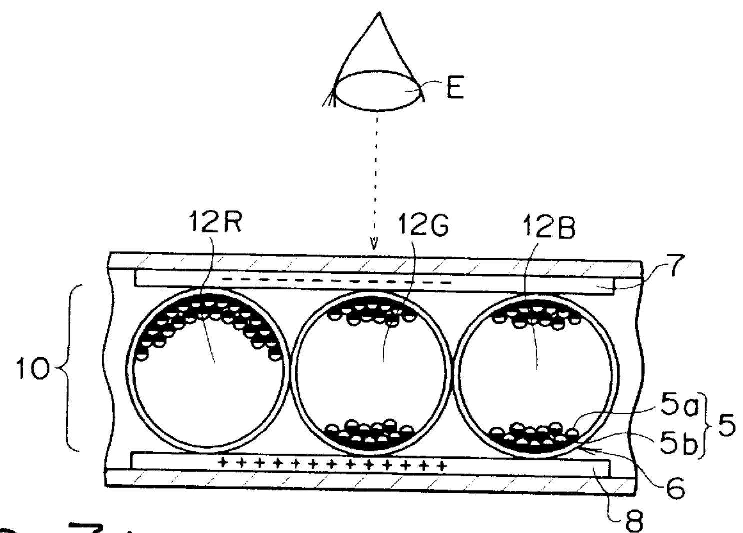

When in the state shown in FIG. 7J, the potential Vg2 is applied between the transparent electrode 7 and the counter electrode 8 with the transparent electrode 7 side taken as the negative side and the counter electrode 8 side taken as the positive side as shown in FIG. 7K, all of the two-color ball type particles 5 in the red dispersion medium 12R and part of the two-color ball type particles 5 in the green dispersion medium 12G rotate in such a manner that the black hemispherical portions 5*b* thereof are directed to the transparent electrode 7 side, and migrate to the transparent electrode 7 side. As a result, when a viewer turns his eyes upon the set of the red, blue and green micro-capsules 6 from an eye position E shown in FIG. 7K, he gets a look at part of the green dispersion medium 12G and part of the blue dispersion medium 12B. In this case, the display of light green and light blue is established.

Figure 7L:
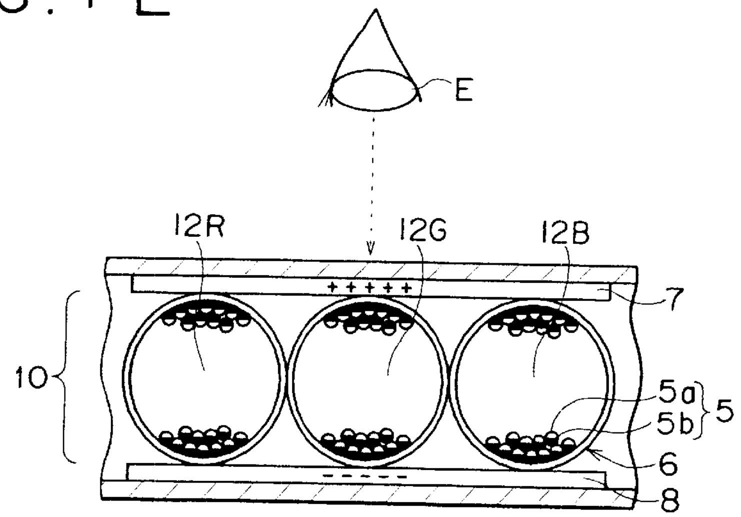

When in the state shown in FIG. 7K, the potential Vr2 is applied between the transparent electrode 7 and the counter electrode 8 with the transparent electrode 7 side taken as the positive side and the counter electrode 8 side taken as the negative side as shown in FIG. 7L, part of the two-color ball type particles 5 in the red dispersion medium 12R rotate in such a manner that the white hemispherical portions 5*a* thereof are directed to the transparent electrode 7 side, and migrate to the counter electrode 8 side. As a result, when a viewer turns his eyes upon the set of the red, blue and green micro-capsules 6 from an eye position E shown in FIG. 7L, he gets a look at part of the red dispersion medium 12R in addition to part of the green dispersion medium 12G and part of the blue dispersion medium 12B. In this case, the display of light green, light blue, and light red is established.

In addition, like each of the two-color ball type particles 5 in the display device 1 according to the first embodiment, each of the two-color ball type particles 5 in the display device 11 according to the second embodiment acts as shown in FIGS. 3A to 3H due to an electric field applied between the transparent electrode 7 and the counter electrode 8. Accordingly, in the state shown in FIG. 3A, in which the two-color ball type particle 5 is located while being offset on the minus side electrode, that is, on the transparent electrode side in such a manner that the black hemispherical portion 5*b* thereof is directed to the transparent electrode 7 side and the white hemispherical portion 5*a* thereof is directed to the counter electrode 8 side, thus the black display can be established.

When a reversed electric field is applied between the transparent electrode 7 and the counter electrode 8 in the state shown in FIG. 3A, the two-color ball type particle 5 slightly migrates to the counter electrode 8 side and starts to rotate as shown in FIG. 3B, and is then reversed in such a manner that the black hemispherical portion 5*b* is directed to the counter electrode 8 side and the white hemispherical portion 5*a* is directed to the transparent electrode 7 side as shown in FIG. 3C. In such a state, the white display can be established. Thereafter, the two-color ball type particle 5 starts to migrate to the counter electrode 8 side as shown in FIG. 3D, and is finally located while being offset on the counter electrode 8 side as shown in FIG. 3E. In such a state, since light having passed through the colored dispersion medium 12 is reflected from the white hemispherical portion 5*a*, the display of the color of the colored dispersion medium 12 can be established.

When the polarity of the electric field is reversed again, the two-color ball type particle 5 slightly migrates to the transparent electrode 7 side and starts to rotate as shown in FIG. 3F, and is reversed in such a manner that the black hemispherical portion 5*b* is directed to the transparent electrode 7 side and the white hemispherical portion 5*a* is directed to the counter electrode 8 side as shown in FIG. 3G. In such a state, since light having passed through the colored dispersion medium 12 is absorbed by the black hemispherical portion 5*b*, the display of black or dark color of the colored dispersion medium 12, that is, the display of three (or four) colors can be established.

As is apparent from the shift of the above states, for example, the display color is changed from white to black when the state shown in FIG. 3E to the state shown in FIG. 3G, and a time required for shifting the state shown in FIG. 3E to the state shown in FIG. 3G is very short as compared with the general electrophoretic display device. Accordingly, the switching of the display color may be performed by shifting the state shown in FIG. 3E to the state shown in FIG. 3G, that is, by applying an electric field only a time required for the two-color ball type particle 5 to be reversed but not to migrate from the position on the counter electrode 8 side to the transparent electrode 7. With this configuration, it is possible to switch the color display for a very short time. From this viewpoint, according to the display device 11 including, like the first embodiment, the control means for controlling a time required for applying an electric field between the transparent electrode 7 and the counter electrode 8 in such a manner that the electric field is applied therebetween only for a time required for the two-color ball type particle 5 to be reversed, it is possible to realize high speed display switching operation.

According to the related art electrophoretic display device, it has been possible to obtain only the binary display in which the color of the electrophoretic particles is visible by allowing the electrophoretic particles to migrate to the transparent electrode side for covering the colored dispersion medium or the color of the colored dispersion medium is visible by allowing the electrophoretic particles to migrate to the opposed side, that is, to the counter electrode side. According to the display device 11 of the second embodiment, however, since the micro-capsule 6 is configured by dispersing a large number of the small-sized two-color ball type particles 5 in the colored dispersion medium 12 as described above, the display of various colors can be established. To be more specific, the black display can be established by suitably adjusting the black hemispherical portions 5*b* of the two-color ball type particles 5; meanwhile, the white play can be established by suitably adjusting the white hemispherical portions 5*a* thereof, and the color of the colored dispersion medium 12 can be established by suitably adjusting the colored dispersion medium 12.

According to the display device 11, since the black color is made visible by the black hemispherical portions 5*b* of a large number of the two-color ball type particles 5, the display of true black can be established, and since the white color is made visible by the white hemispherical portions 5*a* thereof, the display of clear white can be established, with a result that it is possible to perform the display with a high contrast ratio.

In accordance with the display device 11, since one pixel is composed of the three micro-capsules 6 containing the colored dispersion media 12 of different three colors and the two-color ball type particles 5 of three kinds different in terms of electrophoretic mobility and rotational threshold voltage, the display of various colors can be established by changing the high or low relationship of the drive potential, that is, the strong or weak relationship of the electric field and the applying order of the electric field. Also since each of the electrophoretic mobility and the rotational threshold voltage of the two-color ball type particles 5 in each micro-capsule 6 is set to have a distribution, the color gradation display can be established according to the strong or weak relationship of the electric field and the applying order of the electric field. Further, since the three micro-capsules 6 constituting one pixel contain the two-color ball type particles 5 of three different colors exhibiting different electrophoretic mobility and rotational threshold voltage, even if the three micro-capsules 6 are driven between a common transparent electrode 7 and a common counter electrode 8, the display of different colors can be established depending on the drive voltage and drive time.

According to the display device 11, like the first embodiment, the micro-capsule 6 is composed of the capsule 6*a* containing a large number of the two-color ball type particles 5 and the colored dispersion medium 12, it is possible to prevent localization of the two-color ball type particles 5, to simplify the production of the display device 11, and to improve workability in formation of the display device 11 into a sheet or panel shape. Also, since the display device 11 includes the control means for controlling a time required for applying an electric field between the transparent electrode 7 and the counter electrode 8 in such a manner that the electric field is applied therebetween only for a time required for the two-color ball type particle 5 to be reversed, it is possible to realize high speed display switching operation.

In this way, according to the second embodiment, it is possible to realize the display device 11 having advantages in creating the display device, good for eyes without causing the fatigue of eyes, reducing the power consumption, and acquiring a memory capability, similar to those of the related art electrophoretic display device and the two-color ball type particle display device, and also having advantages in enhancing the contrast ratio, enabling the color display and gradation display, and simplifying the production of the display device 11. In addition, the display device 11 can realize high speed display switching operation, although the memory capability thereof is slightly poor as compared with the above-described related art display devices.

In the second embodiment, the color and gradation are changed by adjusting the strength of the electric field, however, since the migration speed of the two-color ball type particles 5 differs depending on the large or small relationship of the electrophoretic mobility, the gradation can be changed by adjusting the time required for applying the electric field.

Figure 8A:
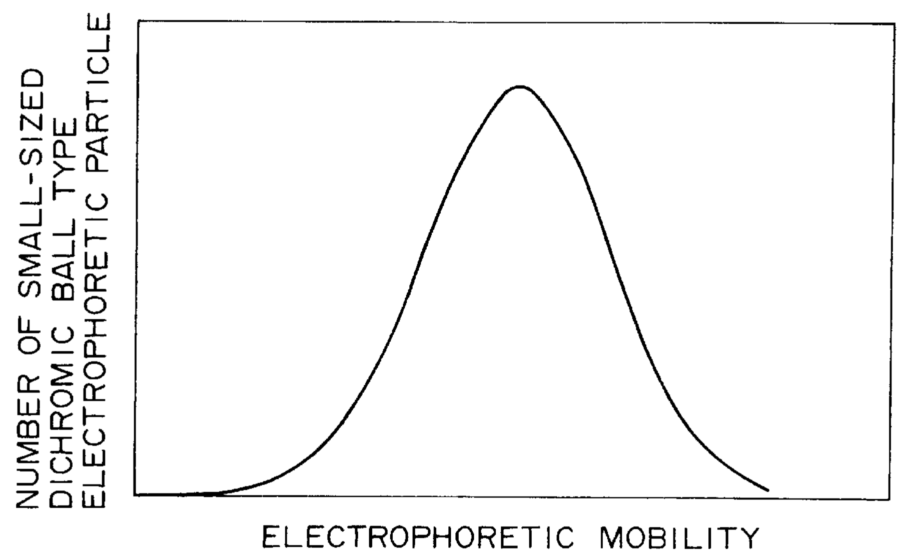
FIG. 8A is a graph showing one example of a relationship between the number of the two-color ball type electrophoretic particles and an electrophoretic mobility for the display device according to the second embodiment.
Figure 8B:
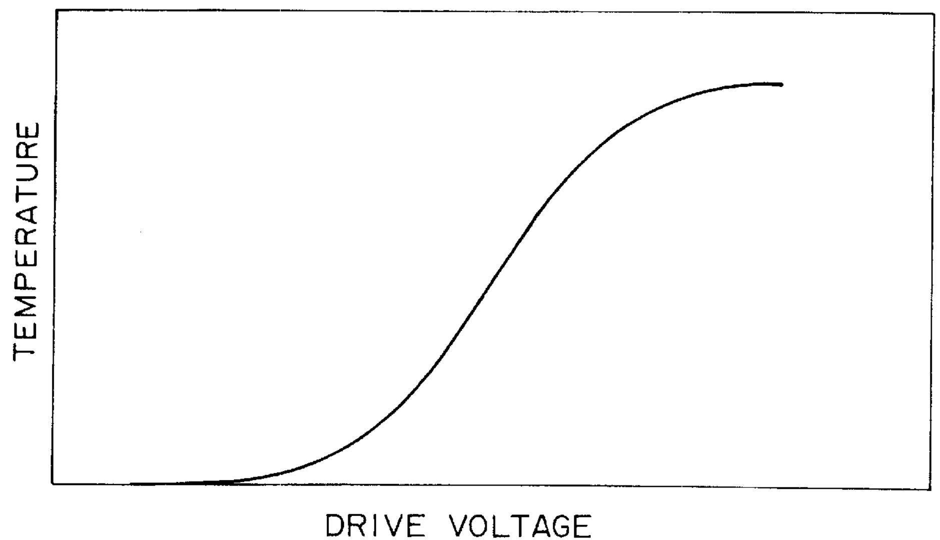
FIG. 8B is a graph showing a relationship between the density of the color displayed on the basis of the relationship shown in FIG. 8A and a drive voltage.
Figure 9A:
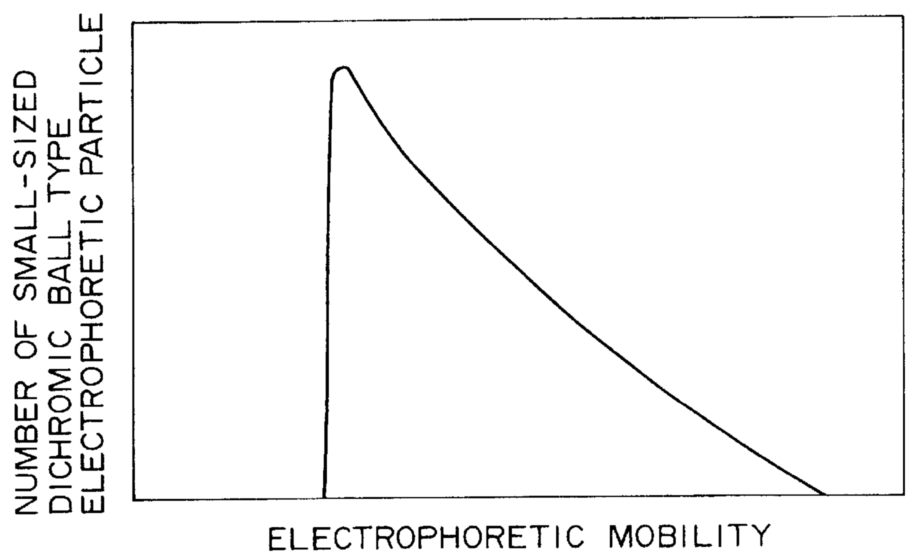
FIG. 9A is a graph showing another example of the relationship between the number of the two-color ball type electrophoretic particles and an electrophoretic mobility for the display device according to the second embodiment.
Figure 9B:
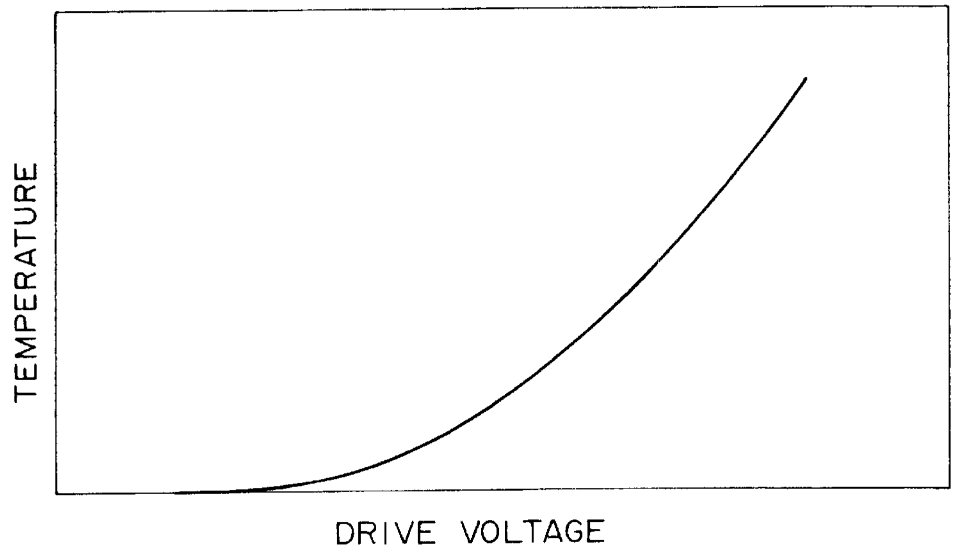
FIG. 9B is a graph showing a relationship between the density of the color displayed on the basis of the relationship shown in FIG. 9A and a drive voltage.

When the distribution of the electrophoretic mobility of the two-color ball type particles 5 dispersed in each colored dispersion medium 12 is expressed by a gauss curve shown in FIG. 8A, the relationship of the gradation display characteristic to the drive voltage is as shown in FIG. 8B. Here, if it is intended to obtain the gradation display characteristic shown by a gamma curve shown in FIG. 9B, the distribution of the above-described electrophoretic mobility may be set to be offset as shown in FIG. 9A.

In the second embodiment, the colored dispersion medium 12 is configured as each of the dispersion media of red, green and blue as the three primary colors, however, it may be configured as each of the dispersion media of cyan, magenta, and yellow. Further, the micro-capsules 6 are used in the second embodiment, however, the display media each having a cell structure may be used for partitioning from each other.

In the second embodiment, the electrophoretic mobility of the two-color ball type particles 5 is changed for each micro-capsule 6 by changing the zeta-potential of the two-color ball type particles 5, or changing the dielectric constant or viscosity of the colored dispersion medium 12, however, the above electrophoretic mobility can be changed by changing the particle size of the two-color ball type particles 5 for each micro-capsule 6. The zeta-potential of the two-color ball type particles 5 can be changed by changing the kind of a surface-treatment agent applied to the two-color ball type particles 5 or changing the concentration of the surface-treatment agent of the same kind.

In the display device 11 according to the second embodiment, the transparent electrodes 7 are provided on the transparent substrate 2 and the counter electrodes 8 are provided on the counter substrate 3;, however, the present invention is not limited thereto. For example, there may be adopted a structure shown in FIG. 10A in which no electrodes are provided, a structure shown in FIG. 10B in which one substrate is omitted, or a structure shown in FIG. 10C in which both the substrates are omitted.

Even for the structure in which no electrodes are provided, by applying an electric field from an external power source to the display media (micro-capsules 6) each of which is composed of the two-color ball type particles 5 and the colored dispersion medium 12, the display corresponding to the applied electric field can be realized. The structure in which no electrodes are provided is advantageous in reducing the production cost of the display device 11, improving flexibility of the display device 11, and eliminating the inconvenience caused by the structure having the transparent electrodes, that the surface reflection of the transparent electrodes obstructs the display.

Further, in the second embodiment described as above, the rotational threshold voltage is set to be equal to the threshold voltage for electrophoresis;, however, the present invention is not limited thereto. For example, a display device allowing the display of various colors and gradations can be realized by combining an operational condition in which the rotational threshold voltage is low but the threshold value for electrophoresis is high with an operational condition in which the threshold voltage for electrophoresis is low but the rotational threshold voltage is high.

Third Embodiment

Figure 11:
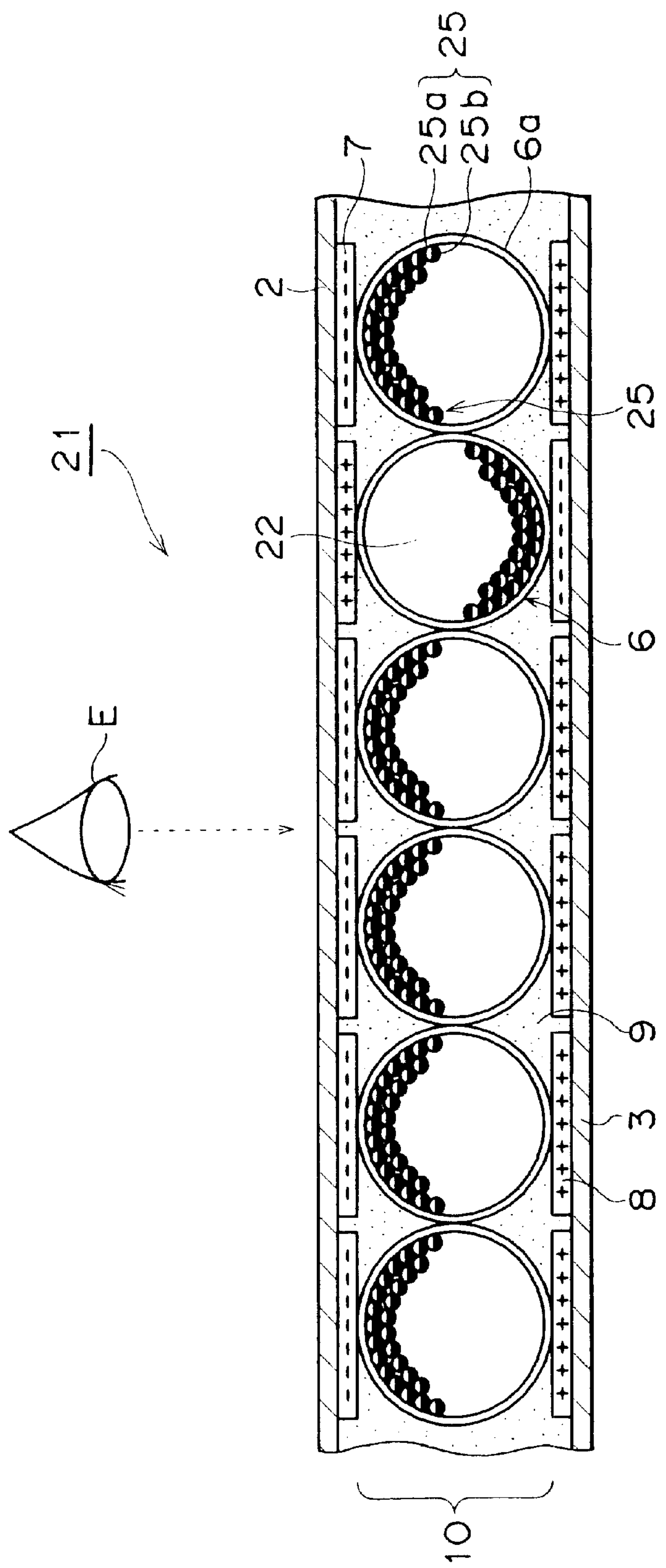
FIG. 11 is a detailed sectional side view showing the schematic configuration of a third embodiment of the display device of the present invention.

FIG. 11 is a detailed sectional side view of a display device according to a third embodiment of the present invention. In FIG. 11, parts corresponding to those described in the second embodiment are designated by the same characters and the explanation thereof is omitted.

A display device 21 shown in FIG. 11 is different from the display device 11 in the second embodiment in terms of the configuration of a colored dispersion medium 22 and two-color ball type particles 25 contained in a micro-capsule 6. To be more specific, in the display device 21, a dispersion medium of one color, typically a cyan colored dispersion medium 22 is used as the colored dispersion medium 22 which surrounds and holds the two-color ball type particles 25 in such a manner as to allow the two-color ball type particles 25 to rotate and vertically migrate.

Like the colored dispersion medium 12, the colored dispersion medium 22 is formed by adding a dye to a non-volatile oil such as alkyl naphthalene, diallyl ethane, alkyl biphenyl, or triallyl dimethane; to a low viscosity silicone oil; or a plant or animal oil. A charge control agent, dispersant, lubricant, and stabilizer are added to the colored dispersion medium 22 as needed.

Like the two-color ball type particles 5, the two-color ball type particles 25 are each composed of a pair of hemispherical portions different from each other in terms of color, or reflectance and charging characteristic, and are provided in such a manner as to be able to rotate in the capsule 6*a* and migrate between the transparent substrate 2 and the counter substrate 3, that is, in the vertical direction in FIG. 11. The particle size of the two-color ball type particle 25 is much smaller than that of a two-color ball having been used for a related art display device, and for example, it is substantially the same as that of an electrophoretic particle having been used for a related art electrophoretic display device. In this embodiment, one of the pair of hemispherical portions of the two-color ball type particle 25 is configured as a white hemispherical portion 25*a* which forms a white display portion.

The other one of the pair of hemispherical portions of the two-color ball type particle 25 is, unlike the two-color ball type particle 5, composed of a complementary color hemispherical portion 25*b* whose color has a complementary relationship with the color of the colored dispersion medium 22. In this embodiment, since the cyan colored dispersion medium 22C is used as the colored dispersion medium 22, the complementary color hemispherical portion 25*b* is configured as a red hemispherical portion whose color has a complementary relationship with cyan. In this embodiment, for example, the white hemispherical portion 25*a* is positively charged while the complementary color hemispherical portion 25*b* is negatively charged, and since the charging characteristic of the white hemispherical portion 25*a* is higher than that of the complementary color hemispherical portion 25*b*, the two-color ball type particle 25 is positively charged as a whole.

The two-color ball type particles 25 having the above configuration are typically produced by preparing small-sized glass balls or polyethylene resins filled with a white material such as titanium dioxide, putting these glass balls or polyethylene resins into a vacuum deposition chamber, and coating hemispherical portions of the balls with a coloring material.

Like the second embodiment, the colored dispersion medium 22 and the two-color ball type particle 25 are both dielectric substances, and an electric double layer is formed around the two-color ball type particle 25 from the microscopic viewpoint. A zeta-potential known as a measurable aspect of the electric double layer varies depending on a difference in property between materials causing a difference in color, or reflectance and charging characteristic between the white hemispherical portion 25*a* and the complementary color hemispherical portion 25*b* of the two-color ball type particle 25. As a result, an electric field is applied between the transparent electrode 7 and the counter electrode 8, the two-color ball type particle 25 acts as a dipole due to a difference in zeta-potential between the white hemispherical portion 25*a* and the complementary color hemispherical portion 25*b*, and rotates in the colored dispersion medium 22 until the dipole moment corresponds to the direction of the electric field.

When a difference in charged amount is previously given between the white hemispherical portion 25*a* and the complementary color hemispherical portion 25*b*, monopole charges occur on the two-color ball type particle 25. In the case where the two-color ball type particle 25 is, for example, positively charged depending on the positive or negative polarity of the monopole charges of the two-color ball type particle 25, that is, the zeta-potential of the single two-color ball type particle 25, the two-color ball type particle 25 migrates to the minus side electrode (transparent electrode 7 or counter electrode 8) to be brought into contact with the inner wall of the capsule 6*a*.

Like the second embodiment, the two-color ball type particle 25 has an electrophoretic mobility and a rotational threshold voltage which differ from each micro-capsule 6. As described with reference to the equation (1), the particle having a large zeta-potential has a large electrophoretic mobility and is thereby easy to migrate, while the particle having a small zeta-potential has a small electrophoretic mobility and is thereby hard to migrate. Also, as the dielectric constant of the colored dispersion medium 22 becomes larger, the electrophoretic mobility becomes larger, while as the dielectric constant of the colored dispersion medium 22 becomes smaller, the electrophoretic mobility becomes smaller. Further, as the viscosity of the colored dispersion medium 12 becomes larger, the electrophoretic mobility becomes smaller, while as the viscosity of the colored dispersion medium becomes smaller, the electrophoretic mobility becomes larger. In this embodiment, the two-color ball type particle 25 is configured to have an electrophoretic mobility which differs from each micro-capsule 6 by making the zeta-potential of the two-color ball type particles 25, and the dielectric constant or viscosity of the colored dispersion medium 22 differ from each micro-capsule 6.

Accordingly, like the second embodiment, according to the display device 21 of the third embodiment, it is possible to realize the display whose color and gradation differ depending on the strength of the applied electric field (drive potential/drive voltage) and a time required for applying the electric field (drive time) by making the electrophoretic mobility and the rotational threshold voltage of the two-color ball type particles 25 differ from each micro-capsule 6.

As described above, after being in contact with the inner wall of the capsule 6*a*, the two-color ball type particle 25 is prevented from rotating due to a frictional force acting therebetween until it is separated from the inner wall of the capsule 6*a* again by the action of the monopole charges. Accordingly, for a short while after the electric field is cut off, the two-color ball type particle 25 remains at the contact position. In other words, the display device can keep a display image, that is, has a memory capability.

The display device 21 having the above-described configuration also includes the control means (not shown) for controlling a time required for applying an electric field between the transparent electrode 7 and the counter electrode 8 in such a manner that the electric field is applied therebetween only for a time required for the two-color ball type particle 25 to be reversed.

The operation of the display device 21 will be described below.

It is assumed that, as described above, the white hemispherical portions 25*a* of the two-color ball type particles 25 are positively charged and the complementary color hemispherical portions 25*b* thereof are negatively charged, and the two-color ball type particles 25 are positively charged as a whole.

Figure 12A:
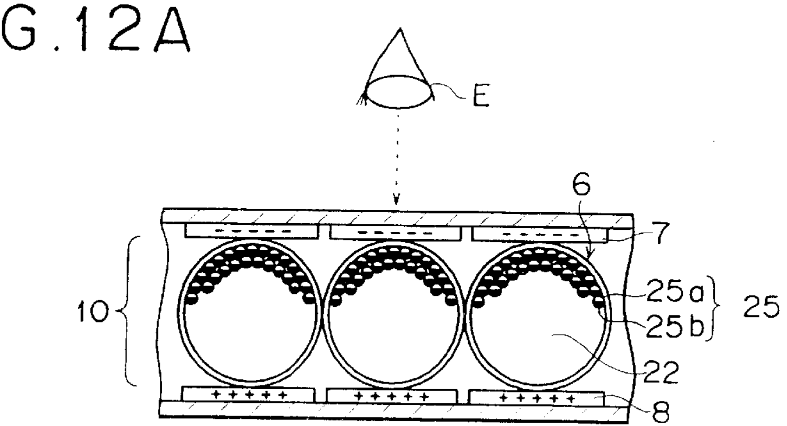
FIGS. 12A to 12D are views illustrating the action of the two-color ball type particles when an electric field is applied between electrodes for the display device according to the third embodiment.

When on the above assumption, an electric field being large enough to allow the two-color ball type particles 25 to rotate and migrate is applied to the transparent electrode 7 and the counter electrode 8 with the transparent electrode 7 side taken as the negative side and the counter electrode 8 side taken as the positive side as shown by FIG. 12A, all the two-color ball type particles 25 rotate in such a manner that the white hemispherical portions 25*a* thereof are directed to the transparent electrode 7 side, and migrate to the minus side electrode, that is, to the transparent electrode 7. As a result, when a viewer turns his eyes upon the set of the micro-capsules 6 from an eye position E in FIG. 12A, he gets a look at the white hemispherical portions 25*a* of a large number of the two-color ball type particles 25. In this case, the white display is established.

Figure 12B:
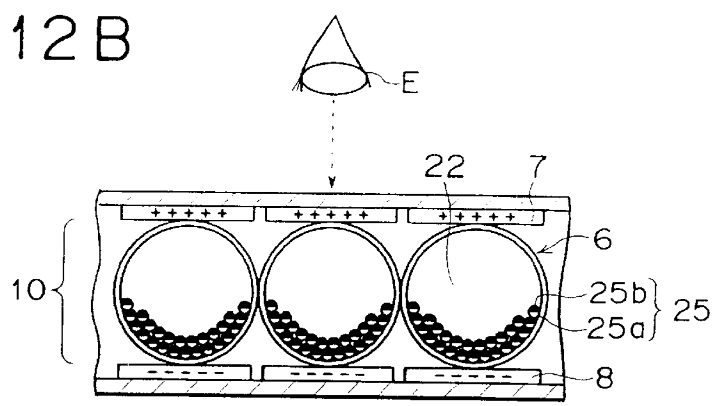

When an electric field being large enough to allow the two-color ball type particles 25 to rotate and migrate is applied to the transparent electrode 7 and the counter electrode 8 with the transparent electrode 7 side taken as the positive side and the counter electrode 8 side taken as the negative side as shown by FIG. 12B, all the two-color ball type particles 25 rotate in such a manner that the complementary color hemispherical portions 25*b* thereof are directed to the transparent electrode 7 side, and migrate to the minus side electrode, that is, to the counter electrode 8. As a result, when a viewer turns his eyes upon the set of the micro-capsules 6 from an eye position E in FIG. 12B, since light having passed through the colored dispersion medium 22 is absorbed by the complementary color hemispherical portions 25*b*, the viewer gets a look at no color. In this case, the black display is established.

The two-color ball type particle 25 in the third embodiment, if the rotational threshold value and the electrophoretic mobility thereof are suitably determined, acts as shown in FIGS. 13A to 13H due to an electric field applied between the transparent electrode 7 and the counter electrode 8. When a minus electric field is applied to the transparent electrode 7 side and a plus electric field is applied to the counter electrode 8 side as shown in FIG. 13A, the two-color ball type particle 25 is located in a state being offset on the minus side, that is, on the transparent electrode 7 side in such a manner that the white hemispherical portion 25*a* is directed to the transparent electrode 7 side and the complementary color hemispherical portion 25*b* is directed to the counter electrode 8 side.

When a reversed electric field is applied between the transparent electrode 7 and the counter electrode 8 in the state shown in FIG. 13A, the two-color ball type particle 25 slightly migrates to the counter electrode 8 side and starts to rotate as shown in FIG. 13B, and is then reversed in such a manner that the white hemispherical portion 25*a* is directed to the counter electrode 8 side and the complementary color hemispherical portion 25*b* is directed to the transparent electrode 7 side as shown in FIG. 13C. Thereafter, the two-color ball type particle 25 starts to migrate to the counter electrode 8 side as shown in FIG. 13D, and is finally located in a state being offset on the counter electrode 8 side as shown in FIG. 13E.

When the polarity of the electric field is reversed again, that is, a minus electric field is applied to the transparent electrode 7 side and a plus electric field is applied to the counter electrode 8 side, the two-color ball type particle 25 slightly migrates to the transparent electrode 7 side and starts to rotate as shown in FIG. 13F, and is reversed in such a manner that the white hemispherical portion 25*a* is directed to the transparent electrode 7 side and the complementary color hemispherical portion 25*b* is directed to the counter electrode 8 side as shown in FIG. 13G. After that, the two-color ball type particle 25 starts to migrate to the transparent electrode 7 side as shown in FIG. 13H, and is finally located in a state being offset on the transparent electrode 7 side as shown in the original figure, FIG. 13A.

Figure 12C:
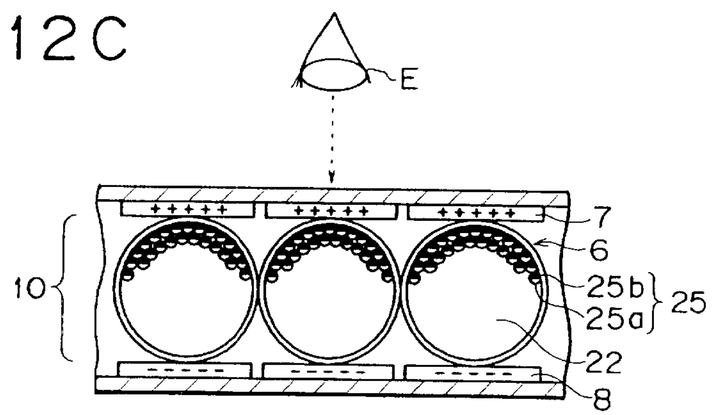
Figure 12D:
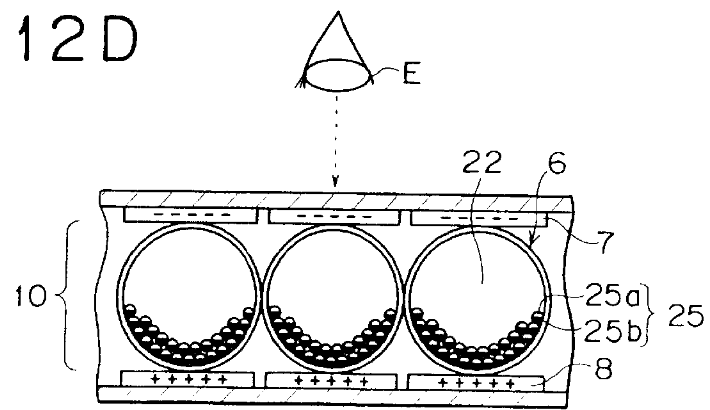

As is apparent from the shift of the above states, the color change occurs when the state shown in FIG. 13A is shifted to the state shown in FIG. 13C (the state shown in FIG. 12C), or the state shown in FIGS. 13E is shifted to the state shown in FIG. 13G (the state shown in FIG. 12D). Accordingly, an electric field may be applied for a time required for shifting the state shown in FIG. 13A to the state shown in FIG. 13C or from the state shown in FIG. 13E to the state shown in FIG. 13G, that is, only a time required for the two-color ball type particle 25 to be reversed, but not to migrate from the present position to the opposed electrode 7 or 8. With this configuration, it is possible to switch the display for a very short time as compared with the general electrophoretic display device.

From this viewpoint, according to the display device 21 including, as described above, the control means for controlling a time required for applying an electric field between the transparent electrode 7 and the counter electrode 8 in such a manner that the electric field is applied therebetween only for a time required for the two-color ball type particle 25 to be reversed, it is possible to realize high speed display switching operation.

Further, in the state shown in FIG. 12C, when the viewer turns his eyes upon the set of the micro-capsules 6 from an eye position E shown in the figure, he gets a look at the complementary color hemispherical portions 25*b*. In this case, the display of the color of the complementary color hemispherical portions 25*b*, that is red, can be established. Meanwhile, in the state shown in FIG. 12D, since light having passed through the colored dispersion medium 22 is reflected from the white hemispherical portions 25*a*, the display of the color of the colored dispersion medium 22, that is cyan, can be established. As a result, according to the display device 21, the display of white, black, the color of the colored dispersion medium 22, and the color of the complementary color hemispherical portions 25*b* can be performed only by one micro-capsule 6.

Fourth Embodiment

Figure 14:
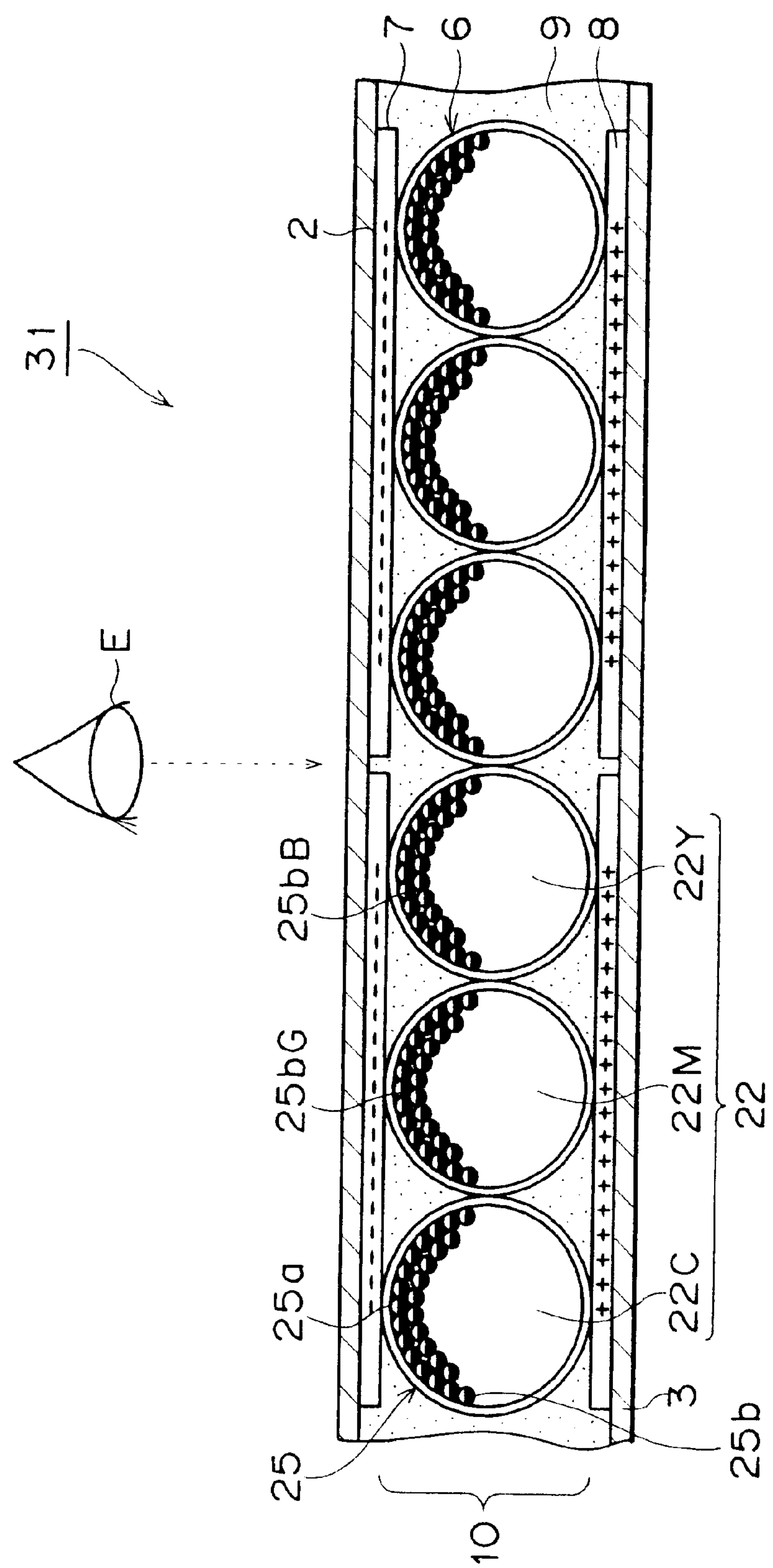
FIG. 14 is a detailed sectional side view showing the schematic configuration of the fourth embodiment of the display device of the present invention.

FIG. 14 is a detailed sectional side view of a multi-color display device according to a fourth embodiment of the present invention. In FIG. 14, parts corresponding to those described in the third embodiment are designated by the same characters and the explanation thereof is omitted. A display device 31 in this embodiment is different from the display device 21 in the third embodiment in that the color of a colored dispersion medium 22 contained in a micro-capsule 6 differs for each capsule 6.

To be more specific, according to the display device 31 shown in FIG. 14, as the colored dispersion medium 22 which surrounds and holds the two-color ball type particles 25 in such a manner as to allow the two-color ball type particles 25 to rotate and vertically migrate, there is used each of the dispersion media colored in the three primary colors, typically, red, blue and green or cyan, magenta and yellow. The three micro-capsules 6, each containing the colored dispersion medium 22 having each of the three primary colors, constitute one pixel.

In this embodiment, the three micro-capsules 6 contain a cyan dispersion medium 22C, a magenta dispersion medium 22M, and a yellow dispersion medium 22Y, respectively. The colored dispersion medium 22 is obtained by adding a dye to a non-volatile oil such as alkyl naphthalene, diallyl ethane, alkyl biphenyl, or triallyl dimethane; a low viscosity silicone oil; or a plant or animal oil. A charge control agent, dispersant, lubricant, and stabilizer are added to the colored dispersion medium 22 as needed.

Like the third embodiment, the two-color ball type particles 25 dispersed in each colored dispersion medium are each composed of a white hemispherical portion 25*a* positively charged, which forms a white display portion, and a complementary color hemispherical portion 25*b* negatively charged, which forms a complementary color display portion. As described above, the color of the complementary color hemispherical portion 25*b* has a complementary relationship with the color of the colored dispersion medium 22.

For example, in the case of the cyan dispersion medium 22C, the complementary color hemispherical portion 25*b* of the two-color ball type particle 25 is configured as a red hemispherical portion 25*b*R which forms a red display portion; in the case of the magenta dispersion medium 22M, the complementary color hemispherical portion 25*b* of the two-color ball type particle 25 is configured as a green hemispherical portion 25*b*G which forms a green display portion; and in the case of the yellow dispersion medium 22Y, the complementary color hemispherical portion 25*b* of the two-color ball type particle 25 is configured as a blue hemispherical portion 25*b*B which forms a blue display portion.

Figure 15A:
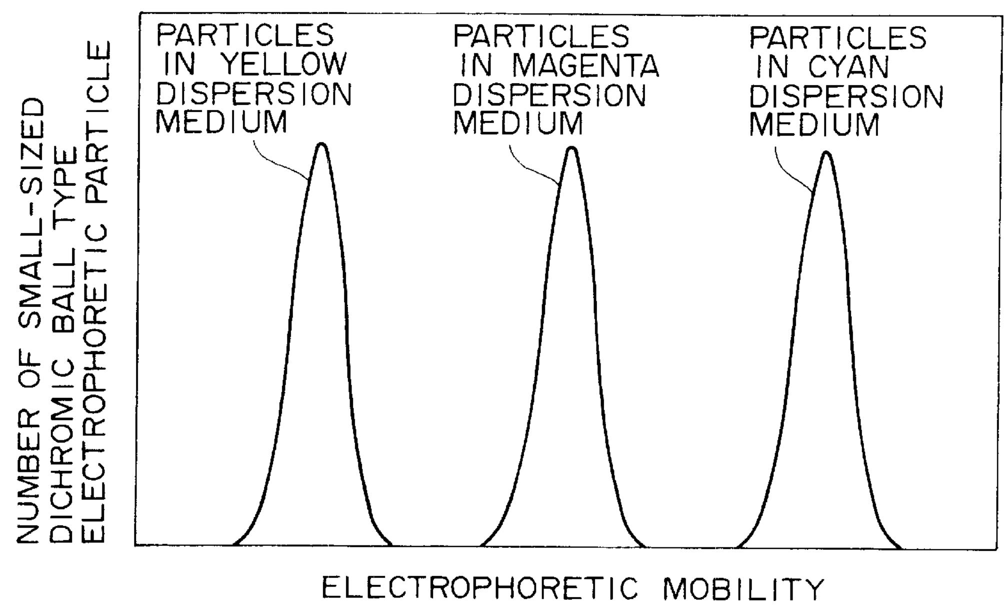
FIG. 15A is a graph showing one example of a relationship between the number of two-color ball type electrophoretic particles dispersed in each of cyan, magenta and yellow colored dispersion media and an electrophoretic mobility.

The two-color ball type particles 25 in this embodiment have an electrophoretic mobility which differs for each color of the dispersion medium 22 or for each micro-capsule 6. For example, the electrophoretic mobility of the two-color ball type particles 25 dispersed in each of the colored dispersion media of the micro-capsules 6 in a micro-capsule layer 10 is set as shown in FIG. 15A. Referring to FIG. 15A, the electrophoretic mobility of the two-color ball type particles 25 in the cyan dispersion medium 22C is largest, the electrophoretic mobility of the two-color ball type particles 25 in the yellow dispersion medium 22Y is smallest, and the electrophoretic mobility of the two-color ball type particles 25 in the magenta dispersion medium 22M is nearly intermediate therebetween.

Figure 15B:
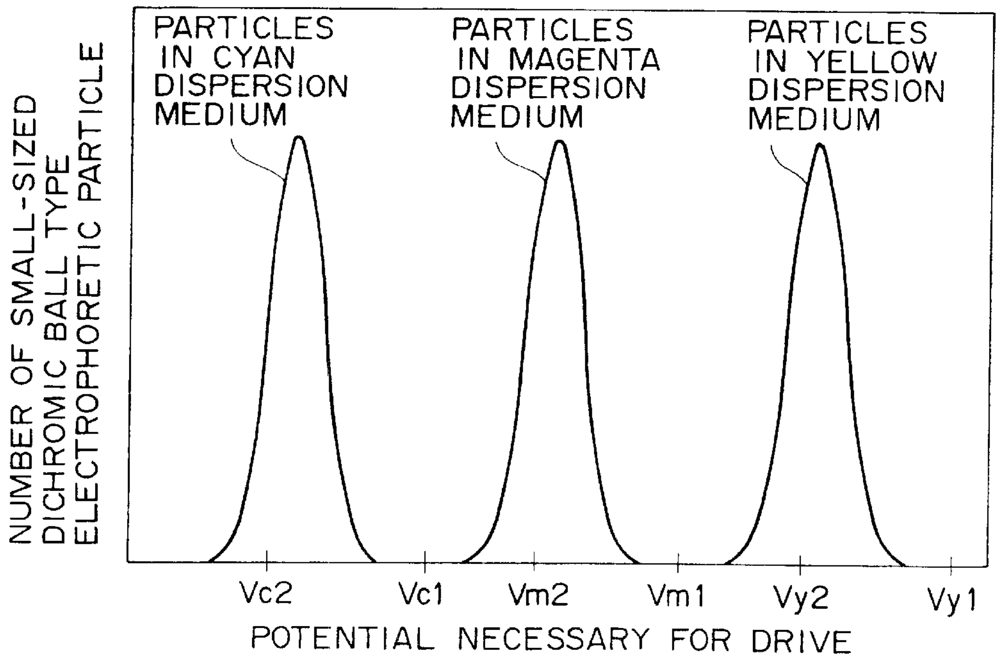
FIG. 15B is a graph showing one example of a relationship between the number of the two-color ball type electrophoretic particles dispersed in each of the cyan, magenta and yellow dispersion media and a potential required for driving the particles.

Accordingly, by suitably adjusting the rotational threshold voltage of the two-color ball type particles 25 in each colored dispersion medium 22, the potential required for driving the two-color ball type particles 25 in each colored dispersion medium 22 can be set, as shown in FIG. 15B, to be largest for the two-color ball type particles 25 in the yellow dispersion medium 22Y, smallest for the two-color ball type particles 25 in the cyan dispersion medium 22C, and nearly intermediate therebetween for the two-color ball type particles 25 in the magenta dispersion medium 22M.

Further, in each micro-capsule 6, each of the electrophoretic mobility and the rotational threshold voltage of the two-color ball type particles 25 are set to have a distribution, and accordingly, the drive potential of the two-color ball type particles 25 for each color is set in a specific range. It should be noted that in this embodiment, the rotational threshold voltage is set to be equal to the threshold voltage required for electrophoresis.

In the structure shown in FIG. 14, a pair of the transparent electrode 7 and counter electrode 8 are commonly provided for a plurality of the micro-capsules 6 forming one pixel (in this embodiment, the micro-capsule 6 having the cyan dispersion medium 22C, the micro-capsule 6 having the magenta dispersion medium 22M, and the micro-capsule 6 having the yellow dispersion medium 22Y);, however, such a pair of the transparent electrode 7 and counter electrode 8 may be provided for each micro-capsule 6 as shown in FIG. 11.

The operation of the above-described display device 31 will be described below.

It is assumed that, as described above, in the display device 31, the electrophoretic mobility of the two-color ball type particles 25 in the cyan dispersion medium 22C is largest, the electrophoretic mobility of the two-color ball type particles 25 in the yellow dispersion medium 22Y is smallest, and the electrophoretic mobility of the two-color ball type particles 25 in the magenta dispersion medium 22M is nearly intermediate therebetween. Further, it is assumed that, as shown in FIG. 15B, the potential required for sufficiently driving the two-color ball type particles 25 in the yellow dispersion medium 22Y is taken as Vy1, the potential required for sufficiently driving the two-color ball type particles 25 in the magenta dispersion medium 22M is taken as Vm1, and the potential required for sufficiently driving the two-color ball type particles 25 in the cyan dispersion medium 22C is taken as Vc1 (Vy1>Vm1>Vc1).

Further, it is assumed that the white hemispherical portions 25*a* of the two-color ball type particles 25 are positively charged and the complementary color hemispherical portions 25*b* thereof are negatively charged; and the charged amount of the white hemispherical portions 25*a* is larger than that of the complementary color hemispherical portions 25*b* and thereby the whole of the two-color ball type particles 25 has the same polarity as that of the white hemispherical portions 25*a*, that is, it is positively charged.

Figure 16A:
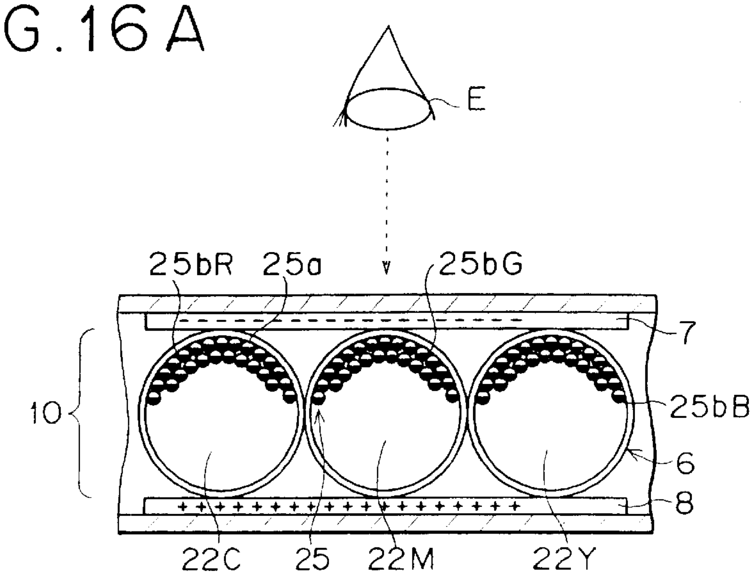
FIGS. 16A to 16T are views illustrating the action of the two-color ball type particles when an electric field is applied between electrodes for the display device according to the fourth embodiment.

When on the above assumption, the potential Vy1 is applied between the transparent electrode 7 and the counter electrode 8 with the transparent electrode 7 side taken as the negative side and the counter electrode 8 side taken as the positive side for a sufficient time required for the two-color ball type particles 25 to rotate and migrate as shown in FIG. 16A, all of the two-color ball type particles 25 rotate in such a manner that the white hemispherical portions 25*a* thereof are directed to the transparent electrode 7 side. At this time, since the two-color ball type particles 25 are positively charged as a whole, they migrate to the minus side electrode, that is, to the transparent electrode 7. As a result, when a viewer turns his eyes upon the set of the micro-capsules 6 from an eye position E in FIG. 16A, he gets a look at the white hemispherical portions 25*a* of a large number of the two-color ball type particles 25. In this case, the white display is established.

Figure 16B:
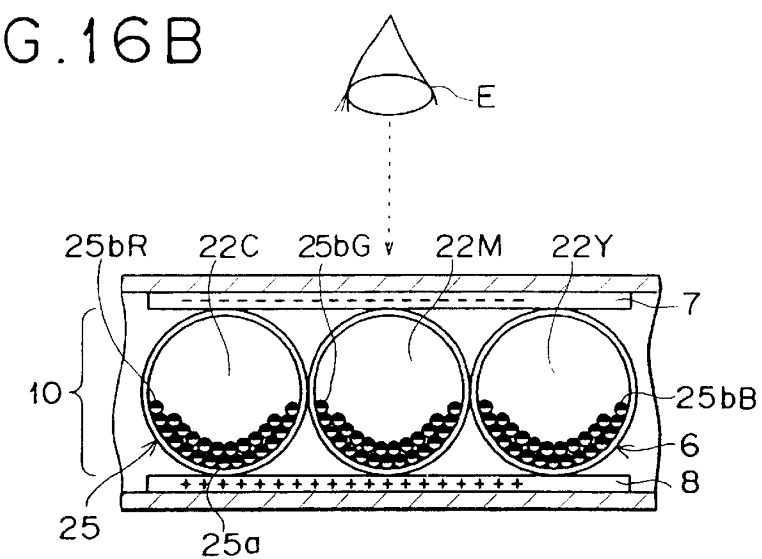

When the potential Vy1 is applied between the transparent electrode 7 and the counter electrode 8 with the transparent 7 side taken as the positive side and the counter electrode 8 side taken as the negative side for a sufficient time required for the two-color ball type particles 25 to rotate and migrate as shown in FIG. 16B, all of the two-color ball type particles 25 rotate in such a manner that the white hemispherical portions 25*a* thereof are directed to the counter electrode 8 side and the complementary color hemispherical portions 25*b* are directed to the transparent electrode 7 side, and migrate to the minus side electrode, that is, to the counter electrode 8. In this case, light having passed through the colored dispersion media 22C, 22M and 22Y is absorbed by the complementary color hemispherical portions 25*b*. As a result, when a viewer turns his eyes upon the set of the micro-capsules 6 from an eye position E in FIG. 16B, he gets a look at no color. In t his case, the black display is established.

Figure 16C:
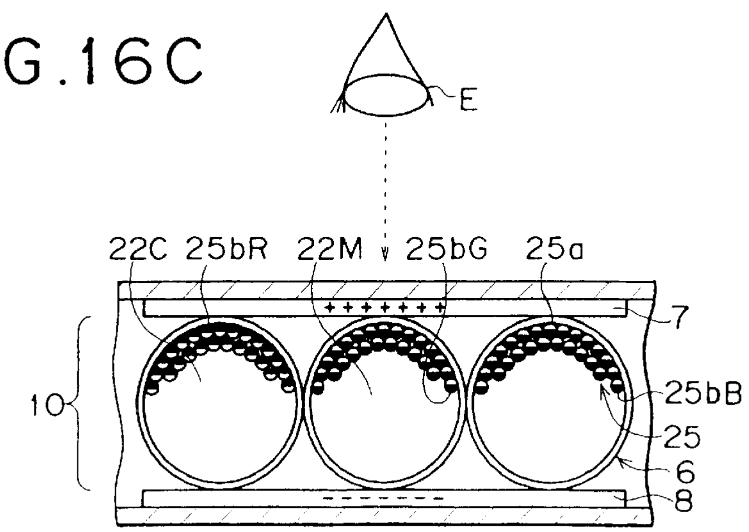

When in the state shown in FIG. 16A, the potential Vc1 is applied between the transparent electrode 7 and the counter electrode 8 with the transparent electrode 7 side taken as the positive side and the counter electrode 8 side taken as the negative side for a time required for the two-color ball type particles 25 to rotate but not to migrate to the counter electrode 8 side as shown in FIG. 16C, only the two-color ball type particles 25 having the red hemispherical portions 25*b*R rotate in such a manner that the red hemispherical portions 25*b*R are directed to the transparent electrode 7 side. As a result, when a viewer turns his eyes upon the set of the micro-capsules 6 from an eye position E shown in FIG. 16C, he gets a look at only the red hemispherical portions 25*b*R. In this case, the red display is established.

Figure 16D:
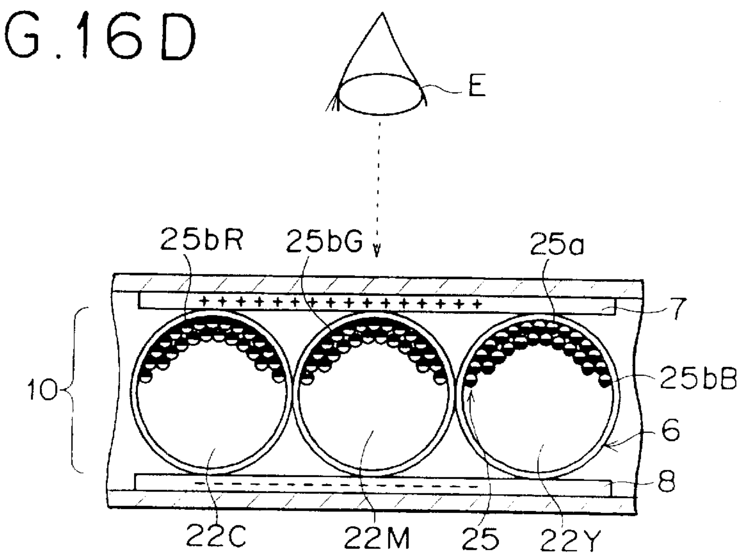

When in the state shown in FIG. 16A, the potential Vm1 is applied between the transparent electrode 7 and the counter electrode 8 with the transparent electrode 7 side taken as the positive side and the counter electrode 8 side taken as the negative side for a sufficient time for the two-color ball type particles 25 to rotate but not to migrate on the counter electrode 8 side as shown in FIG. 16D, the two-color ball type particles 25 having the red hemispherical portions 25*b*R and the two-color ball type particles 25 having the green hemispherical portions 25*b*G rotate in such a manner that the red hemispherical portions 25*b*R and the green hemispherical portions 25*b*G are directed to the transparent electrode 7 side. As a result, when a viewer turns his eyes upon the set of the micro-capsules 6 from an eye position E shown in FIG. 16D, he gets a look at both the red hemispherical portions 25*b*R and the green hemispherical portions 25*b*G. In this case, the display of red and green, that is, the yellow display is established.

Figure 16E:
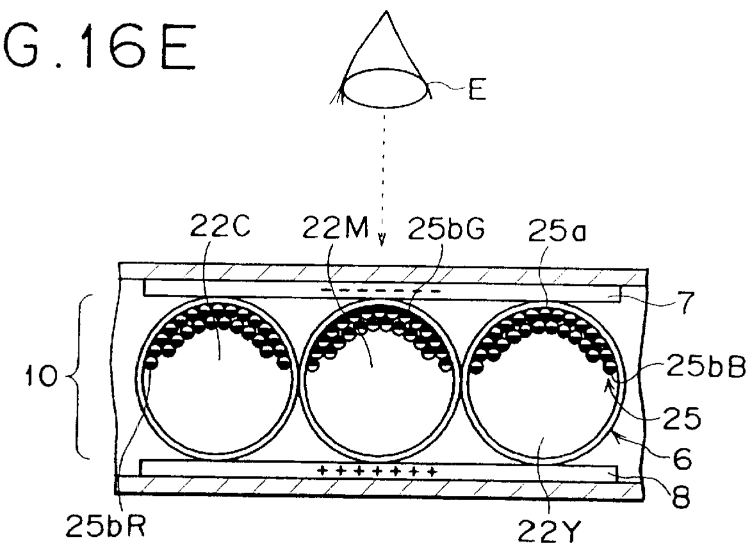

When in the state shown in FIG. 16D, the potential Vc1 is applied between the transparent electrode 7 and the counter electrode 8 with the transparent electrode 7 side taken as the negative side and the counter electrode 8 side taken as the positive side as shown in FIG. 16E, the two-color ball type particles 25 having the red hemispherical portions 25*b*R rotate in such a manner that the white hemispherical portions 25*a* are directed to the transparent electrode 7 side. As a result, when a viewer turns his eyes upon the set of the micro-capsules 6 from an eye position E shown in FIG. 16E, he gets a look at only the green hemispherical portions 25*b*G. In this case, the green display is established.

Figure 16F:
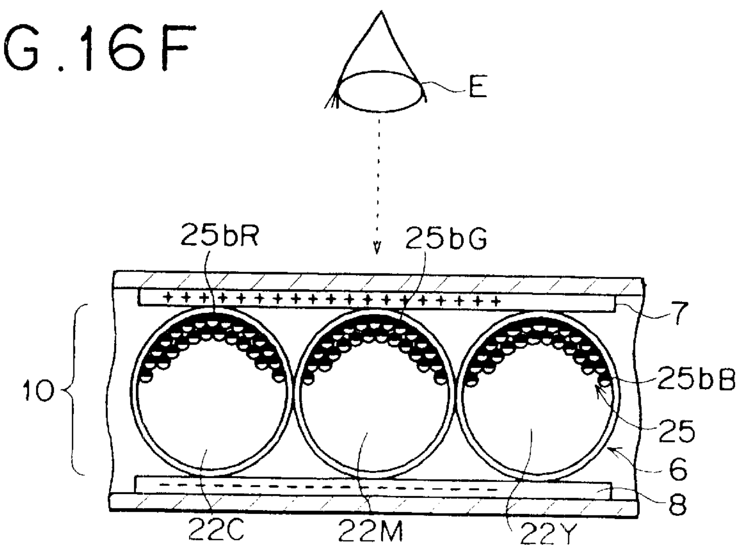

When in the state shown in FIG. 16A, the potential Vy1 is applied between the transparent electrode 7 and the counter electrode 8 with the transparent electrode 7 side taken as the positive side and the counter electrode 8 side taken as the negative side for a time for the two-color ball type particles 25 to rotate but not to migrate to the counter electrode 8 side as shown in FIG. 16F, all of the two-color ball type particles 25 in each micro-capsule 6 rotate in such a manner that the complementary color hemispherical portions 25*b* thereof are directed to the transparent electrode 7 side. As a result, when a viewer turns his eyes upon the set of the micro-capsules 6 from an eye position E shown in FIG. 16F, he gets a look at the red hemispherical portions 25*b*R, the green hemispherical portions 25*b*G and the blue hemispherical portions 25*b*B. In this case, the gray display in which red, green and blue are mixed is established.

Figure 16G:
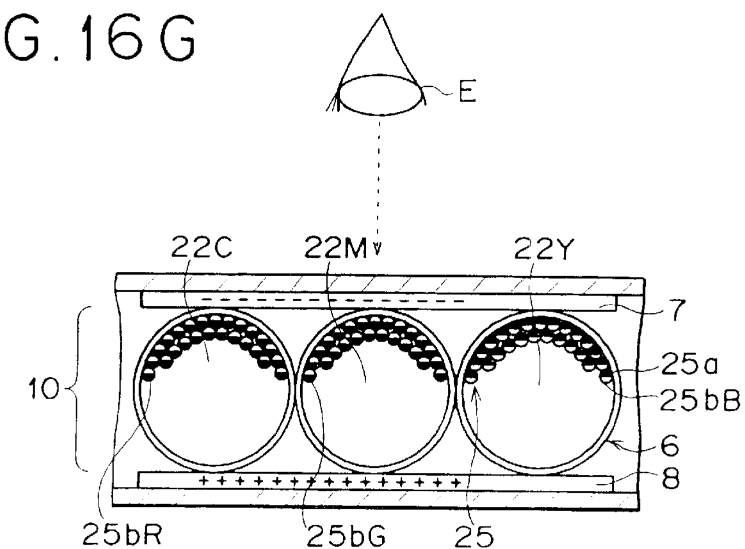

When in the state shown in FIG. 16F, the potential Vm1 is applied between the transparent electrode 7 and the counter electrode 8 with the transparent electrode 7 side taken as the negative side and the counter electrode 8 side taken as the positive side as shown in FIG. 16G, the two-color ball type particles 25 having the red hemispherical portions 25*b*R and the two-color ball type particles 25 having the green hemispherical portions 25*b*G rotate in such a manner that the white hemispherical portions 25*a* thereof are directed to the transparent electrode 7 side. As a result, when a viewer turns his eyes upon the set of the micro-capsules 6 from an eye position E shown in FIG. 16G, he gets a look at only the blue hemispherical portions 25*b*B. In this case, the blue display is established as a whole.

Figure 16H:
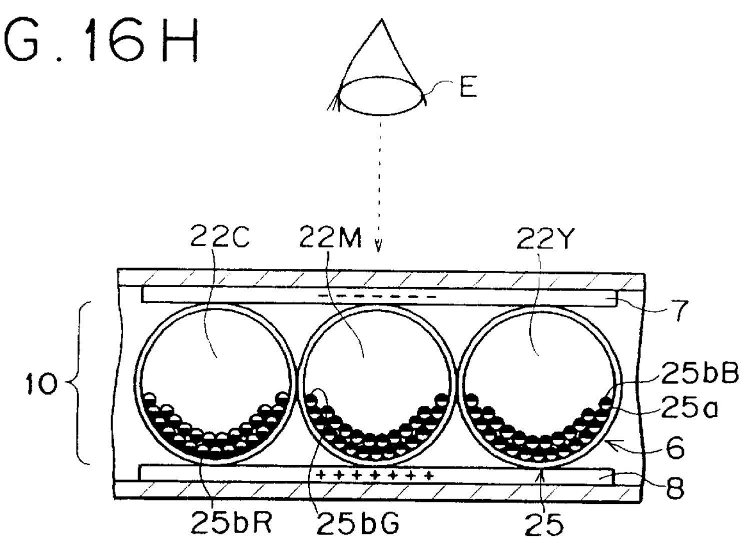

When in the state shown in FIG. 16B, the potential Vc1 is applied between the transparent electrode 7 and the counter electrode 8 with the transparent electrode 7 side taken as the negative side and the counter electrode 8 side taken as the positive side for a time required for the two-color ball type particles 25 to rotate but not to migrate on the counter electrode 8 side as shown in FIG. 16H, only the two-color ball type particles 25 having the red hemispherical portions 25*b*R rotate in such a manner that the white hemispherical portions 25*a* thereof are directed to the transparent electrode 7 side. As a result, when a viewer turns his eyes upon the set of the micro-capsules 6 from an eye position E shown in FIG. 16H, since light having passed through the cyan dispersion medium 22C is reflected from the white hemispherical portions 25*a*, he gets a look at the color of cyan. In this case, the cyan display is established.

Figure 16I:
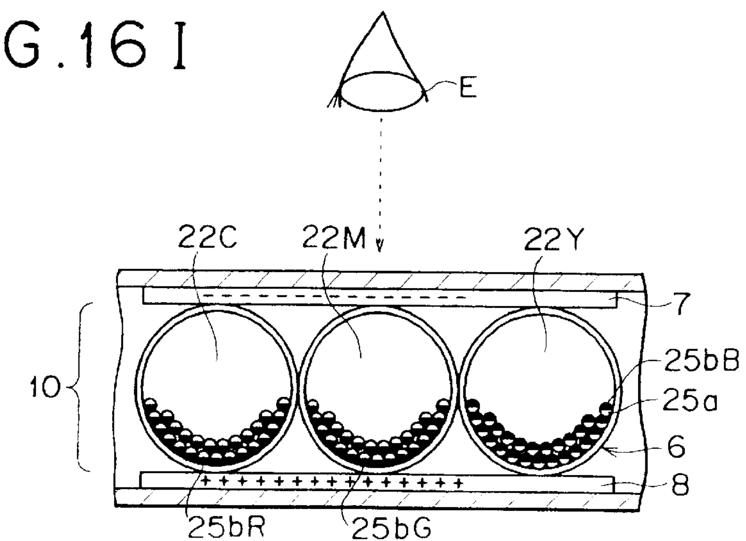

When in the state shown in FIG. 16B, the potential Vm1 is applied between the transparent electrode 7 and the counter electrode 8 with the transparent electrode 7 side taken as the negative side and the counter electrode 8 side taken as the positive side for a time required for the two-color ball type particles 25 to rotate but not to migrate on the counter electrode 8 side as shown in FIG. 16I, the two-color ball type particles 25 having the red hemispherical portions 25*b*R and the two-color ball type particles 25 having the green hemispherical portions 25*b*G rotate in such a manner that the white hemispherical portions 25*a* thereof are directed to the transparent electrode 7 side. As a result, when a viewer turns his eyes upon the set of the micro-capsules 6 from an eye position E shown in FIG. 16I, since light having passed through the cyan dispersion medium 22C and the magenta dispersion medium 22M is reflected from the white hemispherical portions 25*a*, he gets a look at the color of cyan and magenta. In this case, the display of mixture of cyan and magenta is established.

When in the state shown in FIG. 16I, the potential Vc1 is applied between the transparent electrode 7 and the counter electrode 8 with the transparent electrode 7 side taken as the positive side and the counter electrode 8 side taken as the negative side as shown in FIG. 16J, the two-color ball type particles 25 having the red hemispherical portions 25*b*R rotate in such a manner that the red hemispherical portions 25*b*R are directed to the transparent electrode 7 side. As a result, when a viewer turns his eyes upon the set of the micro-capsules 6 from an eye position E shown in FIG. 16J, since light having passed through the cyan dispersion medium 22C is absorbed by the red hemispherical portions 25*b*R, he perceives that the cyan dispersion medium 22C is black-colored. In this case, the magenta display is established as a whole.

When in the state shown in FIG. 16B, the potential Vy1 is applied between the transparent electrode 7 and the counter electrode 8 with the transparent electrode 7 side taken as the negative side and the counter electrode 8 side taken as the positive side for a time for the two-color ball type particles 25 to rotate but not to migrate to the counter electrode 8 side as shown in FIG. 16K, all of the two-color ball type particles 25 in each micro-capsule 6 rotate in such a manner that the white hemispherical portions 25*a* thereof are directed to the transparent electrode 7 side. As a result, when a viewer turns his eyes upon the set of the micro-capsules 6 from an eye position E shown in FIG. 16K, he gets a look at the cyan dispersion medium 22C, the magenta dispersion medium 22M, and the yellow dispersion medium 22Y. In this case, the gray display in which cyan, magenta and yellow are mixed is established.

When in the state shown in FIG. 16K, the potential Vm1 is applied between the transparent electrode 7 and the counter electrode 8 with the transparent electrode 7 side taken as the positive side and the counter electrode 8 side taken as the negative side as shown in FIG. 16L, the two-color ball type particles 25 having the red hemispherical portions 25*b*R and the two-color ball type particles 25 having the green hemispherical portions 25*b*G rotate in such a manner that the red hemispherical portions 25*b*R and the green hemispherical portions 25*b*G are directed to the transparent electrode 7 side. As a result, when a viewer turns his eyes upon the set of the micro-capsules 6 from an eye position E shown in FIG. 16L, since light having passed through the cyan dispersion medium 22C and the magenta dispersion medium 22M are absorbed by the red hemispherical portions 25*b*R and the green hemispherical portions 25*b*G respectively, he perceives that the cyan dispersion medium 22C and the magenta dispersion medium 22M are black-colored. In this case, the yellow display is established as a whole.

Figure 16M:
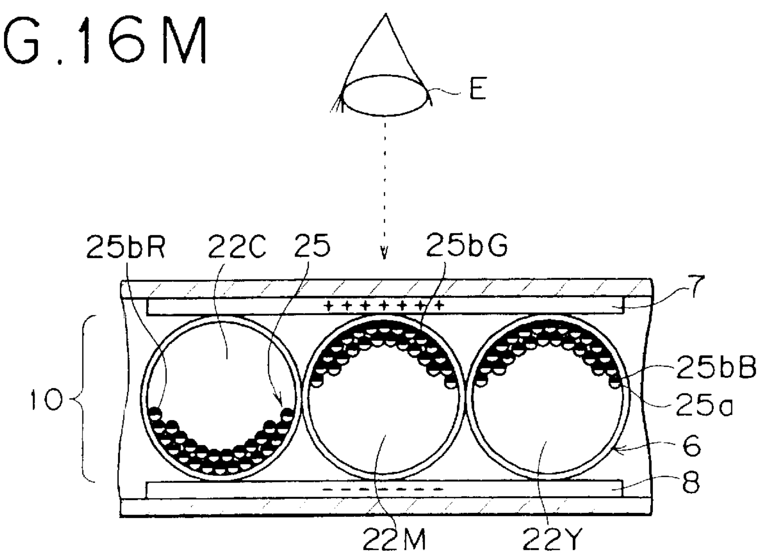

When in the state shown in FIG. 16F, the potential Vc1 is applied between the transparent electrode 7 and the counter electrode 8 with the transparent electrode 7 side taken as the positive side and the counter electrode 8 side taken as the negative side as shown in FIG. 16M, the two-color ball type particles 25 having the red hemispherical portions 25*b*R rotate in such a manner that the red hemispherical portions 25*b*R are directed to the transparent electrode 7 side, and migrate to the counter electrode 8 side. As a result, when a viewer turns his eyes upon the set of the micro-capsules 6 from an eye position E shown in FIG. 16M, since light having passed through the cyan dispersion medium 22C are absorbed by the red hemispherical portions 25*b*R, he perceives that the cyan dispersion medium 22C is black-colored. In this case, the display of green and blue, that is, the cyan display is established as a whole.

Figure 16N:
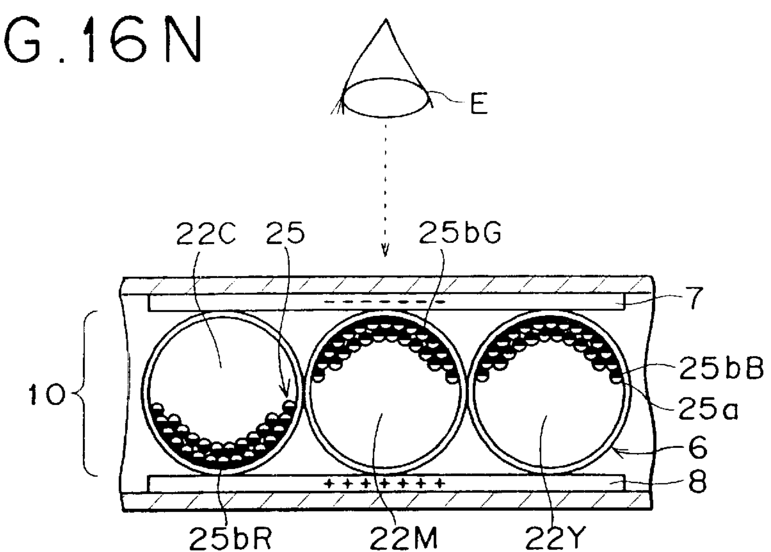

When in the state shown in FIG. 16M, the potential Vc1 is applied between the transparent electrode 7 and the counter electrode 8 with the transparent electrode 7 side taken as the negative side and the counter electrode 8 side taken as the positive side for a time required for the two-color ball type particles 25 to rotate but not to migrate to the counter electrode 8 side as shown in FIG. 16N, the two-color ball type particles 25 having the red hemispherical portions 25*b*R rotate in such a manner that the white hemispherical portions 25*a* are directed to the transparent electrode 7 side. As a result, when a viewer turns his eyes upon the set of the micro-capsules 6 from an eye position E shown in FIG. 16N, he gets a look at the cyan dispersion medium 22C. In this case, the display of cyan which is denser that that obtained in the state shown in FIG. 16M or 16H is established as a whole.

Figure 16O:
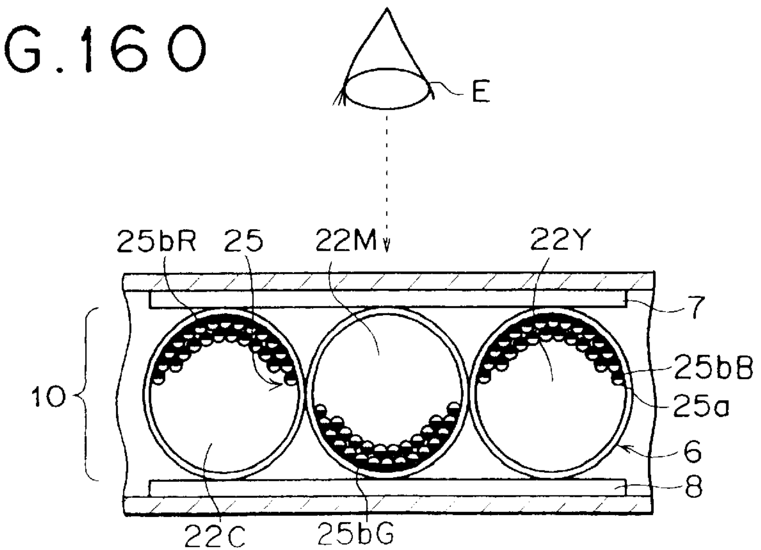
Figure 16P:
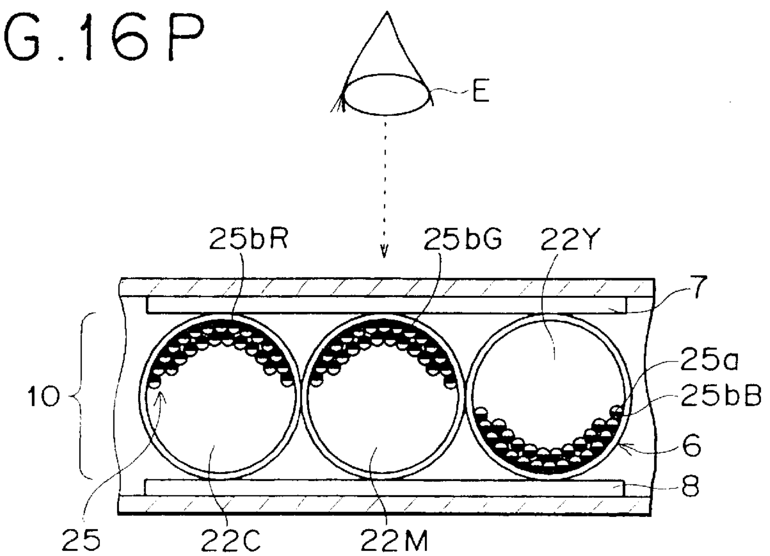

Similarly, the states shown in FIG. 16O and 16P can be obtained. In these cases, the dense magenta display and the dense yellow display are established, respectively.

As described above, according to the display device 31, an electric field allowing the two-color ball type particles 25 having a high drive potential to sufficiently rotate and migrate is applied between the transparent electrode 7 and the counter electrode 8, and then a reverse electric field allowing only the two-color ball type particles 25 having a low drive potential to rotate and migrate is applied between the transparent electrode 7 and the counter electrode, to thereby obtain a state in which only the two-color ball type particles 25 having the high drive potential have rotated and migrated. As a result, an arbitrary color display can be obtained by switching the high or low relationship of the drive potential, that is, the strong or weak relationship of the electric field, and further switching the direction and the applying order of the electric field.

Further, according to this embodiment, the electrophoretic mobility and the rotational threshold voltage of the two-color ball type particles 25 dispersed in each of the colored dispersion media 22C, 22M and 22Y are each set to have a distribution. With this configuration, the two-color ball type particles 25 in each colored dispersion medium 22 are classified into a group allowed to rotate and migrate and a group not allowed to rotate and migrate depending on a large or small (high or low) relationship of each of the electrophoretic mobility and the rotational threshold voltage and a strong or weak relationship of the electric field applied between the transparent electrode 7 and the counter electrode 8. As a result, since the visible colored area of the colored dispersion medium 22 is dependent on the strong or weak relationship of the electric field, it is possible to realize the color display with various densities, that is, the color gradation display.

For example, it is assumed that, as shown in FIG. 15B, the potential required for driving part of the two-color ball type particles 25 in the yellow dispersion medium 22Y is taken as Vy2, the potential required for driving part of the two-color ball type particles 25 in the magenta dispersion medium 22M is taken as Vm2, and the potential required for driving part of the two-color ball type particles 25 in the cyan dispersion medium 22C is taken as Vc2 (Vy2>Vm2>Vc2).

Figure 16Q:
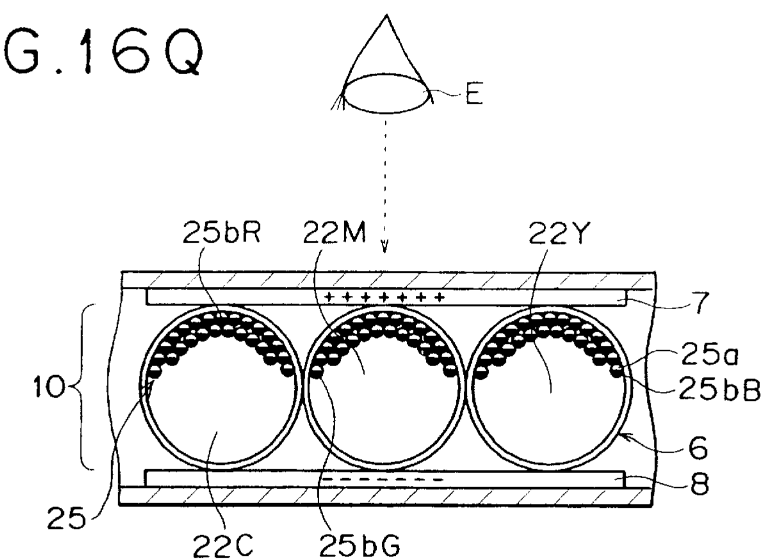

When in the state shown in FIG. 16A, the potential Vc2 is applied between the transparent electrode 7 and the counter electrode 8 with the transparent electrode 7 side taken as the positive side and the counter electrode 8 side taken as the negative side for a time required for the two-color ball type particles 25 to rotate but not to migrate as shown in FIG. 16Q, part of the two-color ball type particles 25 having the red hemispherical portion 25*b*R rotate in such a manner that the red hemispherical portions 25*b*R are directed to the transparent electrode 7 side. As a result, when a viewer turns his eyes upon the set of the micro-capsules 6 from an eye position E shown in FIG. 16Q, he gets a look at part of the red hemispherical portion 25*b*R. In this case, the light red display is established.

Figure 16R:
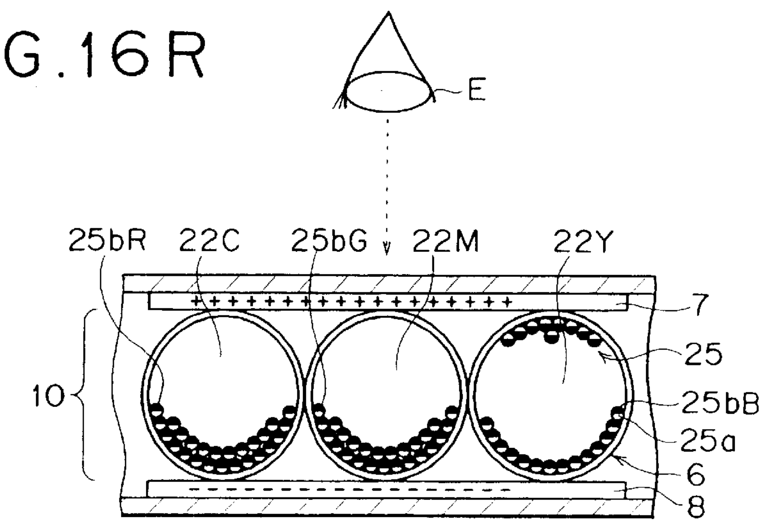

When in the state shown in FIG. 16A, the potential Vy2 is applied between the transparent electrode 7 and the counter electrode 8 with the transparent electrode 7 side taken as the positive side and the counter electrode 8 side taken as the negative side for a sufficient time required for the two-color ball type particles 25 to migrate as shown in FIG. 16R, all of the two-color ball type particles 25 having the red hemispherical portions 25*b*R, all of the two-color ball type particles 25 having the green hemispherical portions 25*b*G, and part of the two-color ball type particles 25 having the blue hemispherical portions 25*b*B rotate in such a manner that the red hemispherical portions 25*b*R, the green hemispherical portions 25*b*G, and the blue hemispherical portions 25*b*B are directed to the transparent electrode 7 side, and migrate to the counter electrode 8 side. As a result, when a viewer turns his eyes upon the set of the micro-capsules 6 from an eye position E shown in FIG. 16R, he perceives that part of the white hemispherical portions 25*a* in the yellow dispersion medium 22Y is visible but the other portions are black-colored. In this case, the gray display is established as a whole.

Figure 16S:
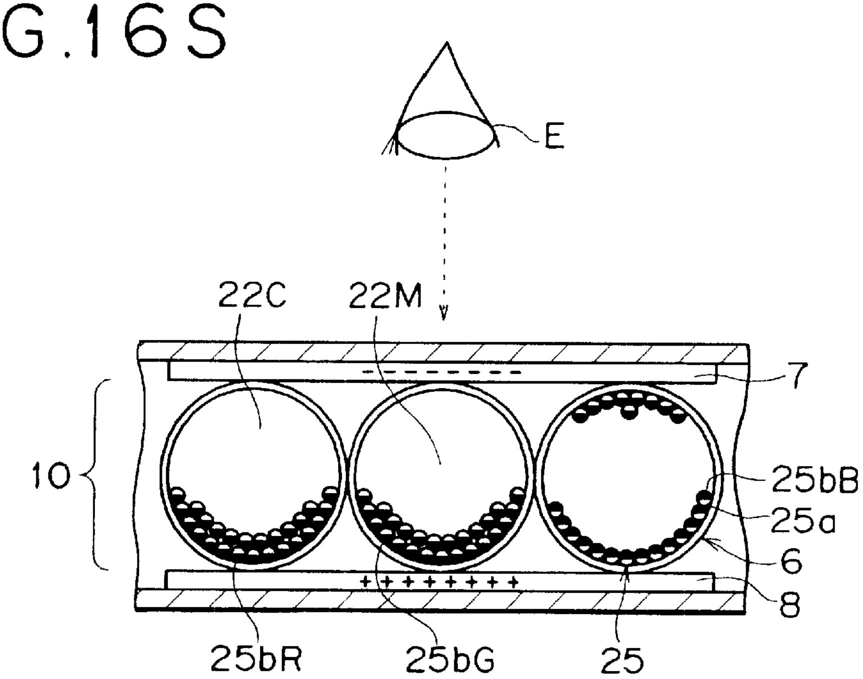

When in the state shown in FIG. 16R, the potential Vm2 is applied between the transparent electrode 7 and the counter electrode 8 with the transparent electrode 7 side taken as the negative side and the counter electrode 8 side taken as the positive side for a time required for the two-color ball type particles 25 to rotate but not to migrate as shown in FIG. 16S, all of the two-color ball type particles 25 having the red hemispherical portions 25*b*R and part of the two-color ball type particles 25 having the green hemispherical portions 25*b*G rotate in such a manner that the white hemispherical portions 25*a* thereof are directed to the transparent electrode 7 side. As a result, when a viewer turns his eyes upon the set of the micro-capsules 6 from an eye position E shown in FIG. 16S, he gets a look at the color in which black is slightly mixed to cyan and light magenta. In this case, the display of the color in which black is slightly mixed to cyan and light magenta is established.

Figure 16T:
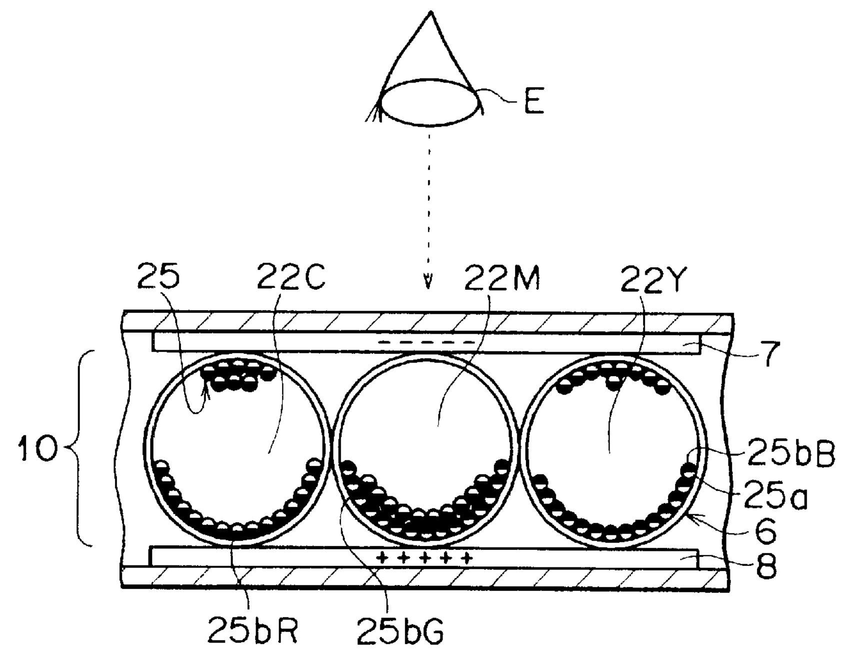

When in the state shown in FIG. 16S, the potential Vc2 is applied between the transparent electrode 7 and the counter electrode 8 with the transparent electrode 7 side taken as the negative side and the counter electrode 8 side taken as the positive side for a sufficient time required to the two-color ball type particles 25 to migrate as shown in FIG. 16T, part of the two-color ball type particles 25 having the red hemispherical portions 25*b*R rotate in such a manner that the white hemispherical portions 25*a* thereof are directed to the transparent electrode 7 side, and migrate to the transparent electrode 7 side. As a result, when a viewer turns his eyes upon the set of the micro-capsules 6 from an eye position E shown in FIG. 16T, he gets a look at the color of magenta weaker than that in the state shown in FIG. 16S.

According to the related art electrophoretic display device, it has been possible to obtain only the binary display in which the color of the electrophoretic particles is visible by allowing the electrophoretic particles to migrate to the transparent electrode side for covering the colored dispersion medium or the color of the colored dispersion medium is visible by allowing the electrophoretic particles to migrate to the opposed side, that is, to the counter electrode side.

According to the display device 31 of the fourth embodiment, however, the micro-capsule 6 is configured by dispersing a large number of the small-sized two-color ball type particles 25, each being composed of the white hemispherical portion 25*a* and the complementary color hemispherical portion 25*b* whose color has a complementary relationship with the color of the colored dispersion medium 22, in the colored dispersion medium, and a time required for applying an electric field is controlled by a control means in such a manner that the electric field is applied between the transparent electrode 7 and the counter electrode 8 only for a time required for the two-color ball type particles 25 to be reversed, and accordingly, the display of various colors can be established. To be more specific, the white display can be established by suitably adjusting the white hemispherical portions 25*a* of the two-color ball type particles 25; the black display can be established by suitably adjusting the colored dispersion medium 22 and the complementary color hemispherical portions 25*b*; and the color of the colored dispersion medium 22 and the color of the complementary color hemispherical portions 25*b* can be established. Further, high speed display switching operation can be performed by the control means.

According to the fourth embodiment, since the white color is made visible by the white hemispherical portions 25*a* of a large number of the two-color ball type particles 25, the display of clear white can be established, and since the black color is made visible by combination of the colored dispersion medium 22 and the complementary hemispherical portions 25*b*, the black display which is clearer than that obtained by mixture of cyan, magenta and yellow or red, green and blue in the related art display device can be established. As a result, it is possible to improve the contrast ratio as compared with the related art display device.

Even in this embodiment, since one pixel is composed of the three micro-capsules 6 containing the colored dispersion media 22 of different three colors and the two-color ball type particles 25 of three kinds different in terms of electrophoretic mobility and rotational threshold voltage, the display of various colors can be established by changing the high or low relationship of the drive potential, that is, the strong or weak relationship of the electric field and the applying order of the electric field. Also since each of the electrophoretic mobility and the rotational threshold voltage of the two-color ball type particles 25 in each micro-capsule 6 is set to have a distribution, the color gradation display can be established by changing the strong or weak relationship of the electric field and the applying time of the electric field. Further, since the three micro-capsules 6 constituting one pixel contain the two-color ball type particles 25 of three kinds different in terms of electrophoretic mobility and rotational threshold voltage, even if the three micro-capsules 6 are driven between one common transparent electrode 7 and one common counter electrode 8, the display of different colors can be established depending on the drive voltage and drive time.

According to this embodiment, the micro-capsule 6 is composed of the capsule 6*a* containing a large number of the two-color ball type particles 25 and the colored dispersion medium 22, it is possible to easily partition the different colored media 22 into cells and hence to prevent localization of the two-color ball type particles 25. Thus, it is possible to equalize the distribution of the two-color ball type particles 25 different in electrophoretic mobility and the rotational threshold voltage. Further, it is possible to simplify the production of the display device 31, and to improve workability in formation of the display device 31 into a sheet or panel shape.

In this way, according to the fourth embodiment, like the above-described embodiments, it is possible to realize the display device 31 having advantages in creating the display, good for eyes without causing the fatigue of eyes, reducing the power consumption, acquiring a memory capability, enhancing the contrast ratio, enabling the color display and gradation display, and simplifying the production of the display device 31. In addition, the display device 31 can realize high speed display switching operation although the memory capability thereof is slightly poor as compared with the above-described related art display devices.

Even in the fourth embodiment, when the distribution of the electrophoretic mobility of the two-color ball type particles 25 dispersed in each colored dispersion medium 22 is set to be expressed by a gauss curve shown in FIG. 8A, the relationship of the gradation display characteristic to the drive voltage is as shown in FIG. 8B. Here, if it is intended to obtain the gradation display characteristic shown by a gamma curved shown in FIG. 9B, the distribution of the above-described electrophoretic mobility may be set to be offset as shown in FIG. 9A.

In this embodiment, the colored dispersion media 22 are configured as the cyan, magenta, and yellow dispersion media 22C, 22M and 22Y, and the colored hemispherical portions 25*b* of the two-color ball type particles 25 are configured as the red, green, and blue hemispherical portions 25*b*R, 25*b*G and 25*b*B of red, green and blue as the three primary colors, however, the colored dispersion media 22 may be configured as colored dispersion media of red, green and blue as the three primary colors, and the colored hemispherical portions 25*b* may be configured as the colored hemispherical portions of cyan, magenta and yellow. Further, the micro-capsules 6 are used in the fourth embodiment, however, the display media each having a cell structure may be partitioned from each other.

In the fourth embodiment, the electrophoretic mobility of the two-color ball type particles 25 is changed for each micro-capsule 6 by changing the dielectric constant or viscosity of the colored dispersion medium 22, however, the above electrophoretic mobility can be changed for each micro-capsule 6 by changing the zeta-potential using a surface-treatment agent of a variable kind or changing the particle size of the two-color ball type particles 25 for each micro-capsule 6. The zeta-potential of the two-color ball type particles 25 can be also changed by changing the concentration of the surface-treatment agent of the same kind.

Figure 17A:
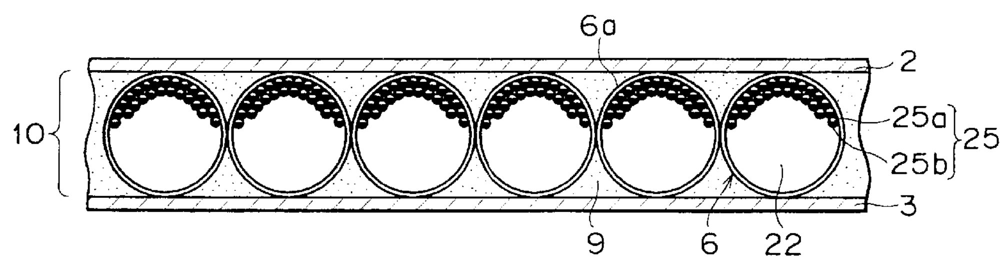
FIG. 17A to 17C are detailed sectional side views showing variations of the third and fourth embodiments.
Figure 17B:
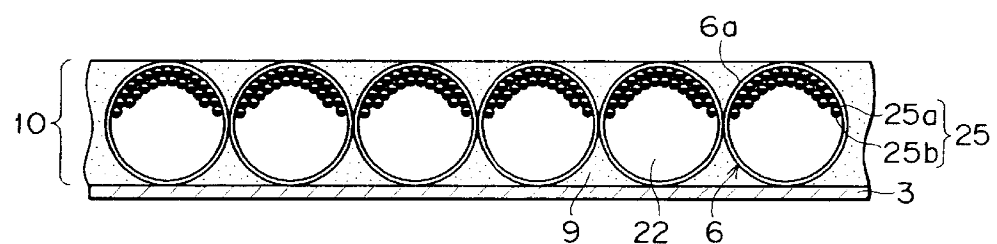
Figure 17C:
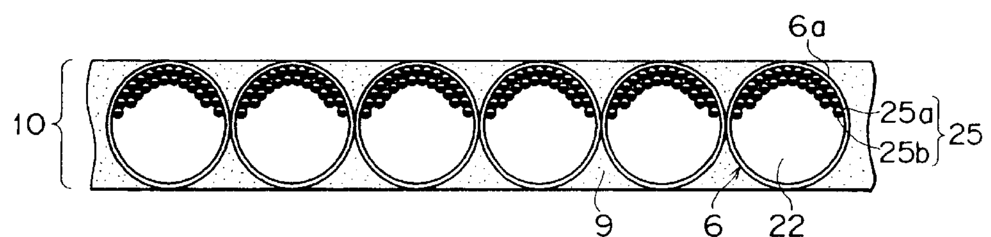

In the display device 31 according to the fourth embodiment, the transparent electrodes 7 are provided on the transparent substrate 2 and the counter electrodes 8 are provided on the counter substrate 3, however, the present invention is not limited thereto. For example, there may be adopted a structure shown in FIG. 17A in which no electrodes are provided, a structure shown in FIG. 17B in which one substrate is omitted, or a structure shown in FIG. 17C in which both the substrates are omitted.

Even for the structure in which no electrodes are provided, by applying an electric field from an external power source to the display media (micro-capsules 6) each of which is composed of the two-color ball type particles 25 and t he colored dispersion medium 22, the display corresponding to the applied electric field can be realized. T he structure in which no electrodes are provided is advantageous in reducing the production cost of the display device 31, making flexible the display device 31, and eliminating the inconvenience, caused by the structure having the transparent electrodes, that the surface reflect ion of the transparent electrodes obstructs the display.

Further, in the fourth embodiment, the rotational threshold voltage is set to be equal to the threshold voltage for electrophoresis, however, the present invention is not limited thereto. For example, a display device allowing the display of various colors and gradations can be realized by combining an operational condition in which the rotational threshold voltage is low but the threshold value for electrophoresis is high with an operational condition in which the threshold voltage for electrophoresis is low but the rotational threshold voltage is high.

While the preferred embodiments have been described using specific terms, such description is for illustrative purposes only, and it is to be understood that changes and variations may be made without departing from the spirit or scope of the following claims.

What is claimed is:

1. A display device comprising:

display media each of which has a dispersion medium, a large number of electrophoretic particles dispersed in said dispersion medium, said electrophoretic particles being driven by applying an electric field to each of said display media, to thereby perform a desired display operation, said electrophoretic particles comprising small-sized two-color ball electrophoretic particles each of which is composed of a pair of hemispherical portions different from each other in terms of color or reflectance and charging characteristic; and control means for controlling a time required for applying an electric field to each of said display media in such a manner that the electric field is applied to said display medium only for a time required for said two-color ball electrophoretic particles present on the display screen side of said display medium, or the side opposed to said display screen side, of said display medium to be reversed, but to migrate before reaching to the opposed side or to the display screen side.

2. A display device according to claim 1, wherein said display media fill a gap between a pair of opposed substrates provided with electrodes; and at least one of said pair of substrates provided with electrodes is a transparent/translucent substrate provided with transparent/translucent electrodes.

3. A display device comprising:

display media each of which has a dispersion medium and a large number of electrophoretic particles dispersed in said dispersion medium, said electrophoretic particles being driven by applying an electric field to each of said display media, to thereby perform a desired display operation;

wherein, said electrophoretic particles comprise small-sized two-color ball electrophoretic particles each of which is composed of a pair of hemispherical portions different from each other in terms of color or reflectance and charging characteristic, said dispersion medium comprises a colorless and transparent dispersion medium, and each of said display media is formed by filling a micro-capsule with said dispersion medium and said two-color ball electrophoretic particles.

4. A display device according to claim 3, wherein said display media fill a gap between a pair of opposed substrates provided with electrodes; and at least one of said pair of substrates provided with electrodes is a transparent/translucent substrate provided with transparent/translucent electrodes.

5. A display device comprising:

display media each of which has a dispersion medium and a large number of electrophoretic particles dispersed in said dispersion medium, said electrophoretic particles being driven by applying an electric field to each of said display media, to thereby perform a desired display operation;

wherein said electrophoretic particles comprise small-sized two-color ball electrophoretic particles each of which is composed of a pair of hemispherical portions different from each other in terms of color or reflectance and charging characteristic; and said dispersion medium comprises a colored dispersion medium.

6. A display device according to claim 5, wherein said display media fill a gap between a pair of opposed substrates provided with electrodes; and at least one of said pair of substrates provided with electrodes is a transparent/translucent substrate provided with transparent/translucent electrodes.

7. A display device according to claim 5, wherein one of said pair of hemispherical portions of each of said two-color ball electrophoretic particles is colored into white and the other is colored into black; and a charging characteristic of said black hemispherical portion is higher than that of said white hemispherical portion, and said two-color ball electrophoretic particle as a whole is charged into the same polarity as that of said black hemispherical portion.

8. A display device according to claim 5, further comprising a control means for controlling a time required for applying an electric field to each of said display media in such a manner that the electric field is applied to said display medium only for a time required for said two-color ball electrophoretic particles present on the display screen side of said display medium, or the side opposed to said display screen side, of said display medium to be reversed, but to migrate before reaching to the opposed side or to the display screen side.

9. A display device according to claim 5, wherein said colored dispersion medium comprises each of colored dispersion media having a plurality of different colors;

said display media are classified by color into groups, each having a large number of said two-color ball electrophoretic particles and said colored dispersion medium having each of said plurality of different colors; and said one group of said display media forms one pixel.

10. A display device according to claim 9, wherein said colored dispersion media having said plurality of different colors comprise dispersion media having the three primary colors of red, blue and green or cyan, magenta and yellow.

11. A display device according to claim 9, wherein said two-color ball electrophoretic particles contained in each of said group of said display media forming said pixel have an electrophoretic mobility and a rotational threshold voltage which differ from each of said display media.

12. A display device according to claim 11, wherein said two-color ball electrophoretic particles have an electrophoretic mobility and a rotational threshold voltage which differ from each of said display media by making a dielectric constant of said dispersion medium differ from each of said display media.

13. A display device according to claim 11, wherein said two-color ball electrophoretic particles have an electrophoretic mobility and a rotational threshold voltage which differ from each of said display media by making a viscosity of said dispersion medium differ from each of said display media.

14. A display device according to claim 11, wherein said two-color ball electrophoretic particles have an electrophoretic mobility and a rotational threshold voltage which differ from each of said display media by using said two-color ball electrophoretic particles treated by a surface-treatment agent whose kind differs for each of said display media.

15. A display device according to claim 11, wherein said two-color ball electrophoretic particles have an electrophoretic mobility and a rotational threshold voltage which differ from each of said display media by using said two-color ball electrophoretic particles whose particle size differs for each of said display media.

16. A display device according to claim 11, wherein said two-color ball electrophoretic particles contained in each of said group of said display media forming said pixel have an electrophoretic mobility and a rotational threshold voltage each of which has a distribution in each of said display media.

17. A display device according to claim 5, wherein each of said display media is formed by filling a micro-capsule with said dispersion medium and said two-color ball type electrophoretic particles.

18. A display device comprising:

display media each of which has a dispersion medium and a large number of electrophoretic particles dispersed in said dispersion medium, said electrophoretic particles being driven by applying an electric field to each of said display media, to thereby perform a desired display operation;

wherein said electrophoretic particles comprise small-sized two-color ball electrophoretic particles each of which is composed of a pair of hemispherical portions different from each other in terms of color or reflectance and charging characteristic;

said dispersion medium comprises a colored dispersion medium; and one of said pair of hemispherical portions of each of said two-color ball electrophoretic particles is colored into white and the other half is colored into a color having a complementary relationship with a color of said colored dispersion medium.

19. A display device according to claim 18, wherein said display media fill a gap between a pair of opposed substrates provided with electrodes; and at least one of said pair of substrates provided with electrodes is a transparent/translucent substrate provided with transparent/translucent electrodes.

20. A display device according to claim 18, further comprising a control means for controlling a time required for applying an electric field to each of said display media in such a manner that the electric field is applied to said display medium only for a time required for said two-color ball electrophoretic particles present on the display screen side of said display medium, or the side opposed to said display screen side of said display medium to be reversed, but to migrate before reaching to the opposed side or to the display screen side.

21. A display device according to claim 18, wherein said colored dispersion medium comprises each of colored dispersion media having a plurality of different colors; and a plurality of said display media including said colored dispersion media having said plurality of different colors form one pixel.

22. A display device according to claim 21, wherein said colored dispersion media having said plurality of different colors comprise dispersion media having the three primary colors of red, blue and green or cyan, magenta and yellow.

23. A display device according to claim 21, wherein said two-color ball electrophoretic particles contained in each of said group of said display media forming said pixel have an electrophoretic mobility and a rotational threshold voltage which differ from each of said display media.

24. A display device according to claim 21, wherein said two-color ball electrophoretic particles have an electrophoretic mobility and a rotational threshold voltage which differ from each of said display media by making a dielectric constant of said colored dispersion medium differ from each of said display media.

25. A display device according to claim 21, wherein said two-color ball electrophoretic particles have an electrophoretic mobility and a rotational threshold voltage which differ from each of said display media by making a viscosity of said dispersion medium differ from each of said display media.

26. A display device according to claim 21, wherein said two-color ball electrophoretic particles have an electrophoretic mobility and a rotational threshold voltage which differ from each of said display media by using said two-color ball electrophoretic particles treated by a surface-treatment agent whose kind differs for each of said display media.

27. A display device according to claim 21, wherein said two-color ball electrophoretic particles have an electrophoretic mobility and a rotational threshold voltage which differ from each of said display media by using said two-color ball electrophoretic particles whose particle size differs for each of said display media.

28. A display device according to claim 21, wherein said two-color ball electrophoretic particles contained in each of said group of said display media forming said pixel have an electrophoretic mobility and a rotational threshold voltage each of which has a distribution in each of said display media.

29. A display device according to claim 18, wherein each of said display media is formed by filling a micro-capsule with said dispersion medium and said two-color ball electrophoretic particles.

30. A method of driving a display device comprising the steps of:

preparing a display device including pixels each of which has a plurality of display media, each of said display media being formed by dispersing a large number of small-sized two-color ball electrophoretic particles, each being composed of a pair of hemispherical portions different from each other in terms of color or reflectance and charging characteristic, in each of colored dispersion media having a plurality of colors, wherein a drive voltage of said two-color ball particles differs from each of said display media; said display device performs a desired display operation by applying an electric field to each of said display media to drive said two-color ball type electrophoretic particles;

classifying said two-color ball electrophoretic particles in each of said plurality of display media into a first group having a high drive voltage and a second group having a low drive voltage;

applying an electric field allowing said first group having a high drive voltage to sufficiently rotate and migrate and then applying a reverse electric field allowing only said second group having a low drive voltage to rotate and migrate, thereby forming a state in which only said first group having a high drive voltage has rotated and migrated.

* * * * *